US008005553B2

(12) United States Patent
Enver et al.

(10) Patent No.: US 8,005,553 B2
(45) Date of Patent: Aug. 23, 2011

(54) AUTOMATIC CONFIGURATION OF SYNCHRONOUS BLOCK EXECUTION FOR CONTROL MODULES RUN IN FIELDBUS NETWORKS

(75) Inventors: Alper T. Enver, Austin, TX (US); Kenneth D. Krivoshein, Austin, TX (US); Daniel D. Christensen, Austin, TX (US); Ram Ramachandran, Austin, TX (US); John M. Lucas, Leicester (GB); Ebtesam S. Tanyous, Cedar Park, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 649 days.

(21) Appl. No.: 11/968,087

(22) Filed: Dec. 31, 2007

(65) Prior Publication Data
US 2008/0249641 A1 Oct. 9, 2008

Related U.S. Application Data

(63) Continuation-in-part of application No. 11/537,303, filed on Sep. 29, 2006, now Pat. No. 7,761,171.

(51) Int. Cl.
*G05B 11/01* (2006.01)
(52) U.S. Cl. .......................................... 700/19; 700/20
(58) Field of Classification Search ................ 700/9–12, 700/20
See application file for complete search history.

(56) References Cited

U.S. PATENT DOCUMENTS
5,971,581 A 10/1999 Gretta et al.
6,038,539 A 3/2000 Maruyama et al.
6,076,952 A 6/2000 Gretta et al.
6,285,966 B1 9/2001 Brown et al.
6,564,382 B2 5/2003 Duquesnois et al.
(Continued)

FOREIGN PATENT DOCUMENTS
GB 2 405 705 3/2005
(Continued)

OTHER PUBLICATIONS

Blevins et al., "Achieving Target Control Performance Using Fieldbus Devices", Oct. 3-7, 2005, 2005 Emerson Exchange Conference.*

(Continued)

*Primary Examiner* — Paul L Rodriguez
*Assistant Examiner* — Carlos Ortiz Rodriguez
(74) *Attorney, Agent, or Firm* — Marshall, Gerstein & Borun LLP

(57) ABSTRACT

A method or apparatus automatically configures a control module for synchronous execution on a Fieldbus segment of a process control network by determining if all of the critical function blocks of a particular control module can be assigned to FOUNDATION® Fieldbus field devices or to the I/O device associated with a particular Fieldbus segment. If so, the method or apparatus automatically assigns the function blocks of the control module, which would otherwise be scheduled to execute in a controller, to the I/O device for the Fieldbus segment. This technique enables all of the critical or necessary function blocks within the control module to execute in one macrocycle of the Fieldbus segment, thereby executing synchronously on a Fieldbus segment. This operation, in turn, increases the overall execution rate of the control module with respect to control modules that have function blocks split between a controller and field devices on a Fieldbus segment, which has been the traditional manner of configuring control modules implemented using devices on a Fieldbus segment.

30 Claims, 29 Drawing Sheets

U.S. PATENT DOCUMENTS

| | | | |
|---|---|---|---|
| 6,662,061 | B1 | 12/2003 | Brown |
| 6,915,364 | B1 | 7/2005 | Christensen et al. |
| 6,983,229 | B2 | 1/2006 | Brown |
| 7,039,472 | B2 | 5/2006 | Sugimoto et al. |
| 2002/0184410 | A1 | 12/2002 | Apel et al. |
| 2003/0014536 | A1 | 1/2003 | Christensen et al. |
| 2003/0187530 | A1 | 10/2003 | Hotta et al. |
| 2003/0222090 | A1 | 12/2003 | Abdulhay et al. |
| 2004/0208158 | A1 | 10/2004 | Fellman et al. |
| 2004/0260584 | A1 | 12/2004 | Terasawa |
| 2005/0050515 | A1 | 3/2005 | Shah et al. |
| 2005/0113950 | A1 | 5/2005 | Brown |
| 2006/0200372 | A1 | 9/2006 | O'Cull et al. |
| 2006/0206218 | A1 | 9/2006 | Glanzer et al. |
| 2006/0293797 | A1 | 12/2006 | Weiler |
| 2008/0249641 | A1 | 10/2008 | Enver et al. |

FOREIGN PATENT DOCUMENTS

| | | |
|---|---|---|
| GB | 2 442 356 | 4/2008 |
| WO | WO-01/97158 | 12/2001 |

OTHER PUBLICATIONS

Blevins et al., "Providing Effective Control Process of Processes with Variable Delay Response," Instrument Society of America (2002).

Emerson Process Management, "Delta V, Configuration Software Suite," Product Data Sheet (2007).

Fisher Rosemount, "Foundation Fieldbus Blocks," Rev BA 2000.

Fisher-Rosemount Systems, Inc., "DeltaV Control Module Execution," (2002).

Meyer, "Synergie aus Feldbus und Ethernet. Realisierung eines geeigneten Netzubergangs von Foundation Fieldbus Hi zu High Speed Ethernet," *Industrial Ethernet*, pp. 97-99 (2004). Retrieved from the Internet on Sep. 16, 2009: URL:http://www.softing.com/home/de/pdf/ia/professional-article/foundation-fieldbus/2004/0410_sps_industrial_ethernet.pdf.

Samson, "Technical Information. Foundation Fieldbus. Part 4: Communication," (2000). Retrieved from the Internet on Sep. 16, 2009: URL:http://www.samson.de/pdf_en/1454en.pdf.

The Fieldbus Foundation, "System Engineering Guidelines," Revision 2 (2004).

European Search Report for Application No. 08173053, dated Sep. 25, 2009.

Search Report for Application No. GB0719098.6, dated Dec. 20, 2007.

Search Report for Application No. GB0823049.2, dated Mar. 27, 2009.

Emerson Process Management, "Answers to Your Questions About Implementing Fieldbus in DeltaV Systems," Oct. 2005 (22 pages).

Fisher-Rosemount, "Fieldbus Technical Overview: Understanding Foundation™ Fieldbus Technology," 1998 (26 pages).

Fisher-Rosemount, "The Basics of Fieldbus," 1998 (4 pages).

\* cited by examiner

| FIELD DEVICE/ FUNCTION BLOCK | BLOCK SCAN RATE FACTOR $F_{BSR}$ | $T_{BRE}$ (ms) | $RT_{BRE}$ (ms) | QUANTITY OF START TIME OFFSET(S) |
|---|---|---|---|---|
| PDT11/FFAI11 | 4 | 500x4=2000 | 2000 | 2000/2000=1 |
| PDT12/FFPID12 | 4 | 500x4=2000 | 2000 | 2000/2000=1 |
| PDT11/FFAI12 | 1 | 500x1=500 | 500 | 2000/500=4 |
| PDT13/FFPID13 | 1 | 500x1=500 | 500 | 500/500=1 |
| PDT11/FFAO11 | 1 | 500x1=500 | 500 | 2000/500=4 |

AUTOMATIC CONFIGURATION OF SYNCHRONOUS BLOCK EXECUTION FOR CONTROL MODULES RUN IN FIELDBUS NETWORKS

RELATED APPLICATIONS

This is a continuation-in-part application of and claims priority to U.S. patent application Ser. No. 11/537,303 entitled "Methods and Apparatus to Generate Schedules to Execute Functions in a Process Control System," which was filed on Sep. 29, 2006, and which issued as U.S. Pat. No. 7,761,171 on Jul. 20, 2010, the entire disclosure of which is hereby expressly incorporated by reference herein.

FIELD OF THE DISCLOSURE

This patent relates generally to process control systems and, more particularly, to a system that assigns various function blocks of a control module to an input/output card on a Fieldbus segment, and that generates schedules to execute the function blocks of the control module synchronously within the Fieldbus segment.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, switches, transmitters (e.g., temperature, pressure and flow rate sensors), etc. perform functions within the process such as opening or closing valves and measuring process parameters. The process controller receives signals indicative of process measurements made by the field devices and/or other information pertaining to the field devices, uses this information to implement a control routine or a control module, and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Process control system applications typically include process control routines that can be configured to perform various functions or operations in a process control system. For example, process control routines may be used to control valves, motors, boilers, heaters, etc. Process control routines may also be used to monitor field devices, plant areas, etc. and to collect information associated with a process control system. Field devices used to implement the process control routines are typically coupled to one another and to a process controller via a data bus. However, these data buses have limited resources including limited bandwidth available for field devices and process controllers to communicate information to one another. In some cases, to ensure that sufficient time is available on the data bus for all of the field devices and controllers to execute their respective functions and to communicate information therebetween, schedules are generated to indicate when the controllers and the field devices should execute their respective functions and communicate over the data bus.

The FOUNDATION® Fieldbus (FF) communication protocol and specification, which is well known in the art of process control systems, is an all digital communication protocol that enables function blocks, generally known as FOUNDATION® Fieldbus (FF) function blocks, to be located in various field devices, such as valves, transmitters, etc., and to communicate with one another over a communication link or bus to implement control loops. A set of interconnected function blocks which implement a particular control loop or function is generally referred to as a process control module, and such process control modules may have function blocks disposed in various different devices connected to a Fieldbus communication bus, also called a Fieldbus segment. As is generally known, the communications over a particular Fieldbus segment are determined by a communication schedule which is generated for the segment, typically by an operator or a configuration engineer, when setting up or configuring the Fieldbus segment. Generally speaking, a communication schedule for a particular Fieldbus segment defines each of the synchronous communications to occur over the bus of the Fieldbus segment during each of a set of repeating macrocycles.

In the past, it was known to configure a particular control module to operate in a distributed manner using the capabilities of the FF protocol, by placing all or at least some of the function blocks making up the module in the FF field devices connected to a Fieldbus segment, and allowing those blocks to communicatively interact with one another in a precisely scheduled manner to perform the control loop. Unfortunately, in many cases, not all of the function blocks making up a particular control module could be executed in the actual field devices connected to a Fieldbus segment, as many of the function blocks were simply not supported by the particular field devices connected to the Fieldbus segment. In these cases, it was necessary or standard practice to place some of the function blocks, typically the control function blocks which implement control calculations (e.g., proportional, integral and derivative (PID) control routines), in a controller connected to the Fieldbus segment via an input/output device. The FOUNDATION® Fieldbus defines and supports a number of such input/output devices, the most common of which is referred to as an H1 card or H1 device.

However, when a function block of a particular control module is placed in and executed in the controller, this function block is executed asynchronously with respect to the execution and operation of the function blocks located in the FF field devices connected to the Fieldbus segment, as the controller is not directly connected to and therefore does not participate directly in the communication schedule of the Fieldbus segment. As a result, in this case, the overall execution rate of the control module itself is slowed down, as compared to control modules run entirely within the Fieldbus segment, due to the fact that communications between the controller and field devices on the Fieldbus segment have to be managed by the input/output device outside of the Fieldbus segment schedule to assure delivery of signals between the controller (executing one of the function blocks of a control module) and the FF field devices (executing others of the function blocks of the control module). Thus, unfortunately, a control module having function blocks disposed in both the FF field devices and a controller cannot generally execute in a single macrocycle defined by the Fieldbus segment schedule, but instead has to operate over a series of macrocycles of the Fieldbus segment schedule to allow for proper communications between the controller and the FF field devices through the input/output device.

Thus, currently, some or all of the function blocks required to implement a control loop may be assigned to the Fieldbus devices, based on the identity of the actual FF field devices a customer has purchased and installed in the process control system. However, if one or more of the blocks needed to implement a particular control loop (or control module) is not assigned to a Fieldbus device, then these blocks are executed in the controller which is not on the Fieldbus segment. Splitting the blocks in this manner introduces significant delay into the control loop, because the execution of the blocks in the controller is not synchronized with the execution of the blocks on the Fieldbus segment.

SUMMARY OF THE DISCLOSURE

An input/output (I/O) device of a communication network, such as one that implements the FOUNDATION® Fieldbus protocol, is configured to support the execution of function blocks not otherwise supported by field devices on, for example, a Fieldbus segment connected to the I/O device. As a result of this functionality, the I/O device, which may be a FF H1 card, can execute control blocks or other function blocks that traditionally had to be executed in a process controller. This added functionality of the I/O device enables the function blocks assigned to the I/O device to participate synchronously within the communication schedule of the Fieldbus segment while not being assigned to a traditional Fieldbus field device, such as to a valve or to a transmitter device.

Additionally, an apparatus or method automatically configures a control module for synchronous execution on a Fieldbus segment by determining if all of the critical function blocks of a particular control module can be assigned to FOUNDATION® Fieldbus field devices or to the I/O device associated with a particular Fieldbus segment. If so, the apparatus or method automatically assigns the function blocks of the control module, which would otherwise be scheduled to execute in a controller, to the I/O device for the Fieldbus segment. This technique thereby enables all of the function blocks within the control module (or at least all of the critical or necessary function blocks within the control module) to execute in one macrocycle of the Fieldbus segment, thereby executing synchronously on a Fieldbus segment. This operation, in turn, increases the overall execution rate of the control module. In other words, the disclosed apparatus and method enable the function blocks of a control module including, for example, control function blocks, to be executed and to communicate with one another over a Fieldbus segment within a single scheduled macrocycle of the Fieldbus segment, thereby enabling faster operation of the control module over control modules that have function blocks split between a controller and field devices on a Fieldbus segment.

The disclosed apparatus and method may also automatically generate a communication and execution schedule for the Fieldbus segment based on the manner in which the function blocks of one or more control modules are assigned to the different devices on the Fieldbus segment, including to the I/O device. This schedule may accommodate function blocks from various different control modules which operate on the Fieldbus segment, and may accommodate function blocks from the same or different control modules that have different scan or execution rates.

The automatic assignment of function blocks to devices on the Fieldbus segment and the automatic generation of the communication and execution schedule on the Fieldbus segment allows the operator or configuration engineer to simply specify the control loops (control modules) to be executed on a particular Fieldbus segment without having to worry about where to assign the function blocks, or the best schedule to use when configuring the Fieldbus segment. This operation thereby enables easier and more optimal use of the process control system assets while simultaneously configuring the control modules to execute at a faster rate, where possible, by placing as many of the function blocks associated with a particular control module into an I/O device on a Fieldbus segment.

DETAILED DESCRIPTION

Figure 1:
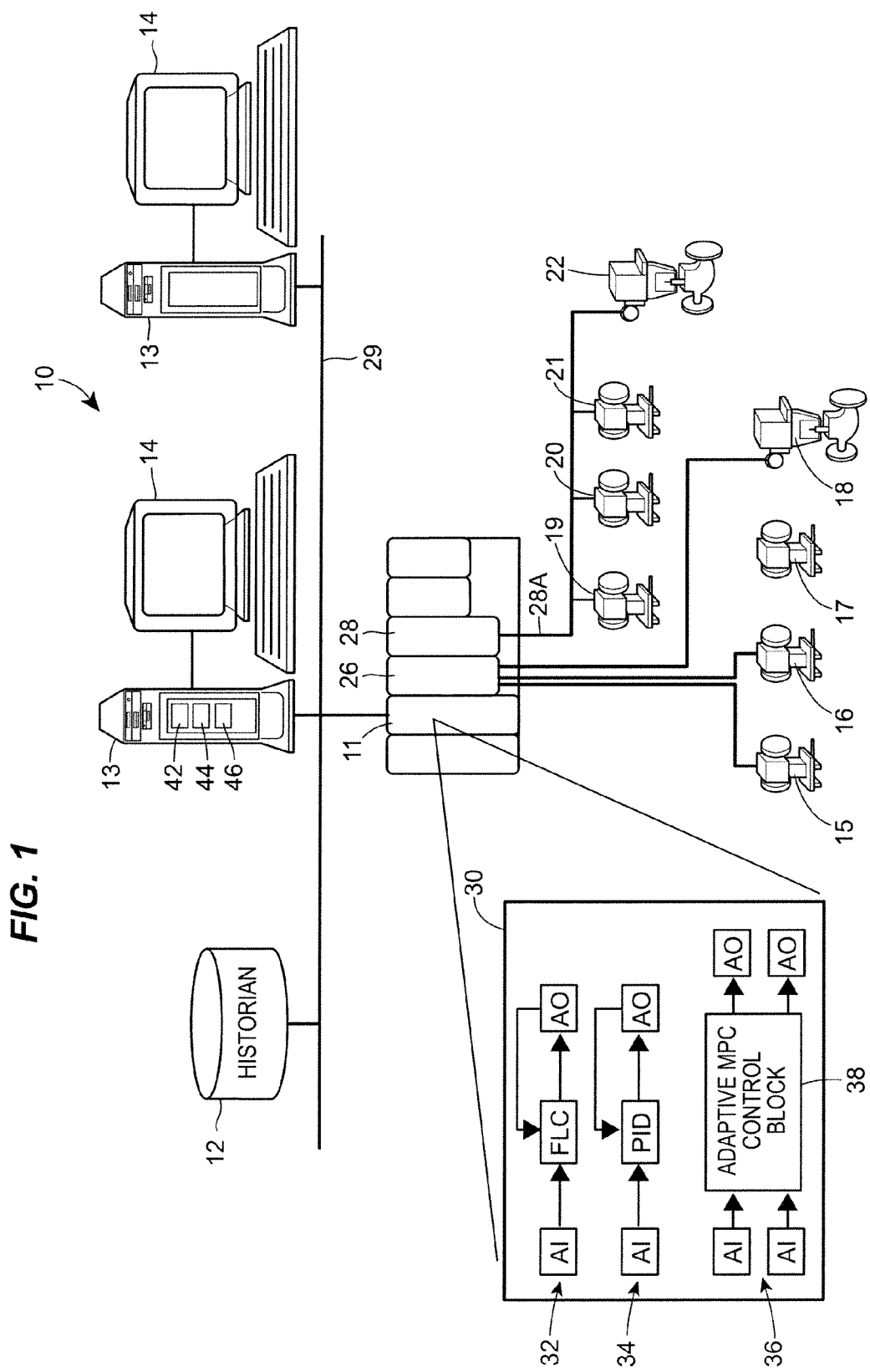
FIG. 1 is a block diagram of a distributed process control network including a distributed process controller communicatively coupled to a Fieldbus segment via a Fieldbus I/O device.

Referring now to FIG. 1, a process control system 10 includes a process controller 11 communicatively connected to a data historian 12 and to one or more host workstations or computers 13 (which may be any type of personal computers, workstations, etc.) each having a display screen 14. The controller 11 is also connected to field devices 15-22 via input/output (I/O) devices or cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the DeltaV™ controller sold by Emerson Process Management is communicatively connected to the host computers 13 and the data historian 12 via, for example, an Ethernet communication link or any other desired communication network 29. The communication network 29 may be in the form of a local area network (LAN), a wide area network (WAN), a telecommunications network, the Internet (e.g., the World Wide Web), etc. and may be implemented using hardwired and/or wireless technology. The controller 11 is communicatively connected to the field devices 15-22 using any desired hardware and software associated with, for example, standard 4-20 ma devices and/or any smart communication protocol such as the FOUNDATION® Fieldbus protocol, the HART protocol, the Profibus protocol, or any other well-known or standard communication protocol used in the process control industry.

The field devices 15-22 may be any types of devices, such as sensors, valves, transmitters, positioners, etc., while the I/O cards 26 and 28 may be any types of I/O devices conforming to or supporting any desired communication or controller protocol. In the embodiment illustrated in FIG. 1, the field devices 15-18 are standard 4-20 ma devices or are HART devices that communicate over analog lines (or combined analog and digital lines) to the I/O card 26 while the field devices 19-22 are illustrated as FOUNDATION® Fieldbus (FF) devices that communicate over a digital bus 28A to the I/O card 28 using FOUNDATION® Fieldbus protocol communications. In this case, the I/O card 28 is an H1 card having a Fieldbus port that supports the FF protocol. As will be understood, the digital bus 28A and the field devices 19-22 connected thereto, as well as the I/O card 28 form a Fieldbus segment. Of course, if desired, the I/O card 28 may be connected to other Fieldbus segments (not shown) and the Fieldbus segment may include any number and types of devices connected thereto that support the FF protocol. Alternatively, the field devices 15-22 could conform to any other desired standard(s) or protocols, including any other known Fieldbus protocol, or any other communication standards or protocols now known or that may be developed in the future.

The controller 11 may be one of many distributed controllers within the plant 10, each of which may be connected to the communication link 29 and each of which may be connected to one or more Fieldbus segments via I/O devices which support the FF protocol (also referred to herein as FF I/O devices or Fieldbus I/O devices). The controller 11 includes at least one processor therein, and operates to implement or oversee one or more process control modules, which may perform control loops in an industrial process plant. The control modules may include a number of communicatively interconnected function blocks, and these function blocks may be stored in and executed in the controller 11 and/or in some of the field devices 19-22 and, as described below, in the I/O device 28. The controller 11 communicates with the devices 15-22, the host computers 13 and the data historian 12 to control and oversee a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner other than that specifically described herein.

In one embodiment, the controller 11 implements a control strategy using what are commonly referred to as process control modules, each of which may be made up of a set of interconnected function blocks. In this case, each function block is a part of or an object within the overall control module and operates in conjunction with other function blocks (via communications called links) to implement process control loops within the process control system 10. Function blocks typically perform one of an input function, such as that associated with a transmitter, a sensor or other process parameter measurement device; a control function, such as that associated with a control routine that performs proportional/integral (PI), proportional/derivative (PD), proportional/integral/derivative (PID), fuzzy logic, etc. control; or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices and in some cases Fieldbus devices. However, in some cases, these function blocks may be stored in and executed by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 30 of FIG. 1, the controller 11 may oversee or be involved with implementing a number of single-input/single-output control loops, illustrated in FIG. 1 as process control modules 32 and 34, and may implement one or more advanced control loops, illustrated by a process control module 36. The function blocks making up each control loop are typically referred to as a control module and these function blocks had traditionally been stored in the controller 11 and/or in the field devices 15-22 when using the Fieldbus segment 28A. The control modules 32 and 34 are illustrated as performing single loop control using a single-input/single-output fuzzy logic control block and a single-input/single-output PID control block, respectively, connected to appropriate analog input (AI) and analog output (AO) function blocks. The AI and AO function blocks may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be communicatively connected to any other desired function blocks or control elements to receive other types of inputs and to provide other types of control outputs. If desired, the advanced control block 38 may be a control block that integrates a model predictive control routine with an optimizer to perform optimized control of the process or a portion of the process. It will be understood that the control modules and function blocks illustrated in FIG. 1, including the advanced control block 38, were traditionally executed by the controller 11 or, alternatively, located in and executed in other processing devices, such as one of the workstations 13 or even one of the field devices 19-22. However, as will be described in more detail, these function blocks may also advantageously be stored in an I/O device, such as the I/O device 28, to operate synchronously as part of a Fieldbus segment.

As illustrated in FIG. 1, one of the workstations 13 includes a control block assignment and scheduling routine 40 that may be used to create, assign, download and implement the control modules in the controller 11, and specifically those that use the Fieldbus segment defined by the bus 28A. While the control block assignment and scheduling routine 40 may be stored in a memory within the workstation 13 and executed by a processor therein, this routine (or any part thereof) may additionally or alternatively be stored in and executed by any other device within the process control system 10, if so desired. Generally speaking, the routine 40 includes a routine 42 that operates to assign function blocks within created control modules to particular devices in the process plant for execution and, more particularly, that operates to automatically optimize the manner in which function blocks of each control module created for a particular Fieldbus segment (such as the segment defined by the bus 28A) are assigned to the devices on the segment or to the controller which operates the segment.

Additionally, if desired, the routine 40 may include a routine 44 that automatically creates or configures the communication schedule (i.e., the macrocycle) of a Fieldbus segment based on the function blocks assigned to Fieldbus field devices on the segment, as well as to the function blocks assigned to the I/O device for the segment by the routine 42. The routine 44 makes it easier for the user to optimally generate communication and execution schedules for a particular Fieldbus segment based on the assignments performed by the routine 42. In one case, the routine 44 may generate a macrocycle or schedule for a Fieldbus segment based on the fastest module execution rate of a module assigned to this segment, instead of the slowest execution rate of a module assigned to the segment, as is typically performed in the prior art. In this case, the routine 44 may allow a function block multiplier specified by a user via the interface device 13 to indicate which block executions to be skipped in the schedule, which helps conserve bandwidth on the Fieldbus segment. Additionally, if desired, the routine 40 may include a routine 46 that allows a user to interact with the routines 42 and 44 to input and view information and to direct the performance of the routines 42 and 44.

As described above, while known controller systems which support FF devices make it easier for users to use FF devices, significant delays may be introduced into control loops when the function blocks in the control path of a particular control module are split between the controller (e.g., the controller 11 of FIG. 1) and the Fieldbus devices on the Fieldbus segment (e.g., the devices 19-22 of FIG. 1). Moreover, the prior art requirement that all blocks on a segment execute at the same rate may, in some cases, impact control performance when multiple loops are implemented within FF devices on the same Fieldbus segment as, in some cases, the different control loops or the blocks within a particular control loop may be configured to operate at different rates. The routine 40 generally operates to assign control blocks to devices connected to a Fieldbus segment in a manner that reduces the engineering effort required to use control in the field (CIF) versus control in the controller (CIC), and in a manner that minimizes the variation and total delay introduced into a control loop when using CIC in conjunction with field devices. Moreover, the routine 40 may operate to give a user the choice of additional function blocks for CIF and may define a schedule for a Fieldbus segment that enables overall faster operation of one or more modules being implemented on the Fieldbus segment.

More particularly, to support the capabilities and operation of the routine 42, the I/O device connected to the Fieldbus segment, (i.e., the I/O device 28 of FIG. 1) is configured to execute a subset of the function blocks that traditionally have been implemented in or run within the controller 11. In particular, a Fieldbus port is specified or created for the I/O device, and this port may be modeled as a separate Fieldbus device connected to the Fieldbus segment. Each Fieldbus port may therefore include a Fieldbus device revision file which specifies the function blocks supported by the port (or I/O device generally), the number of start list entries, etc. Each Fieldbus port may have a global system device tag which may be automatically generated in the context of the process control system in a manner similar to other devices. Likewise, a reference menu option on the Fieldbus port may be provided to list all of the referenced modules/blocks assigned to that port. However, generally speaking, Fieldbus ports will not have resource blocks or transducer blocks as is typically the case with FF field devices. In one embodiment, each Fieldbus port can support up to 32 function blocks. However, the actual number and type of supported blocks will be determined by the number of start list entries available in the device. Still further, each Fieldbus port may have a user configurable "auto-calculate schedule macrocycle" property, which will be described in further detail below.

When the I/O device connected to the Fieldbus segment includes this additional functionality, the routine 42 is able to assign function blocks to execute in the Fieldbus port of the I/O device (e.g., the I/O device 28 of FIG. 1). Generally speaking, the routine 42 will assign function blocks of a control module to execute in the Fieldbus port of an I/O device for a Fieldbus segment if these function blocks are members of the subset of function blocks supported within the I/O device and are in a main control path between all of the Fieldbus input function blocks and the Fieldbus output function blocks of a particular control module running on or using the Fieldbus segment. In this manner, the routine 42, where possible, assures that all of the function blocks within the main control path of a control module are executed on one of the devices that is connected to a Fieldbus segment, thereby allowing each such function block to participate (be scheduled for operation and communication) directly in the macrocycle on the Fieldbus segment. This assignment technique operates to speed or increase the rate at which a control module (i.e., a control loop) is implemented in the Fieldbus segment, as compared to the rate at which a process module having function blocks split between the controller 11 and one or more Fieldbus devices on a Fieldbus segment operates.

Figure 2:
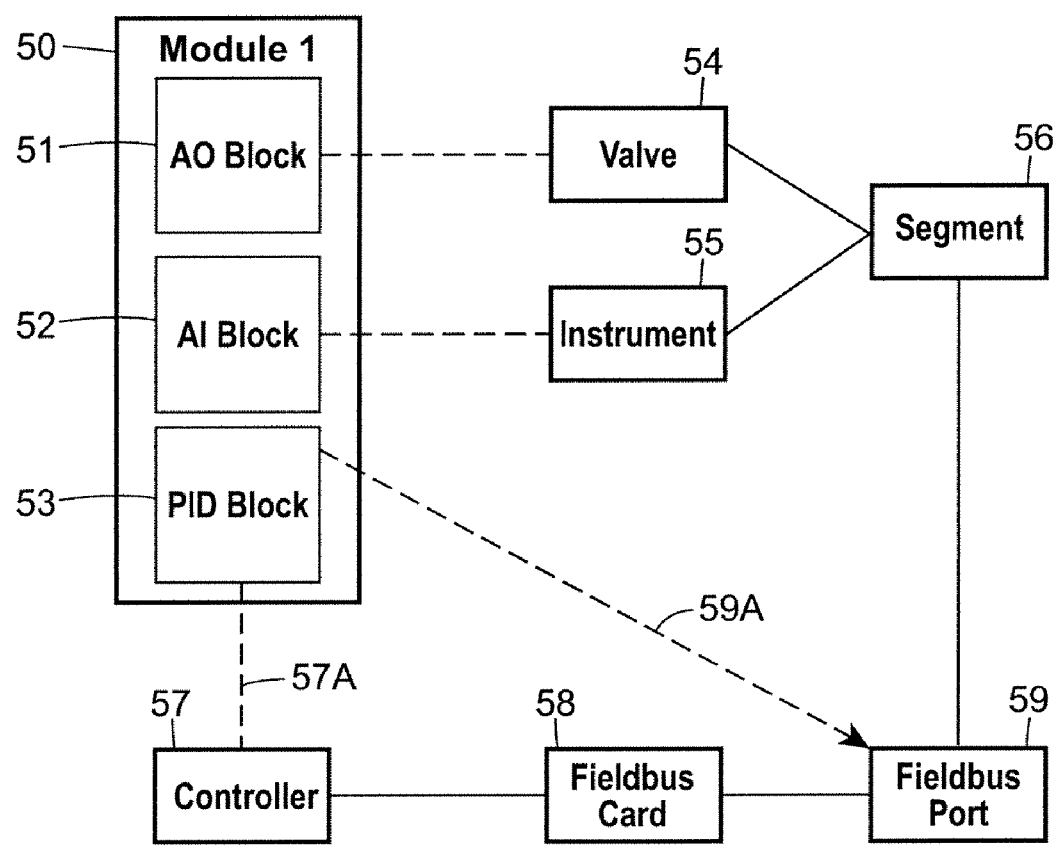
FIG. 2 is a block diagram illustrating a manner in which function blocks of a control module are assigned to field devices and to an I/O device on a particular Fieldbus segment to enable synchronized operation of the function blocks of the control module on the Fieldbus segment.

Referring now to FIG. 2, a control module 50 (entitled Module 1) is illustrated as including an AO (analog output) function block 51, an AI (analog input) function block 52 and a PID function block 53. The control module 50 may be, for example, the module 34 of FIG. 1. As illustrated by the dotted lines of FIG. 2, the AO function block 51 is assigned (typically by the operator or configuration engineer) to run in a Fieldbus field device 54, while the AI function block 52 is assigned (also typically by an operator or configuration engineer) to run in another Fieldbus field device 55. In this case, the AO block 50 is assigned to execute in a valve 54 while the AI block is assigned to execute in a sensor or other instrument 55. Importantly, the field devices 54 and 55 are connected to or are part of a common Fieldbus segment 56.

Typically, in the prior art systems, the PID function block 53 would not be supported by either of the Fieldbus field devices 54 or 55, and thus the PID function block 53 would be assigned by an operator or configuration engineer to be executed in a controller 57 (which may be the controller 11 of FIG. 1). This traditional implementation is illustrated by the dotted line 57A of FIG. 2. However, as illustrated in FIG. 2 by a larger dotted line 59A, the routine 42 may now assign the PID function block 53 for execution in the I/O device 58 which supports the FF protocol (labeled as a Fieldbus Card in FIG. 2) for execution in the Fieldbus port 59 of the I/O device 28. As illustrated in FIG. 2, the Fieldbus port 59 is connected to the Fieldbus segment 56 and thus can participate directly in the communication schedule of the Fieldbus segment 56. With the assignment of the PID function block 53 to the Fieldbus port 59, instead of to the controller 57, each of the blocks 51, 52 and 53 are located in a device on the Fieldbus segment 56, and thus can be directly scheduled for operation within the macrocycle used by the Fieldbus segment 56. As a result of this assignment, the entire module 50 now operates on the Fieldbus segment 56, instead of having some of the function blocks (i.e., function blocks 51 and 52) executed on the Fieldbus segment 56 and some of the function blocks (i.e., function block 53) executed outside of the Fieldbus segment 56 (i.e., in the controller 57).

If desired, when a function block is assigned to a Fieldbus port of an I/O device, function blocks can be created in the controller 57 and can be linked to function blocks in the Fieldbus port 59 using the well-known concept of shadow function blocks. In particular, the controller can communicate with function blocks assigned to Fieldbus port of an I/O device to send information to and to obtain information from these devices through the use of shadow function blocks in the controller 57. As is known, shadow function blocks are blocks which do not run algorithms and are traditionally used by controller-based modules to communicate with Fieldbus blocks which run in the Fieldbus devices. A more complete description of the make-up and use of shadow function blocks is provided in U.S. Pat. No. 6,738,388, which is hereby expressly incorporated by reference herein. As a result, this feature will not be described in any further detail herein.

Generally speaking, the routine 42 of FIG. 1 may implement a set of fixed rules in assigning function blocks to either the Fieldbus port 59 or to the controller 57 of FIG. 2 to thereby make this assignment in the most optimal manner possible. In one embodiment, the routine 42 determines if all of the function blocks within a critical flow path of a particular control module can be executed in a device connected to a particular Fieldbus segment, and if so, will assign the function blocks which are not otherwise assignable to field devices on the Fieldbus segment to the Fieldbus port of the I/O device on that segment. Otherwise, the routine 42 will assign the function blocks not supported by the field devices on the Fieldbus segment to the controller associated with the segment. In this manner, the routine 42 limits the assignment of function blocks within the I/O device to those that are necessary to assure that an entire control module can be run on the Fieldbus segment, and thereby conserves the resources of the I/O device and, in particular, to the Fieldbus port of the I/O device.

To enable a user or configuration engineer to specify whether a particular module is to be automatically assigned to an I/O device on a Fieldbus segment, a user-settable property may be added to the Fieldbus port entitled "auto-calculate schedule macrocycle." If the routine 42 determines that this property is set, then the routine 42 attempts to schedule modules for execution on the Fieldbus segment using the Fieldbus port of the I/O device. Moreover, users may specify, on a module by module basis, whether the routine 42 is to attempt to assign the function blocks of a particular module to a Fieldbus port of an I/O device for a Fieldbus segment. In particular, each control module may have a user-settable property entitled, for example, "auto-assign function blocks to Fieldbus port" which, when set, allows the function blocks of the module to be assigned to the Fieldbus port of an I/O device for a Fieldbus segment. This property, also referred to herein as the "auto-assign" property is enabled at the module level and not at the function block level, as the routine 42 determines, on a module basis and not on a function block basis, whether to attempt to assign function blocks to a Fieldbus I/O device for execution. Thus, generally speaking, the auto-assign property should be turned on and off on a module-by-module basis and this property should only be applied at the top level of a control module.

In one embodiment, when assigning a function block to a Fieldbus port of an I/O device that supports the Fieldbus protocol (also called a Fieldbus I/O device), the routine 42 determines if all of the input and output function blocks in the critical flow path of a control module are scheduled to be assigned to field devices on a common Fieldbus segment. If so, the routine 42 assigns the other function blocks within the critical flow path of the control module (disposed between the input and output function blocks) to the Fieldbus port of the I/O device on the Fieldbus segment, assuming that these blocks are not otherwise assigned to a field device on the Fieldbus segment and assuming that sufficient resources still exist to allow this assignment. For example, if the Fieldbus port of a Fieldbus I/O device does not support the particular type of control function block used in the control module or the Fieldbus port does not have enough resources left for assignment of even one of the function blocks of a module, then none of the function blocks of that module will be assigned to the Fieldbus port of the I/O device. If, on the other hand, one or more of the input or output function blocks in the critical flow path of a control module is not scheduled to be executed in field devices on the segment, then the routine 42 will assign the control function blocks and other function blocks of that module to the controller, instead of to a Fieldbus port of an I/O device.

Thus, generally speaking, function blocks of a control module will be assigned to the Fieldbus port of a Fieldbus I/O device if (1) all of the input and output blocks in the critical flow path of the module are assigned to devices and actuators on a common Fieldbus segment and (2) all of the function blocks between the input and the output blocks are assignable to (supported by) the Fieldbus port. Put another way, the function blocks that are in the critical flow path of a module will be automatically assigned to execute on a segment, as these blocks will be automatically assigned to the Fieldbus port for the segment, provided that (1) the auto-assign property is enabled for the module, (2) there is at least one input block and at least one output block of the module assigned to a device and/or actuator on the segment, (3) there are no breaks in the synchronization (e.g., each function block in the critical flow path between the input and output function blocks can be assigned to the Fieldbus port), and (4) the "auto-calculate schedule macrocycle" property is set for the Fieldbus port of the Fieldbus I/O device.

Here, it should be noted that, in one embodiment, only the forward path(s) through a control loop (control module) are considered to be part of the critical flow path, and not any feedback paths. Moreover, automatic assignment of blocks to the Fieldbus port will be predicated on the I/O blocks in the control path being assigned to the same Fieldbus segment and on all of the function blocks in the critical flow path being supported in the Fieldbus port. In one embodiment, when multiple AI, AO, DI or DO blocks are in the critical flow path, only one of them needs to bound to a Fieldbus device, so long as there is at least one input and one output block assigned to a Fieldbus device on the Fieldbus segment for the control module. However, in this case, input and output function blocks not assigned to Fieldbus devices will not be assigned to the Fieldbus port and so these function blocks will run asynchronously. If desired, however, in some embodiments, input/output function blocks (e.g., AI, AO, DI, DO, MAI function blocks) may be assigned to a Fieldbus port or may be prevented from being assigned to a Fieldbus port. In other embodiments, if desired, the routine 42 may mandate that all of the input and output function blocks on the critical flow path of the module be assigned to Fieldbus devices on a segment in order to assign the other function blocks in the critical flow path to the Fieldbus port of the Fieldbus I/O device for that segment.

Thus, generally speaking, before assigning a function block of a module to the Fieldbus port, the routine 42 may determine if (1) the auto assign property is enabled for the module, (2) the auto-calculate schedule macrocycle property is enabled on the Fieldbus port, (3) the I/O card has sufficient resources to support the function blocks associated with the module, (4) all of the function blocks between the input and output function blocks in the forward flow path of the module are supported by the Fieldbus card, and (5) all the function blocks in the forward flow path are in the same module. If any of these conditions is not satisfied, the routine 42 may decide not to assign any of the function blocks of the module to the Fieldbus port of the Fieldbus I/O device on the Fieldbus segment, but instead may assign those function blocks to the controller associated with the Fieldbus segment.

With this technique, users cannot generally un-assign individual function blocks from the Fieldbus port of the Fieldbus I/O card because function blocks are assigned to this card based on properties of the module. Instead, users can only auto-assign or auto-un-assign the module as a whole by setting the auto-assign property of the module.

If desired, messages may be provided to the user when the user turns on/off the auto-assign property of the control module to inform the user that he or she must save the module to see the changes and explain the consequences, as the assignment action of the routine 42 may automatically occur when the module is saved. Furthermore, it is desirable that the each function block includes a visual property to indicate whether this block is configured for auto-assignment. If desired, when the auto-assign property of a module is set to be auto-assigned, a warning can be issued to the user when there are resource limitations that prevent function blocks of the module from actually being assigned to a Fieldbus I/O device having a Fieldbus port. For example, if the Fieldbus I/O card has reached its limit and the module is saved, the user may receive a warning that the function blocks of the module will not be auto-assigned and the module will be saved with the auto-assign property turned off. In this case, the user may have to remove or un-set the auto-assign property of other modules to free up some assignment space on the Fieldbus port, turn on the auto-assign property for the module and then resave the module to get the block auto-assignment feature to work.

If desired, the routine 42 may include a utility that locates, in the database 12, for example, all of the potential modules that have a complete critical flow path that can be assigned to a Fieldbus device, and whether these modules have the auto-assign property turned "on" or "off." This utility can be used to aid the user in understanding where turning the auto-assign property on or off for a particular module may help in creating resource space. This utility may also help a user to determine the identity of modules for which it is advantageous to set the auto-assign property prior to a configuration download.

Figure 3A:
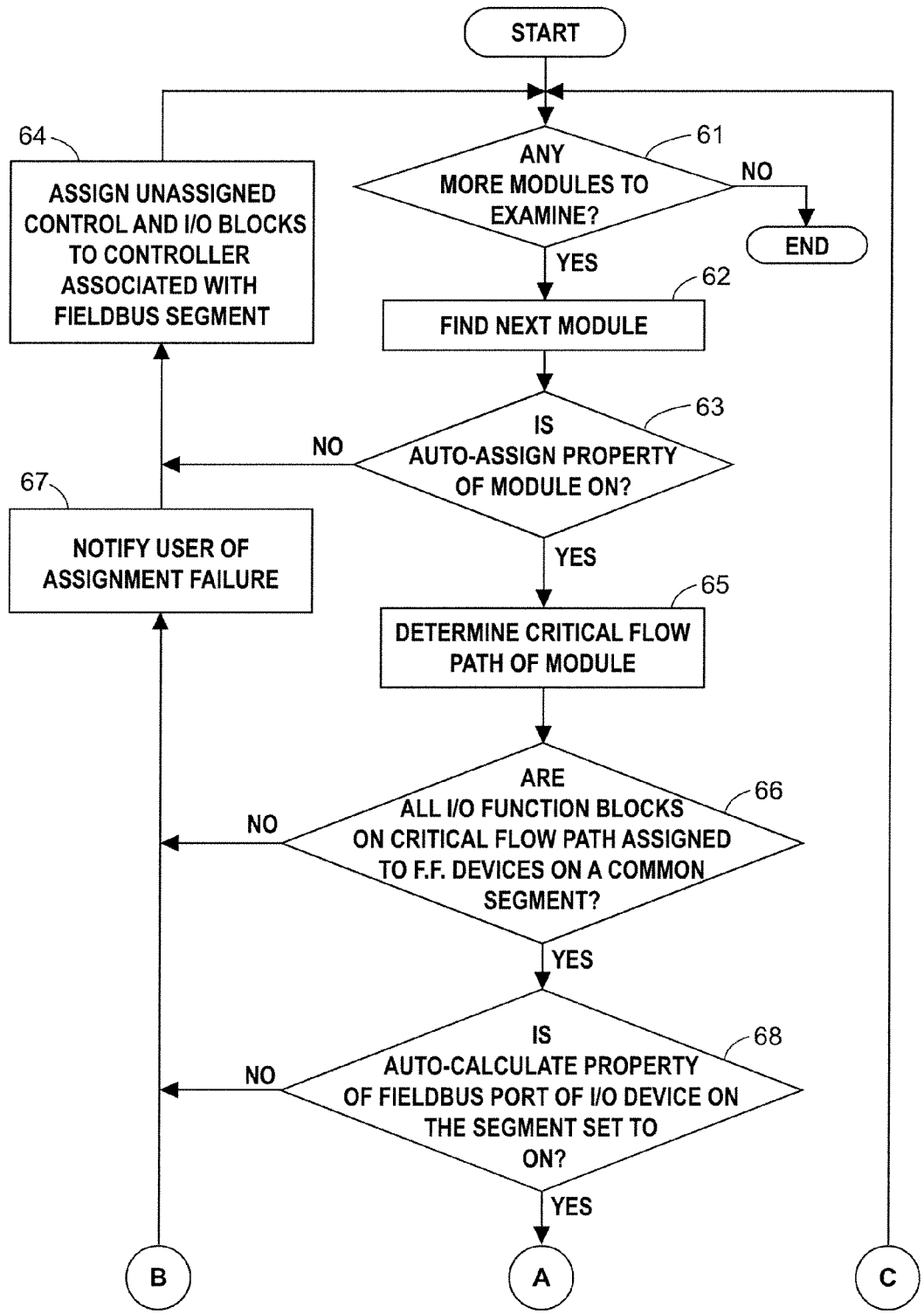
FIGS. 3A and 3B illustrate a flow chart depicting the operation of an exemplary function block assignment routine which determines whether to assign function blocks of a control module to a Fieldbus I/O device on a Fieldbus segment or to a controller device.
Figure 3B:
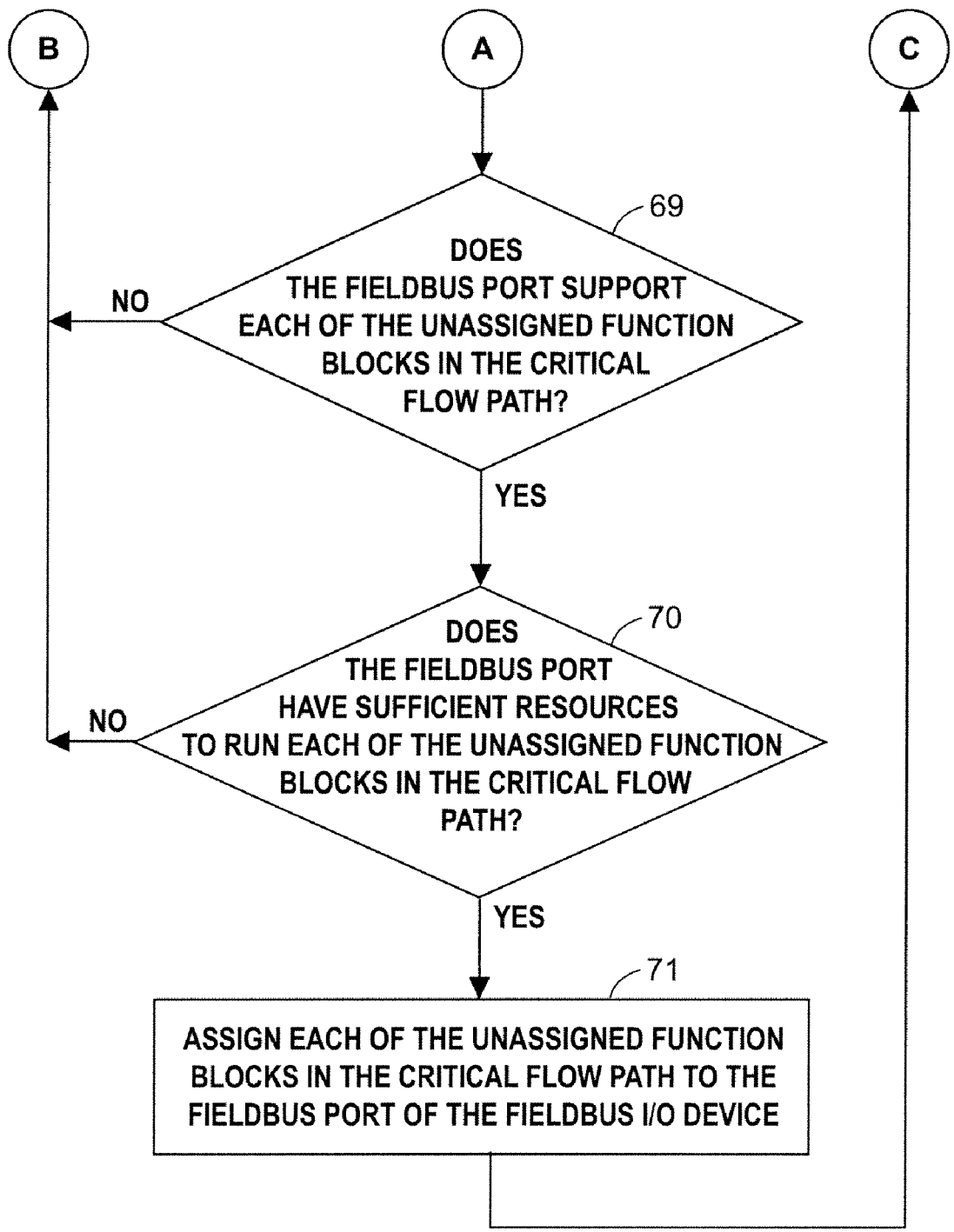

FIG. 3 illustrates a flow chart 60 describing a further example manner in which the routine 42 may operate to automatically assign function blocks of control modules to either the Fieldbus port of a Fieldbus I/O device or to a controller associated with a particular Fieldbus segment. At a block 61, the routine 42 determines if there are any more control modules to examine and, if not, ends. If one or more control modules are still left to be examined for assignment, a block 62 locates the next control module to examine. A block 63 then determines if the auto-assign property for the selected control module is set "on" and, if not, control is provided to a block 64 which operates to assign the unassigned control and input/output function blocks of the control module to the controller, as would normally occur in prior art systems. However, if the block 63 determines that the auto-assign property of the selected control module is set "on," a block 65 determines the critical flow path of the control module. As will be understood from the discussion provided above, the critical flow path includes each component of the forward path(s) though the control module from the input blocks to the output blocks. This critical flow control path can be determined by stepping through the module and identifying each of the function blocks disposed on the path formed by the forward flow links from each of the input blocks to each of the output blocks.

Next, a block 66 determines if each of the input and output function blocks on the critical flow path of the control module are assigned to Fieldbus field devices on a common Fieldbus segment. In an alternative embodiment, the block 66 may determine if at least one input function block and one output function block on the each critical flow path component of the module is assigned to a Fieldbus field device on a common Fieldbus segment. If the input/output blocks are not properly assigned to Fieldbus field devices on a common Fieldbus segment, the routine 42 determines that a complete synchronous assignment of the control module to the Fieldbus segment is not possible, and so will not assign any of the function blocks of that module to the Fieldbus port of the Fieldbus I/O device on the Fieldbus segment. In this case, the routine 42 provides control to a block 67 which notifies the user that the auto-assignment of the control module to the Fieldbus I/O device failed. The block 64 then assigns the unassigned control and input/output function blocks to the controller associated with the Fieldbus segment (such as the controller 57 of FIG. 2) and returns control to the block 61.

If, on the other hand, the block 66 determines that the input/output function blocks of the module are properly assigned to Fieldbus field devices on a common Fieldbus segment, a block 68 then determines if the auto-calculate property of the Fieldbus port of the Fieldbus I/O device on the Fieldbus segment is set to "on," meaning that this I/O device is configured to run or execute function blocks on the Fieldbus segment. If not, the block 67 notifies the user of the assignment failure and provides control to the block 64 for traditional assignment of the function blocks within the control module to the controller.

If, however, the block 68 determines that the auto-calculate property of the Fieldbus port is on, a block 69 determines if the Fieldbus port supports each of the unassigned function blocks in the critical flow path of control module. If even one of the unassigned function blocks in the critical flow path is not supported by the Fieldbus port, then control is provided to the blocks 67 and 64 which notify the user of the assignment failure and perform traditional assignment of the unassigned function blocks to the controller.

On the other hand, if the Fieldbus port supports each of the unassigned function blocks in the critical flow path, a block 70 determines if this port has sufficient resources (capacity) to execute each of the unassigned function blocks in the critical flow path of the control module. If not, control is provided to the blocks 67 and 64 which notify the user of the assignment failure and perform traditional assignment of the unassigned function blocks to the controller. On the other hand, if the Fieldbus port has capacity, a block 71 assigns each of the unassigned function blocks in the critical flow path to the Fieldbus port of the Fieldbus I/O device for execution. At this time, if desired, the block 71 may also determine if any remaining function blocks in the control module (i.e., those not in the critical flow path of the control module) can or should be assigned to the Fieldbus port of the Fieldbus I/O device. In some cases, if all of these blocks can be run in the Fieldbus I/O device, the block 71 may assign these blocks to that device to provide for a control module which executes in a completely synchronous manner on the Fieldbus segment.

Alternatively, the block 71 may operate so that it does not assign any of the remaining function blocks to the I/O device to conserve the resources of this device for other control modules running on the segment. If desired, the block 71 may operate in either manner based on a user selectable setting. In any event, after completing the assignment of the function blocks of the current control module, control is returned to the block 61 for processing of other control modules.

Of course, the flow chart 60 of FIG. 3 is merely exemplary, and the routine 42 may operate in other manners as well. Moreover, if desired, certain ones of the blocks in the flow chart 60 can be rearranged in order. For example, the blocks 68, 69 and 70 may be placed earlier or later in the routine 60, may be rearranged in order and, in some cases, may be implemented prior to determining the critical flow path of the control module.

In another example, an algorithm for automatic block assignment is summarized below:

```
Find synchronized control path
  synchronizeList = new List
  Foreach fieldbus input block in module
    blockList = block. BlockFindSynchronisedControlPath( )
      append blockList to synchronizeList
  End
  loopExecutionIsSynchronised = false // Flag on module indicating
                                  possible synchronized execution
  loopExecutionOccursInH1Card = false // Flag on module indicating
                                  possible execution of blocks in
                                  H1 card
  For each block in synchroniseList
    loopExecutionIsSynchronised = true
    If (block is not a Fieldbus block)
      Mark block as potentially executing in the H1 card
      loopExecutionOccursInH1Card = true
    Endif
  End
End
BlockFindSynchronisedControlPath( )
  synchronizeList = new List
  If (thisBlock is a fieldbus output block)
    Append thisBlock to the synchroniseList
  ElseIf (thisBlock can be assigned to the HI port OR thisBlock is a
      Fieldbus block)
    Foreach output connector on thisBlock
      For each wire on the connector
        If the wire is not a feedback wire AND
        the wire connects values of the exactly the same data type
        AND the source connector is a predefined connector AND
        the destination connector is a predefined connector
          blockList = destinationBlock. BlockFind
            SynchronisedControlPath( )
            If (blockList is not empty)
              append blockList to synchroniseList
              append thisBlock to synchroniseList
            Endif
        Endif
      End
    End
  Endif
  Return synchroniseList
End
```

Figure 4:
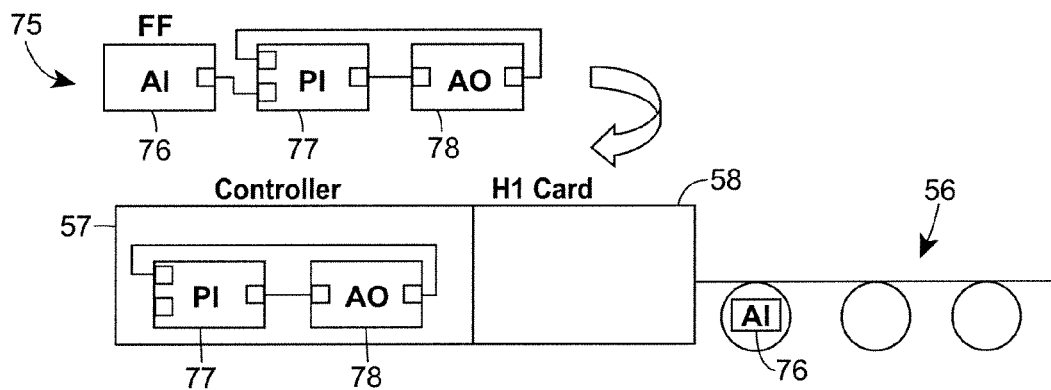
FIG. 4 is a block diagram illustrating a traditional control module in which one or more control function blocks are not assigned to an I/O device on a Fieldbus segment but are, instead, assigned to the controller, according to a disclosed method of assigning function blocks.

FIGS. 4-9 illustrate example control modules and indicate the manner in which the routine 42, based on the principles set out above, assigns the control function blocks of these modules to either a controller or to a Fieldbus port of a Fieldbus I/O device connected to a Fieldbus segment. In particular, FIG. 4 illustrates a control module 75 having an AI function block 76 linked to a PI function block 77 which is linked in both the forward and the feedback directions to an AO function block 78. As is known and common, the AI function block 76 obtains a measurement or other input signal and provides this signal via the indicated link to the PI function block 77. The PI function block 77 is a control function block which performs proportional/integral control calculations to produce a control signal, which is provided to the AO function block 78. The AO function block 78, in turn, operates to use the control signal to perform a physical function in the plant, such as opening or closing a valve, or changing some other setting in a physical device within the plant to perform a control action. The AO function block 78 also provides a feedback measurement, for example, of the current valve position, to the PI function block 77 for use by the PI function block 77 in developing the control signal.

The module 75 of FIG. 4 is set up in a traditional Fieldbus measurement loop, where the AI function block 76 is scheduled to operate or be located in a Fieldbus measurement device, such as a Fieldbus transmitter device. This scheduling is indicated by the "FF" above the AI function block 76. However, the AO function block 78 is not scheduled or assigned to a Fieldbus device at all or at least not to one in the same Fieldbus segment as the AI function block 76. As a result, the routine 42 will, when performing auto-assignment, place both the PI function block 77 and the AO function block 78 into the controller 57 associated with the Fieldbus segment, because all of the function blocks in the critical flow path of the module 75 cannot be placed into the Fieldbus I/O card 58 and the FF field devices on the Fieldbus segment 56. This assignment functionality is indicated by the arrow in FIG. 4.

Figure 5:
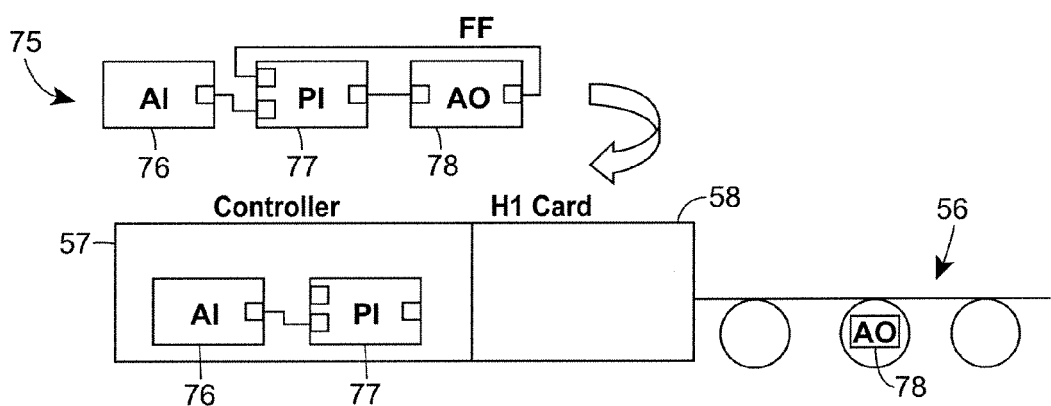
FIG. 5 is a block diagram illustrating a traditional control module in which one or more control function blocks are not assigned to an I/O device on a Fieldbus segment but are, instead, assigned to the controller, according to a disclosed method of assigning function blocks.

FIG. 5 illustrates the same control module 75 shown in FIG. 4, but set up in a traditional Fieldbus actuator loop. Here, the AO function block 78 is located in a Fieldbus device (e.g., an actuator) on a Fieldbus segment (as indicated by the "FF" above this block), but the AI function block 76 is not associated with a Fieldbus device on the same Fieldbus segment as the AO function block 78. Here again, because both an input and an output block (in this case the input block) in the critical flow path of the control module 75 are not assigned to Fieldbus devices on the same Fieldbus segment, the routine 42 assigns both the AI function block 76 and the PI function block 77 to the controller 57.

Figure 6:
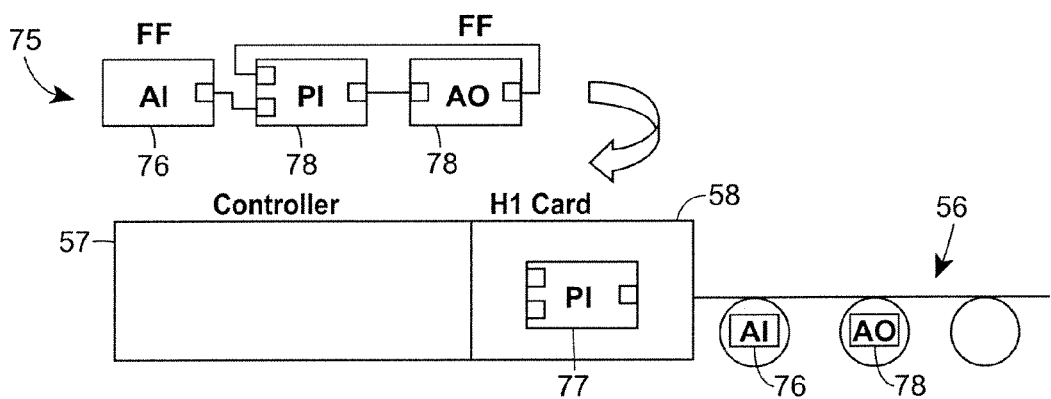
FIG. 6 is a block diagram illustrating a traditional control module in which a control function block is assigned to an I/O device on a Fieldbus segment according to a disclosed method of assigning function blocks.

However, FIG. 6 illustrates the control module 75 set up in a configuration in which both the measurement and the actuation is performed by Fieldbus devices on a common Fieldbus segment. This operation is indicated by the "FF" above each of the input and output function blocks 76 and 78. Here, because each of the input and output function blocks of the control module 75 are assigned to Fieldbus devices on a common Fieldbus segment, the routine 42 will assign the PI function block 77 to the Fieldbus I/O device 58 (and more particularly to the Fieldbus port 59 of that device) for synchronous execution within the Fieldbus segment 56.

Figure 7:
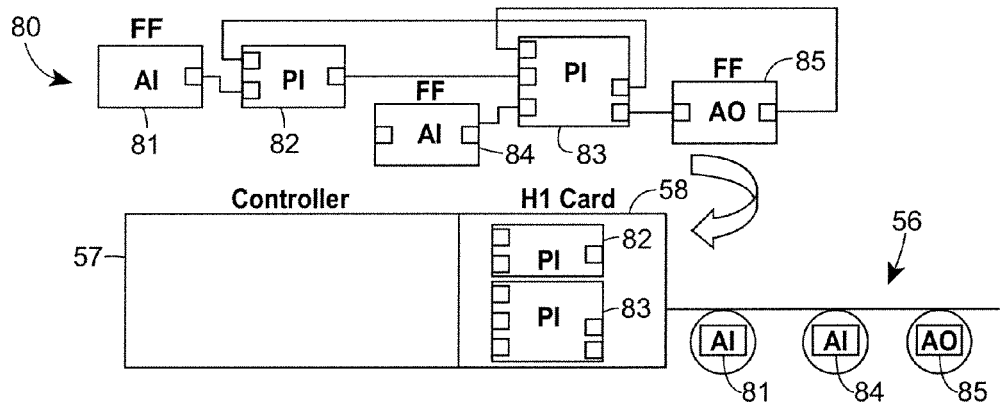
FIG. 7 is a block diagram illustrating a control module in which multiple control function blocks are assigned to an I/O device on a Fieldbus segment according to a disclosed method of assigning function blocks.

FIG. 7 illustrates another control module 80 implementing a cascade type of control loop. As illustrated in FIG. 7, the control module 80 includes a first stage having an AI function block 81 connected to a PI control function block 82. The output of the PI control function block 82 is provided as a first input to a second stage PI function block 83 along with an additional input from a second stage AI function block 84. The second stage PI function block 83 uses the two inputs along with a feedback signal to produce a control signal, which is provided to an AO function block 85.

As indicated by the placement of the "FFs" in FIG. 7, each of the AI function blocks 81 and 84 and the AO function block 85 is assigned to a Fieldbus device on a common Fieldbus segment 56. As a result, the routine 42 operates to assign the PI function blocks 82 and 83 to the Fieldbus I/O device 58 for execution, to provide synchronous execution of the control module 80 on the Fieldbus segment 56.

Figure 8:
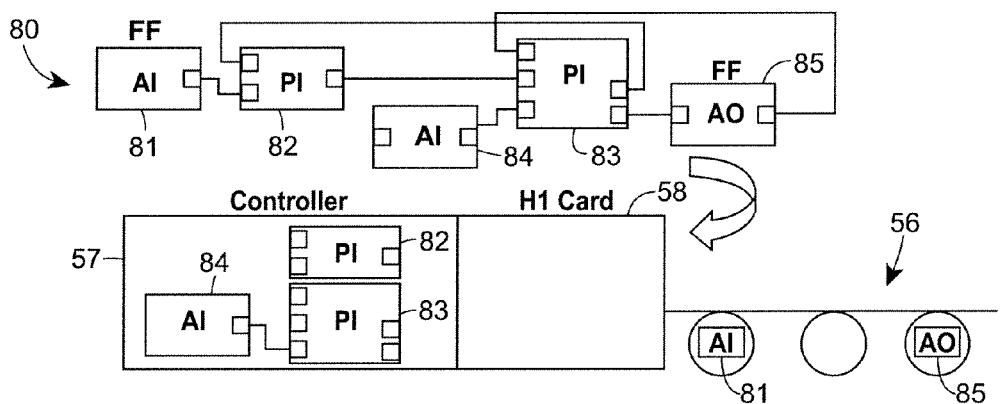
FIG. 8 is a block diagram illustrating a control module in which control and input/output function blocks are not assigned to an I/O device on a Fieldbus segment but are, instead, assigned to the controller, according to a disclosed method of assigning function blocks.

FIG. 8 illustrates the module 80 of FIG. 7, except that in this case, the second stage AI function block 84 is not assigned to a Fieldbus device on the Fieldbus segment 56. Because the critical flow path of the module 80 includes the inputs and outputs of both stages of the cascade loop, and because one of the input blocks in the critical flow path is not assigned to or associated with a Fieldbus device on the same Fieldbus segment as the other input and output blocks of the module 80, the routine 42 will assign all of the unassigned blocks in the critical flow path (i.e., the AI block 84 and the PI control blocks 82 and 83) to the controller 57 because synchronous execution of the control module 80 is not possible even if the PI blocks 82 and 83 were assigned to the Fieldbus I/O device 58.

Figure 9:
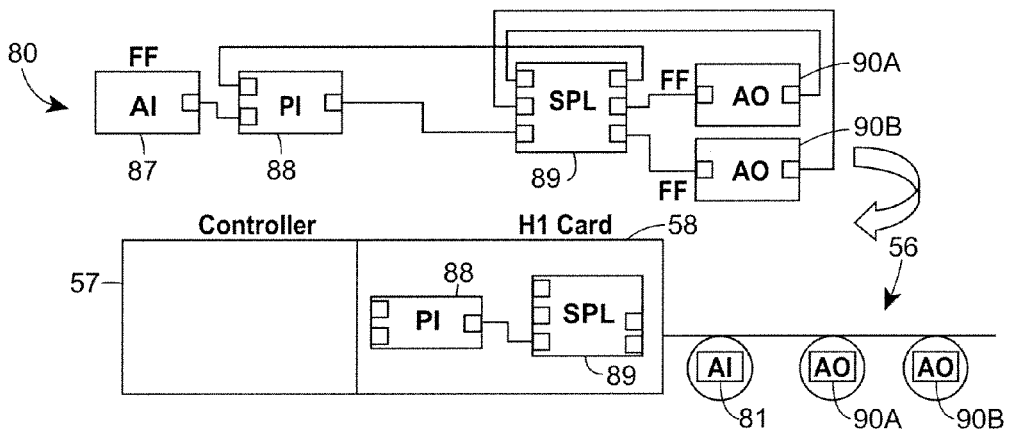
FIG. 9 is a block diagram illustrating a control module in which multiple control function blocks are assigned to an I/O device on a Fieldbus segment according to a disclosed method of assigning function blocks.

FIG. 9 illustrates another control module 86 having a split range output configuration. The control module 86 includes an analog input block 87 coupled to a PI control block 88 which provides an output to a split range block (SPL) 89 which, in turn, is coupled to two parallel connected AO function blocks 90A and 90B. Here, because each of the AI function block 87, and the AO function blocks 90A and 90B are assigned to Fieldbus devices on a common Fieldbus segment, the routine 42 assigns the PI function block 88 and the SPL function block 89 to the Fieldbus I/O device 58 for execution, to provide for synchronous execution of the module 86 on the Fieldbus segment 56. This operation, of course, assumes that the device 58 (and more particularly, the Fieldbus port 59 of this device) supports the PI and SPL block functionality and has sufficient resources for executing both of these blocks. However, this example illustrates that multiple blocks (e.g., control blocks) which are connected in series in the critical flow path of the module between input and output function blocks of a module can be assigned to the Fieldbus I/O device.

In any event, after the routine 42 (FIG. 1) operates to assign function blocks of each of the created control modules to the devices associated with a Fieldbus segment, as discussed above, the routine 44 may be used to automatically generate a communication and execution schedule for a Fieldbus segment based on the assignments made by the routine 42. Generally speaking, the routine 44 will develop a communication and execution schedule for a Fieldbus segment by identifying each of the function blocks to run on that segment and creating a macrocycle for that segment specifying the offset times for communication and execution for each of the function blocks within the macrocycle. Of course, the routine 44 may create a macrocycle that accommodates function blocks from multiple different control modules.

As will be understood, the use of the routine 40 provides a unified environment for control definition and viewing at a user interface device. In particular, with the routine 40, it is possible to define control without considering where the control blocks will be assigned to execute (i.e., in the controller, the Fieldbus interface card, or in Fieldbus devices on a particular Fieldbus segment). This feature is possible because most of the function blocks that can run in the controller are also allowed to execute in the Fieldbus interface card. Thus, a user does not have to worry about whether the Fieldbus device he or she selects for measurement or actuation supports the function blocks that are needed to perform a control or monitoring application, as any blocks that are not supported in the Fieldbus field devices can be assigned to the Fieldbus interface card and still operate synchronously on the Fieldbus segment.

In one embodiment, the routine 44 may automatically calculate the schedule to be used on the Fieldbus segment based on the assignment of function blocks to this segment and, in doing so, may automatically provide support for multiple different execution rates of function blocks on the Fieldbus segment. For example, when multiple control loops (or modules) are executed on the same Fieldbus segment, the same execution rate may not be appropriate for each of the loops. Likewise, it may be desirable in some instances to have function blocks in a single control loop execute at different rates. To allow a user to selectively change the relative execution rate of some control modules or of some function blocks within a control module on a Fieldbus segment, the user may configure the modules (or function blocks) with different execution rates. Alternatively, an execution multiplier may be provided for blocks assigned to execute in the Fieldbus port or in a Fieldbus device to specify relative execution rates for different function blocks on the same segment.

Figure 10:
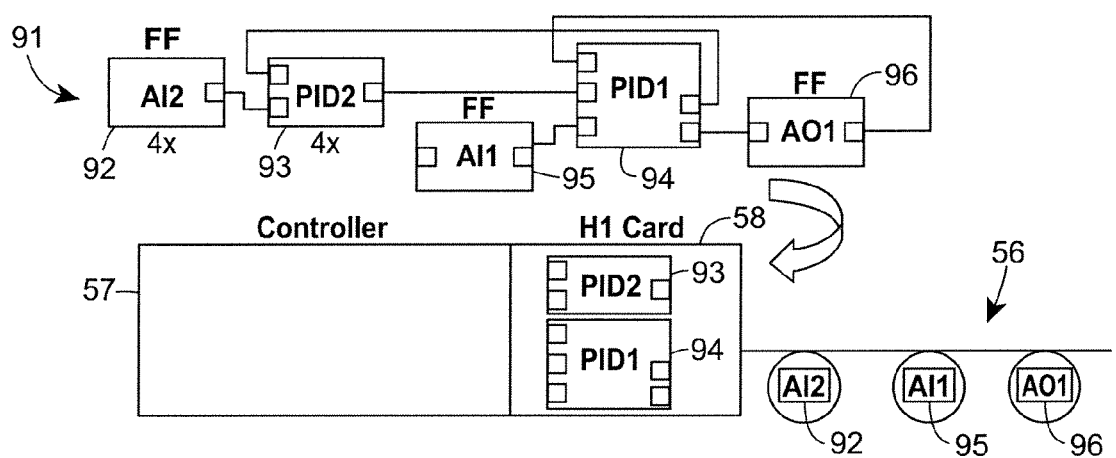
FIG. 10 is a block diagram illustrating a control module in which multiple control function blocks of the control module are assigned to an I/O device on a Fieldbus segment according to disclosed a method of assigning function blocks, wherein some of the function blocks are executed at a faster rate than others of the function blocks on the Fieldbus segment.

As an example, FIG. 10 illustrates a control module 91 implementing a cascade control loop including a first stage having an AI function block 92 (labeled AI2) connected to a PID control function block 93 (labeled PID2). The output of the PID control function block 93 is provided as a first input to a second stage PID function block 94 (labeled PID1) along with an additional input from a second stage AI function block 95 (labeled AI1). The second stage PID function block 94 uses the two inputs along with a feedback signal to produce a control signal, which is provided to an AO function block 96. As illustrated in FIG. 10, because the input and output function blocks 92, 95 and 96 are assigned to Fieldbus devices on the same segment 56, the routine 42 will assign the PID function blocks 93 and 94 to the Fieldbus port 59 of the Fieldbus I/O device 58 to provide for synchronous execution of the module 91 on the segment 56.

However, as indicated in FIG. 10, the AI function block 92 and the PID function block 93 have a 4× multiplier associated therewith (which multiplier may be specified by a configuration engineer or other user during the configuration process). The 4× multiplier indication for these blocks specifies that these blocks should run or execute at a rate four times slower than that of the other blocks in the control module 91. In particular, because the primary (first) stage of the cascade loop needs to execute four times slower than the secondary stage of that loop, the AI and PID blocks 92 and 93 of the primary stage are configured with a 4× execution multiplier. The routine 44, when producing the schedule for the Fieldbus segment 56, will take into account that the AI and PID blocks 92 and 93 of the cascade loop are to execute four times slower than the other function blocks, and in doing so, the routine 44 will develop a macrocycle (i.e., a function block execution schedule) that accommodates this variation in the execution rate. In particular, within a single macrocycle for the Fieldbus segment, the function blocks 92 and 93 (assigned with the 4× multiplier) will only be scheduled once, while all of the other function blocks will be assigned to execute four times within the macrocycle.

Figure 11:
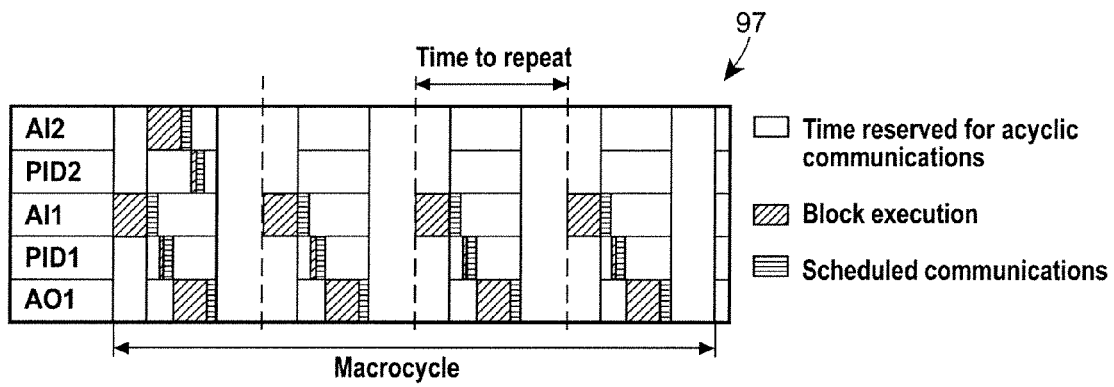
FIG. 11 is a diagram of a macrocycle for a Fieldbus segment, illustrating the operation of multiple function blocks of the control module of FIG. 10, wherein some of the function blocks operate or execute at a faster rate on the Fieldbus segment than others of the function blocks.

FIG. 11 illustrates an example resulting macrocycle 97 that may be produced by the routine 44 for the segment 56 when the segment 56 runs only the control module 91 of FIG. 10. Here, it will be seen that the macrocycle 97 is divided into four equal time periods (with one of the time periods being indicated by the "time to repeat" arrow). Each of the AI block 95, the PID block 94 and the AO block 96 of the secondary stage is scheduled to execute during each of the times to repeat (i.e., four times during the macrocycle 97), while the AI block 92 and the PID block 93 are scheduled to execute only once during the macrocycle 97. Thus, the AI and PID blocks 92 and 93 of the primary stage execute at a rate four times slower than the blocks 94-96 of the secondary stage.

When two blocks of a module are executed at different rates, there is typically no need to synchronize their execution with one another other, and thus the execution times of blocks that are run at different rates may generally overlap, so long as these blocks are executed in different devices on the Fieldbus segment. In many cases this feature allows the communications associated with the slower executing blocks to be scheduled in such a way as to essentially add no time delay to the faster executing blocks, as illustrated by the example macrocycle of FIG. 11 (where the time to repeat is the minimum time needed to perform the secondary stage of the control module 91).

If desired, the following procedure may be used by the routine 44 in determining the time to repeat and then the macrocycle of a Fieldbus segment, to accommodate function blocks with different execution rates on the same Fieldbus segment. First, the routine 44 may calculate the time to repeat (or repeat time) based on the execution rate of the function blocks that have not been assigned an execution multiplier (i.e., the function blocks with the fastest execution rate), with time added for support of acyclic communications. This will be the proposed repeat time of the macrocycle. The routine 44 can then order the block execution times for a single execution of these blocks (i.e., the fastest running blocks) during each repeat time based on the signal flow order of these blocks within their respective control module, and can take maximum advantage of parallel execution of function blocks where possible. Next, the routine 44 can calculate the macrocycle as: Macrocycle=repeat time times the largest configured execution multiplier.

Next the routine 44 can layer communications associated with the remaining blocks (i.e., the blocks with an execution multiplier) into the available times over the entire macrocycle. If the routine 44 is unable to fit all of the communications of the other blocks within the macrocycle, then the routine 44 can expand the repeat time (e.g., by 20 percent) to allow more communications to be scheduled within the macrocycle. The routine 44 can then repeat the process of adding in the communications for the blocks having slower execution rates in the new macrocycle, and expanding the repeat time if necessary, until all of the communications for all of the function blocks on the segment can be scheduled into the resulting macrocycle.

Figure 12:
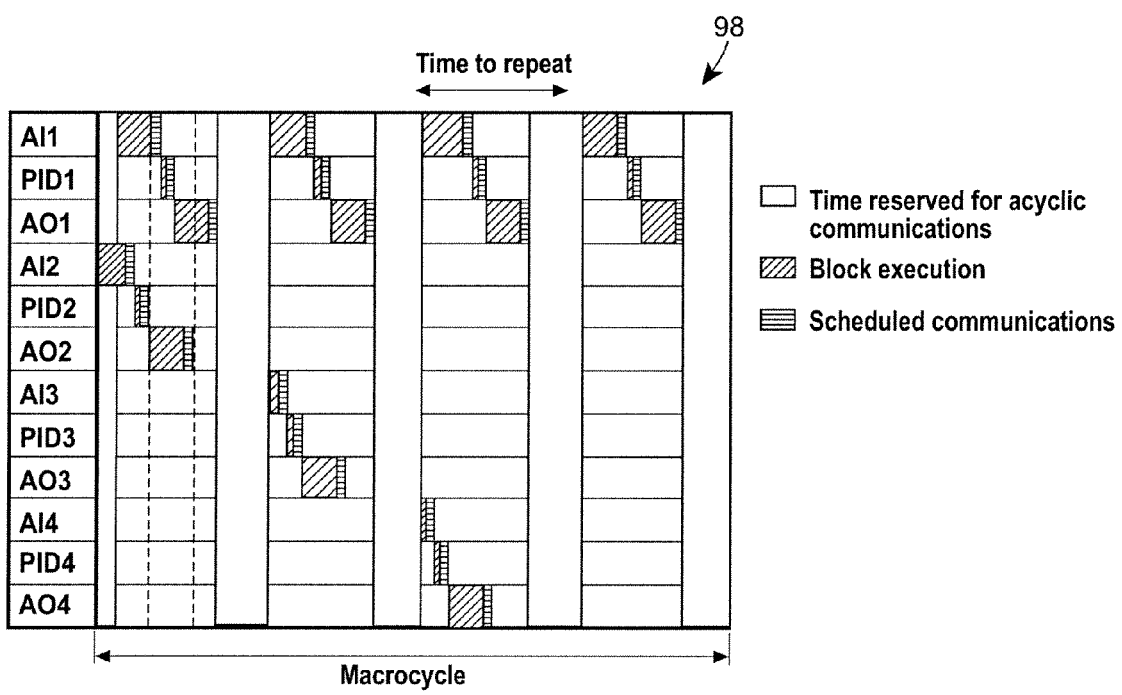
FIG. 12 is a diagram of a macrocycle for a Fieldbus segment illustrating the operation of function blocks associated with multiple different control modules operating on the Fieldbus segment, wherein some of the function blocks are executed at a different rate than others of the function blocks.

FIG. 12 illustrates another macrocycle 98 in which multiple modules are scheduled for execution on the same Fieldbus segment. In this example, four simple PID control modules (each having a single AI, AO and PID function block) have been configured on a Fieldbus segment. Here, it is assumed that the AI and AO blocks of each control module are located in Fieldbus field devices on the segment and the PID blocks are automatically assigned to the Fieldbus port of the Fieldbus I/O device of the Fieldbus segment. However, one of the modules (the one that contains the AI1, PID1 and AO1 blocks) may control, for example, liquid pressure and may need to execute as fast as possible as compared with the other control modules. The other modules in this example are less critical and can execute at a rate four times slower than the execution rate of the faster module. Using the above procedure, a calculated macrocycle 98 of a communication and execution schedule for the segment is shown in FIG. 12. Here, the first module (with the AI1, PID1 and AO1 function blocks) executes four times during the macrocycle 98 while the other modules execute only once during the macrocycle 98. To implement this feature, the first module is scheduled for execution during each of four repeat times (due to the fact that this module is to run four times faster than the other modules) and the other modules are then scheduled into the remaining times within the resulting macrocycle 98.

Generally speaking, the routine 44 may operate to enable a user to select one of two scheduling techniques for a Fieldbus segment, with the specified scheduling technique being selected by setting an optimal auto-calculate property on the Fieldbus port. The two scheduling techniques include traditional scheduling which allows a single block execution per macrocycle, and an optimal auto-calculate schedule macrocycle, which supports one macro-schedule with sub-schedules. The period of the fastest sub-schedule is set by combination of the fastest module execution time and function block multipliers. In this case, each sub-schedule can have its own period. Moreover, the macrocycle will be based on module execution times that are configured for the port (legacy), or the minimum time if the configured time is not achievable. Sub-schedules that support some blocks executing more slowly will be based on the configured execution multiplier and the port macrocycle time.

If desired, module execution times can be mapped into particular Fieldbus segment times using multipliers. In general, the base segment time can be any number, such as 100, 125, 128, or multiples thereof. The constraints are basically that the sub-schedule times should be multiples of two, and that the slowest supported sub-schedule is a maximum of eight times slower than the fastest sub-schedule, although other constraints could be used instead or in addition to these constraints. If desired, the auto-calculate schedule feature supports execution multipliers of 1, 2, 4, and 8. Here, an indication of 4× slower means that the macro-schedule will be divided into 4 segments, an indication of 8× slower means that the macro-schedule will be divided into eight segments, etc.

Of course, more than two execution rates can be supported. In this case, the fastest execution rate will be scheduled first with a repeat time that is repeated a number of times based on the multiplier used by the slowest executing blocks. Thus, if there are blocks with no multiplier, and blocks with 2×, 4× and 8× multipliers, then the sub-schedule for the fastest executing blocks (with no multiplier) will be repeated eight times during the macrocycle. The blocks with the next fastest execution rate (e.g., the 2× blocks) will then be scheduled over the remaining times within the macrocycle created using the first sub-schedule. The repeat time of this second sub-schedule will be based on the ratio of the multiplier of these blocks to the multiplier of the slowest executing blocks (i.e., in this case 2×/8× which equals four). If these blocks cannot be scheduled into the macrocycle created with the first sub-schedule, the repeat time of the first sub-schedule is increased, and the process is repeated until the next fastest executing blocks can be scheduled into the resulting macrocycle. This process then repeats for each of the different rates (or sub-schedules) until all of the blocks are able to be scheduled into the resulting macrocycle.

Of course, both the module scan rate and the function block multipliers are used in the schedule. There are cases, for example in a cascade loop, where using the function block multiplier is important. The multiplier is determined by the relative execution rates of the modules. In determining the macro-schedule and sub-schedules, the macro-schedule is set by the fastest loop and then a multiplier (up to 8×) is used for other modules. When the sub-schedule execution rate cannot be achieved, the user can be warned of the condition. If desired, however, the schedule will still be downloaded. Users cannot over-ride the segment execution rate (the exception, of course, being that the user can over-ride the entire schedule).

Generally speaking, one manner of configuring and supporting multiple different block execution rates on a Fieldbus segment is described in more detail with respect to FIGS. 13-35. In particular, as described above, known techniques used to generate schedules for executing function blocks by process controllers and field devices in a process control system typically involve scheduling all function blocks associated with the same communication bus (e.g., a communication bus communicatively coupling the field devices and controllers assigned to execute the function blocks) to execute at the rate of the slowest-executing function block. Therefore, known techniques require increasing the block execution periods (e.g., slowing the function block execution rates) of relatively faster executing function blocks to match the block execution periods of the slowest executing function block and, thus, the smaller execution periods (i.e., faster execution rates) of some function blocks cannot be advantageously used to implement a process control system.

Unlike some known techniques used to implement schedules for executing function blocks, the example methods and apparatus described below may be used to generate schedules for executing function blocks based on their respective function block execution periods without having to substantially increase the function block execution periods to match the function block execution periods of other function blocks associated with (e.g., communication via) the same communication bus. Executing some function blocks faster than other, slower function blocks associated with the same communication bus, may be advantageous. For example, if a pressure measurement function block and a valve control function block are associated with the same communication bus, it may be advantageous to execute the pressure measurement function block using a shorter period (e.g., at a faster rate) while executing the valve control function block using a shorter period may not be of much advantage. Accordingly, the function block execution period of a pressure measurement function block may be shorter than the function block execution period of the valve control function block. Using the known techniques to schedule the function block executions would require the pressure measurement function block to execute using the same, slower period of the valve control function block. As a result, the pressure measurement function block may fail to capture higher-frequency pressure variations in a process. In contrast, using the example methods and apparatus described herein to generate schedules for executing function blocks using their respective block execution rates enables the pressure measurement function block to be executed using a shorter period (e.g., at a faster execution rate) than the valve control function block. Thus, the pressure measurement function block can acquire pressure measurements more frequently (e.g., at a relatively high resolution) to, for example, capture higher-frequency pressure variations (e.g., blips, spikes, or other relatively high-frequency changes in pressure) that would otherwise not be captured or processed using known function block scheduling techniques.

Using block execution rates of respective function blocks to generate schedules as described herein enables scheduling a plurality of process loops to be executed by field devices or controllers communicatively coupled to the same communication bus while ensuring that the process loops can be executed at their respective loop execution periods. That is, process loops associated with a shorter loop execution period (e.g., a faster loop execution rate) can be executed relatively faster than process loops having longer loop execution periods (e.g., slower loop execution rates). In this manner, unlike some known methods used to generate schedules for executing function blocks, loop execution periods of all of the loops associated with the same communication bus do not have to be made equal to the longest loop execution.

Figure 13:
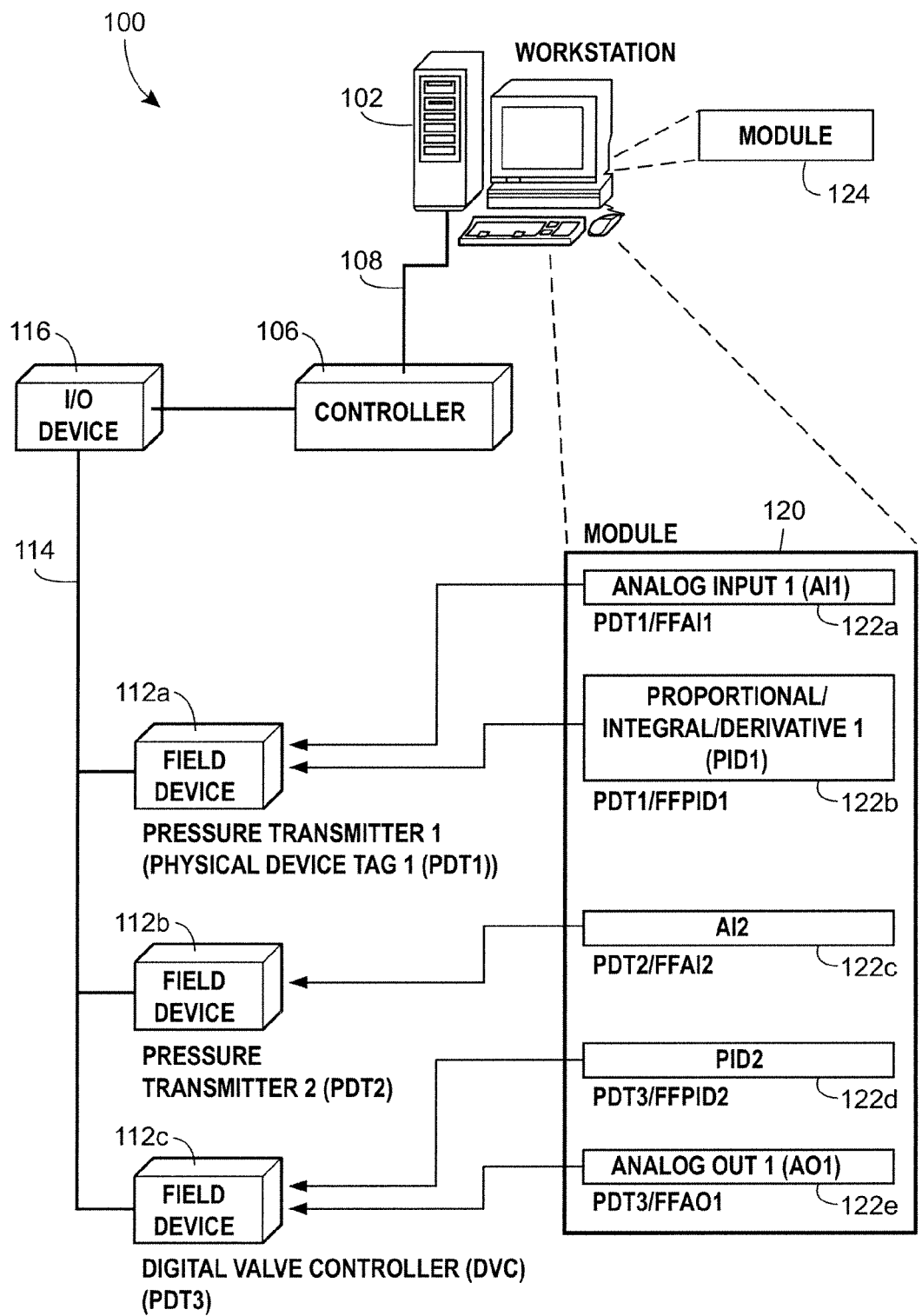
FIG. 13 is a block diagram illustrating another example process control system having a controller coupled to a Fieldbus segment.

Now turning to FIG. 13, an example process control system 100 that may be used to implement the example methods and apparatus described herein includes a workstation 102 (e.g., an application station, an operator station, etc.), and a controller 106, both of which may be communicatively coupled via a bus or local area network (LAN) 108, which is commonly referred to as an application control network (ACN). The LAN 108 may be implemented using any desired communication medium and protocol. For example, the LAN 108 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the workstation 102 may be used to provide redundant communication paths between the workstation 102 and a respective similar workstation (not shown).

The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 106 to communicate with other devices or systems using any desired communication media (e.g., wireless, hardwired, etc.) and protocols (e.g., HTTP, SOAP, etc.). The workstation 102 may be implemented using any suitable computer system or processing system (e.g., the processor system 2310 of FIG. 35). For example, the workstation 102 could be implemented using a single processor personal computer, single or multi-processor workstations, etc.

The controller 106 may perform one or more process control routines that have been generated by a system engineer or other system operator using the workstation 102 or any workstation and which have been downloaded to and instantiated in the controller 106. The controller 106 may be, for example, a DeltaV™ controller sold by Fisher-Rosemount Systems, Inc. and Emerson Process Management™. However, any other controller could be used instead. Further, while only one controller is shown in FIG. 13, additional controllers of any desired type or combination of types can be coupled to the LAN 108.

The controller 106 may be coupled to a plurality of field devices 112a-c via a digital data bus 114 and an input/output (I/O) device 116. During execution of a process control routine, the controller 106 may exchange information (e.g., commands, configuration information, measurement information, status information, etc.) with the field devices 112a-c. For example, the controller 106 may be provided with a process control routine that, when executed by the controller 106, causes the controller 106 to send commands to the field devices 112a-c that cause the field devices 112a-c to perform specified operations (e.g., perform a measurement, open/close a valve, etc.) and/or to communicate information (e.g., measurement data) via the digital data bus 114.

To identify the field devices 112a-c within the process control system 100, each of the field devices 112a-c is provided with (e.g., stores) a unique physical device tag (PDT). For example, the physical device tag of the first field device 112a is PDT1, the physical device tag of the second field device 112b is PDT2, and the physical device tag of the third field device 112c is PDT3. In the illustrated example, the field devices 112a-c include a first pressure transmitter 112a, a second pressure transmitter 112b, and a digital valve controller (DVC) 112c. However, any other types of field devices (e.g., valves, actuators, sensors, etc.) may be used in connection with the example methods and apparatus described herein.

In the illustrated example, the field devices 112a-c are Fieldbus compliant devices configured to communicate via the digital data bus 114 using the well-known Fieldbus protocol. In accordance with the Fieldbus standard, the digital data bus 114 is a digital, two-way, multi-drop communication bus configured to be communicatively coupled to measurement and control devices (e.g., the field devices 112a-c). The field devices 112a-c are shown communicatively coupled to the digital data bus 114 in a multi-drop configuration. The digital data bus 114 or similar data buses may alternatively be used to communicatively couple field devices to the I/O device 116 using a point-to-point configuration in which one field device is afforded exclusive use of a digital data bus to communicate with the I/O device 116. In alternative example implementations, the methods and apparatus may be used in connection with other types of field devices (e.g., Profibus or HART compliant devices that communicate via the data bus 114 using the well-known Profibus and HART communication protocols), which may or may not include Fieldbus-compliant devices. The digital data bus 114 is also referred to herein as a segment. A segment is a Fieldbus term that describes a physical bus that is terminated in its characteristic impedance. In the illustrated example of FIG. 13, the digital data bus 114 forms a segment. The example methods and apparatus described herein may be implemented in connection with a single segment (e.g., the digital data bus 114) or two or more segments (e.g., the digital data bus 114 and one or more other digital data buses) linked using repeaters to form a longer logical bus.

In the illustrated example, the I/O device 116 is implemented using an I/O subsystem interface that enables connecting the controller 106 and the field devices 112a-c to other field devices, which may use the Fieldbus protocol or other types of communication protocols (e.g., Profibus protocol, HART protocol, etc.). For example, the I/O device 116 may include one or more gateways that translate between the Fieldbus protocol and other communication protocols. Additional I/O devices (similar or identical to the I/O device 116) may be coupled to the controller 106 to enable additional groups of field devices to communicate with the controller 106.

The example process control system 100 is provided to illustrate one type of system within which the example methods and apparatus described in greater detail below may be advantageously employed. However, the example methods and apparatus described herein may, if desired, be advantageously employed in other systems of greater or less complexity than the example process control system 100 shown in FIG. 13 and/or systems that are used in connection with process control activities, enterprise management activities, communication activities, etc.

In the illustrated example of FIG. 13, a module 120 is configured at the workstation 102 to define a process control routine to be executed by the controller 106 and/or the field devices 112a-c. The module 120 includes a plurality of function blocks 122a-e that define functions to be performed by the field devices 112a-c to implement the process control routine. The functions may cause the field devices 112a-c to acquire measurement values (e.g., pressure values, temperature values, flow values, voltage values, current values, etc.), perform algorithms or calculations (e.g., integrations, derivatives, additions, subtractions, etc.), control instrumentation (e.g., opening/closing valves, furnace adjustments, boiler adjustments, etc.), or to perform any other functions. In the illustrated example, the field devices 112a-c store and execute functions defined by respective ones of the function blocks 122a-e in the form of machine executable instructions. However, in other example implementations, instead of or in addition to one or more of the function blocks 122a-e, the module 120 may be provided with function blocks representing functions that are executed by the controller 106 instead of one of the field devices 112a-c.

The workstation 102 may also be used to configure another module 124 having one or more other function blocks (not shown) executed by the field devices 112a-c and/or the controller 106. Although two modules (the modules 120 and 124) are shown, more modules may be configured at the workstation 102 having additional function blocks to be executed by the controller 106 and/or the field devices 112a-c. The other module(s) may be used to implement other process control routines and/or to implement a process control routine in connection with the modules 120 and 124.

In the illustrated example, the function blocks 122a-e include a first analog input (AI1) function block 122a, a first proportional/integral/derivative (PID1) function block 122b, a second analog input (AI2) function block 122c, a PID2 function block 122d, and an analog output (AO1) function block 122e. The AI1 function block 122a and the PID1 function block 122b define functions to be executed by the field device 112a. The AI2 function block 122c defines a function to be executed by the field device 112b. The PID2 function block 122d and the AO1 function block 122e define functions to be executed by the field device 112c. In alternative example implementations, any other types of functions blocks can be used instead of or in addition to the function blocks 122a-e.

Figure 14:
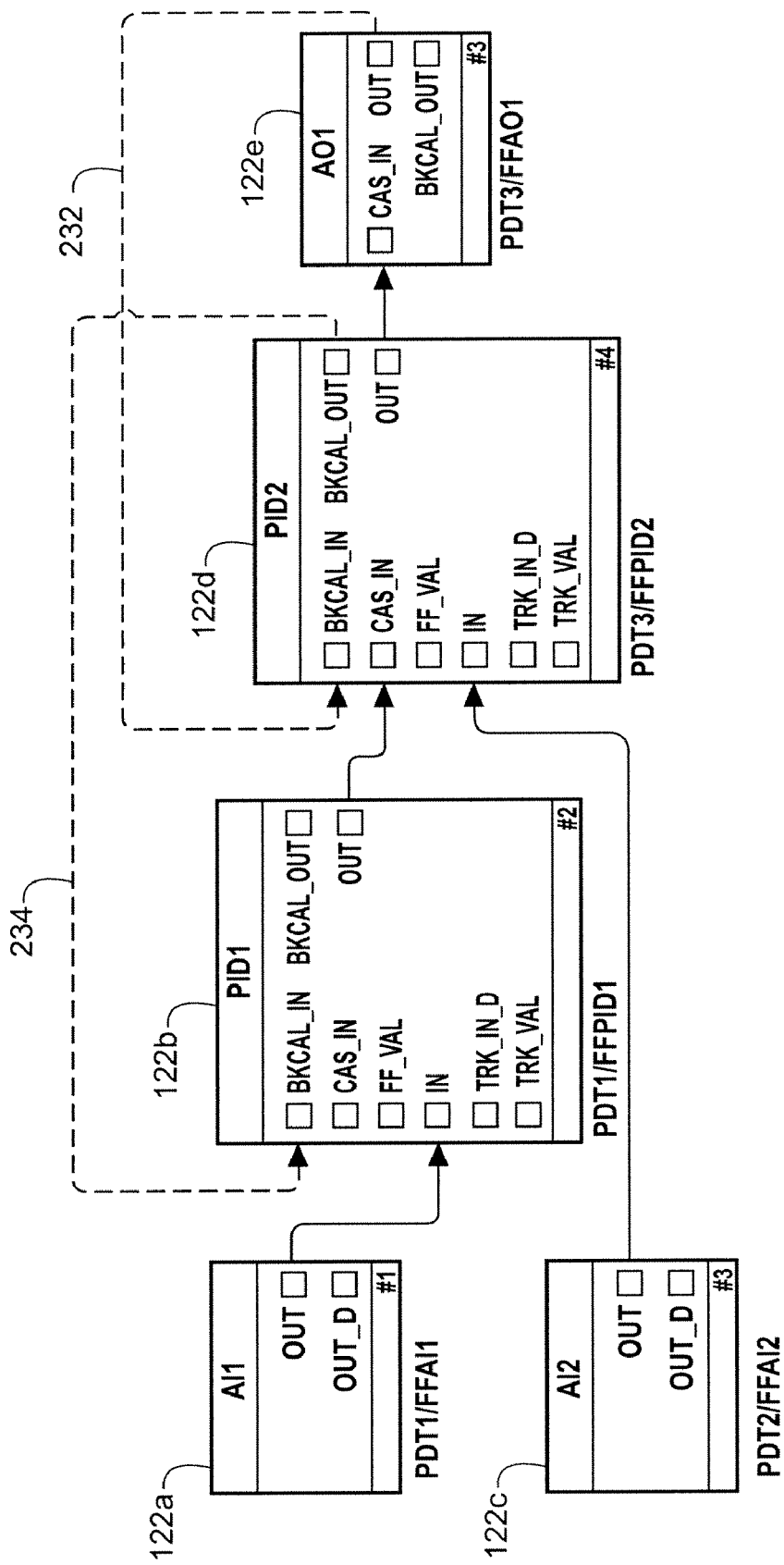
FIG. 14 depicts graphical user interface (GUI) representations of the function blocks used to implement a process control routine in an example process control system of FIG. 13 and interconnections between the function blocks.

FIG. 14 depicts graphical user interface (GUI) representations of the function blocks 122a-e. The function blocks 122a-e may be interconnected by a user (e.g., an engineer, an operator, etc.) using a GUI-based design software application executed by, for example, the workstation 102. As shown in FIG. 14, each of the function blocks 122a-e includes one or more inputs and/or one or more outputs. Connecting the inputs and/or outputs of the function blocks 122a-e defines the process control routine of the module 120 (FIG. 13). The connections between the function blocks 122a-e are referred to herein as function block connection wires. In the illustrated example, an output of the AI1 function block 122a is connected to an input of the PID1 function block 122b; outputs of the PID1 function block 122b and the AI2 function block 122c are connected to inputs of the PID2 function block 122d; and an output of the PID2 function block 122d is connected to an input of the AO1 function block 122e.

Figure 15:
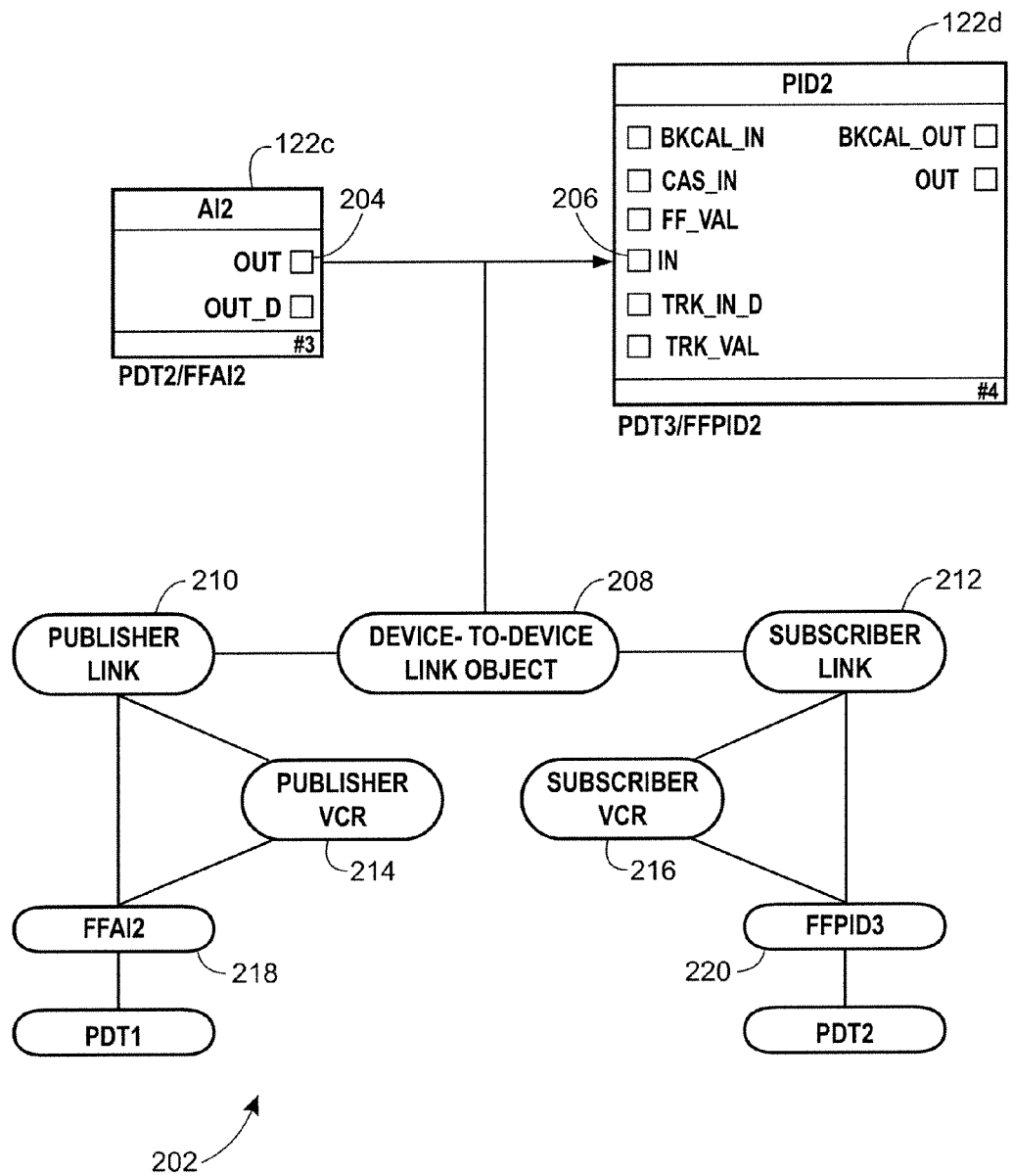
FIG. 15 is an example function block binding configuration that binds function blocks associated with different field devices of the process control system of FIG. 13 via a communication bus.

Turning briefly to FIG. 15, an example function block binding configuration 202 (i.e., the binding configuration 202) is provided for exemplary purposes to show a manner in which an output 204 of the AI2 function block 122c can be bound to an input 206 of the PID2 function block 122d to enable communicating information from the AI2 function block 122c to the PID2 function block 122d. A binding process generates the binding configuration 202 based on the connections between function blocks (e.g., the function blocks 122a-e of FIGS. 13 and 14). A binding process can be executed by, for example, the workstation 102 any time a new function block connection (e.g., the connection between the output 204 and the input 206) is made to enable the function blocks to exchange information in accordance with the function block interconnections.

The binding process is configured to create intra-device links to enable intra-device communications and inter-device links to enable inter-device communications. An intra-device link defines a connection between two function blocks associated with the same device. For example, an intra-device link defines a connection between the AI1 function block 122a (FIGS. 13 and 14) and the PID1 function block 122b (FIGS. 13 and 14) because the functions defined by the function blocks 122a and 122b are executed by the same device (the field device 112a of FIG. 13). An inter-device link defines a connection between a function block in one field device and a function block in another field device that causes the field devices to communicate via a communication bus (e.g., the digital data bus 114 of FIG. 13) communicatively coupling the two field devices. For example, an inter-device link defines the connection between the AI2 function block 122c (FIGS. 13-15) and the PID2 function block 122d because the function associated with the AI2 function block 122c is executed by the field device 112b (FIG. 13) and the function associated with the PID2 function block 122d is executed by the field device 112c (FIG. 13).

In the illustrated example of FIG. 15, a binding process creates an inter-device link configuration to bind the AI2 function block 122c to the PID2 function block 122d. Initially, the binding process creates a device-to-device link object 208 (e.g., an inter-device link object) that contains information to link the output 204 to the input 206. In an alternative example implementation used to bind function blocks associated with the same device, the binding process would create an intra-device link object (not shown). In the example binding configuration 202 of FIG. 15, the binding process then creates a publisher link 210, associates the publisher link 210 with the output 204, and binds the publisher link 210 to the device-to-device link object 208. Also, the binding process creates a subscriber link 212, associates the subscriber link 212 with the input 206, and binds the subscriber link 212 to the device-to-device link object 208.

The binding process also creates a publisher virtual communication resource (VCR) 214 and subscriber VCR 216. A VCR maintains (or persists) the identity of a connection between function blocks so that any communication between the function blocks can be made using the VCR identity. In the illustrated example, the publisher VCR 214 associates a unique identification 218 of the AI2 function block 122c with the publisher link 210 and the subscriber VCR 216 associates a unique identification 220 of the PID2 function block 122d with the subscriber link 212. In general publisher/subscriber VCR's (e.g., the publisher and subscriber VCR's 214 and 216) enable buffered communications between function blocks including one-to-many broadcast communications (e.g., one function block broadcasts information to many function blocks). In the illustrated example, after the AI2 function block 122c generates new data, it communicates (or publishes) the data via the output 204 to the PID2 function block 122d. The PID2 function block 122d is a subscriber to the output 204 and, thus, receives the data published via the output 204.

Returning to FIG. 14, the function blocks 122a-e are coupled or connected to form loops. In particular, an output of the AO1 function block 122e is coupled or connected to an input of the PID2 function block 122d to form a PID2-AO1 loop 232. Also, an output of the PID2 function block 122d is connected to an input of the PID1 function block 122b to form a PID1-PID2 loop 234. In the illustrated example, the PID1-PID2 loop 234 executes less often (e.g., has a longer loop execution period or a slower loop execution rate) than the PID2-AO1 loop 232.

The loop execution period of the loop 232 is based on the block scan rates (BSR's) of the function blocks 122c-e and the loop execution period of the loop 234 is based on the block scan rates of the function blocks 122a-b. A block scan rate defines how often a function block communicates or publishes information to another function block. For example, if the field device 112a executes the AI1 function block 122a and publishes information on the digital data bus 114 every 200 ms, the block scan rate of the AI1 function block 122a is 2000 ms. The amount of time required for a field device (or a controller) to execute a respective function block is referred to herein as a block execution time. For example, if the field device 112a requires 20 milliseconds (ms) to execute the AI1 function block 122a, the block execution time of the AI1 function block 122a is 20 ms. Block execution times $t_{E1}$, $t_{E2}$, $t_{E3}$, $t_{E4}$, and $t_{E5}$ associated respectfully with the function blocks 122a-e are shown by way of example in FIGS. 16 and 17. The block scan rates typically vary between function blocks. In the illustrated example, the block scan rates associated with the function blocks 122a and 122b are less than the block scan rates associated with the function blocks 122c-e. As a result, the PID1-PID2 loop 234 executes less often (e.g., a slower loop rate, a longer loop periodicity, etc.) than the PID2-AO1 loop 232.

Figure 16:
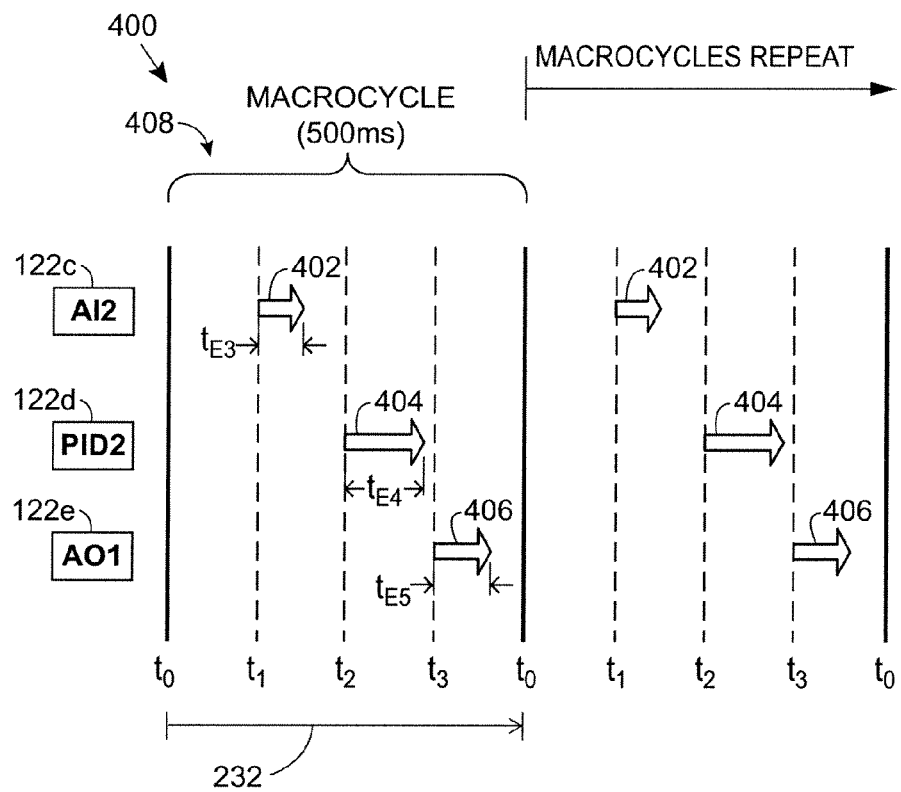
FIG. 16 is an example execution sequence diagram that depicts the timing relationships between executions of some of the function blocks of FIGS. 13 and 14 during two consecutive 500 millisecond loop executions.

Turning to FIG. 16, an example execution sequence diagram 400 depicts the timing relationships between executions of the function blocks 122c-e during two consecutive loop executions of the loop 232 of FIG. 14. The executions of the AI2 function block 122c are indicated by reference numeral 402, the executions of the PID2 function block 122d are indicated by reference numeral 404, and the executions of the AO1 function block 122e are indicated by reference numeral 406. A macrocycle is used herein to refer to a single execution of a loop (e.g., a single execution of the loop 232). The amount of time required to execute a loop is typically based on the function block in the loop having the least frequent block scan rate. In known systems, each function block associated with a macrocycle must be executed only once during that macrocycle. For example, in FIG. 16, each of the function blocks 122c-e is shown as being executed only once during a macrocycle 408 having a 500 millisecond period. In known systems, field devices on the same segment (e.g., the field devices 112a-c on the digital data bus 114) must execute their respective function blocks based on the same macrocycle. That is, known design guidelines of known systems specify against running different macrocycles on a single segment (e.g., the digital data bus 114). If another function block is introduced into the loop 232 having a less frequent scan rate (e.g., a two-second scan rate), the period of the macrocycle 408 must be increased to accommodate execution of all the function blocks (e.g., the function blocks 122c-e and the additional function block having a two-second scan rate) once during the macrocycle 408.

Figure 17:
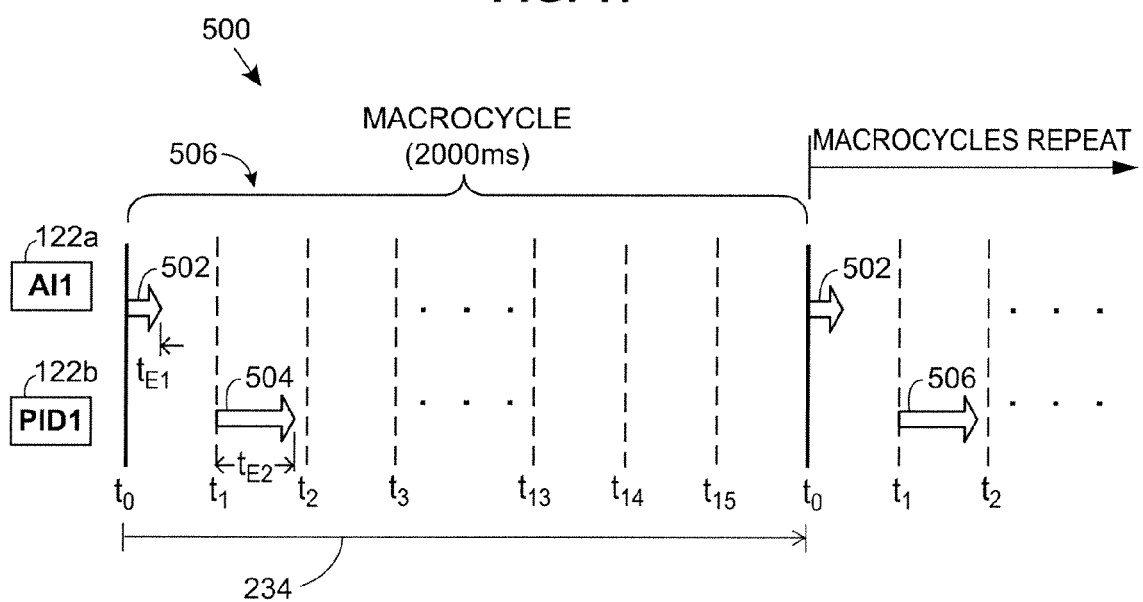
FIG. 17 is another example execution sequence diagram that depicts timing relationships between executions of some of the function blocks of FIGS. 13 and 14 during two consecutive 2000 millisecond loop executions.

FIG. 17 illustrates another example execution sequence diagram 500 that depicts a timing relationships between executions of the function blocks 122a-b during two consecutive loop executions of the loop 234 of FIG. 14. The executions of the AI1 function block 122a are indicated by reference numeral 502 and the executions of the function block 122b are indicated by reference numeral 504. The loop 234 is executed relatively less often than the loop 232 because the function blocks 122a-b have a less frequent block scan rate than the function blocks 122c-e. In the illustrated example, a macrocycle 502 associated with the loop 234 has a duration of 2000 milliseconds to accommodate the less frequent execution of the loop 234.

Figure 18:
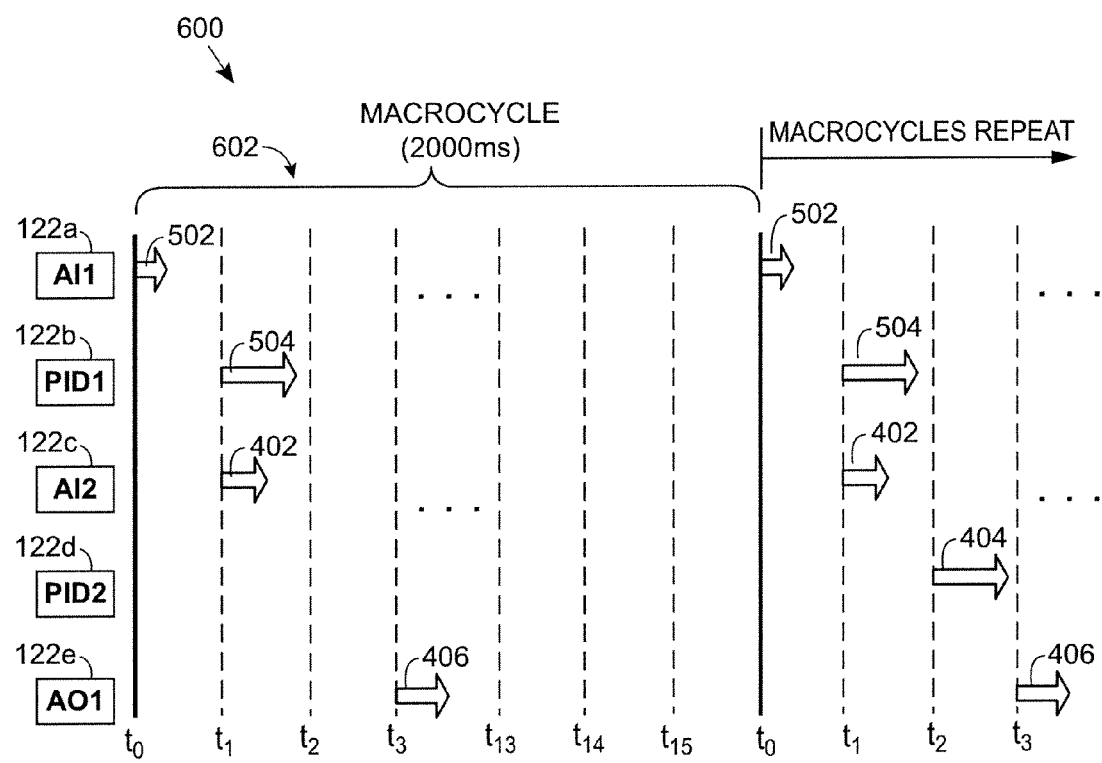
FIG. 18 is an example execution sequence diagram implemented in accordance with a method to execute function blocks having different block scan rates and assigned to field devices communicatively coupled to the same communication bus of the example process control system of FIG. 13.

FIG. 18 illustrates an example execution sequence diagram 600 implemented in accordance with known methods to execute function blocks (e.g., the function blocks 122a-e of FIGS. 13-14, 16, and 17) having different block scan rates on the same segment (e.g., the digital data bus 114). Specifically, in accordance with known methods, to execute the function blocks 122a-e on the same segment (e.g., the digital data bus 114), a macrocycle 602 having a period of 200 ms is selected based on the slowest block scan rate of the function blocks 122a-e. In this manner, each of the function blocks 122a-e is executed once per macrocycle 602. To implement the example execution sequence 600, the block scan rates of the function blocks 122c-e are decreased to make the loop execution period of the loop 232 equal to the loop execution period of the loop 234.

Although decreasing the block scan rates of the function blocks 122c-e enables executing the function blocks 122c-e and the function blocks 122a-b on the same segment, decreasing the block scan rates of the function blocks 122c-e prevents executing the function blocks 122c-e faster than the block scan rates of the function blocks 122a-b. In some implementations, executing the function blocks 122c-e faster than the block execution periods of the function blocks 122a-b may be advantageous. For example, if the AI2 function block 122c causes the field device 112b (FIG. 13) to acquire a pressure measurement, executing the AI2 function block 122c at 500 ms intervals as shown in FIG. 16 enables the field device 112b to acquire and publish on the digital data bus 114 a plurality of pressure measurements at a relatively high resolution (e.g., high granularity). Acquiring pressure measurements more frequently (e.g., at a relatively high resolution) as shown in FIG. 16 enables the field device 112b to, for example, capture blips, spikes, or other relatively high-frequency behavior in pressure occurring in the 500 ms range. In contrast, slowing the block scan rate of the AI2 function block 122c to generate the example execution sequence 600 using known methods prevents the field device 112b from capturing blips, spikes, or other relatively high-pressure behavior occurring in the less than 200 ms range.

Figure 19:
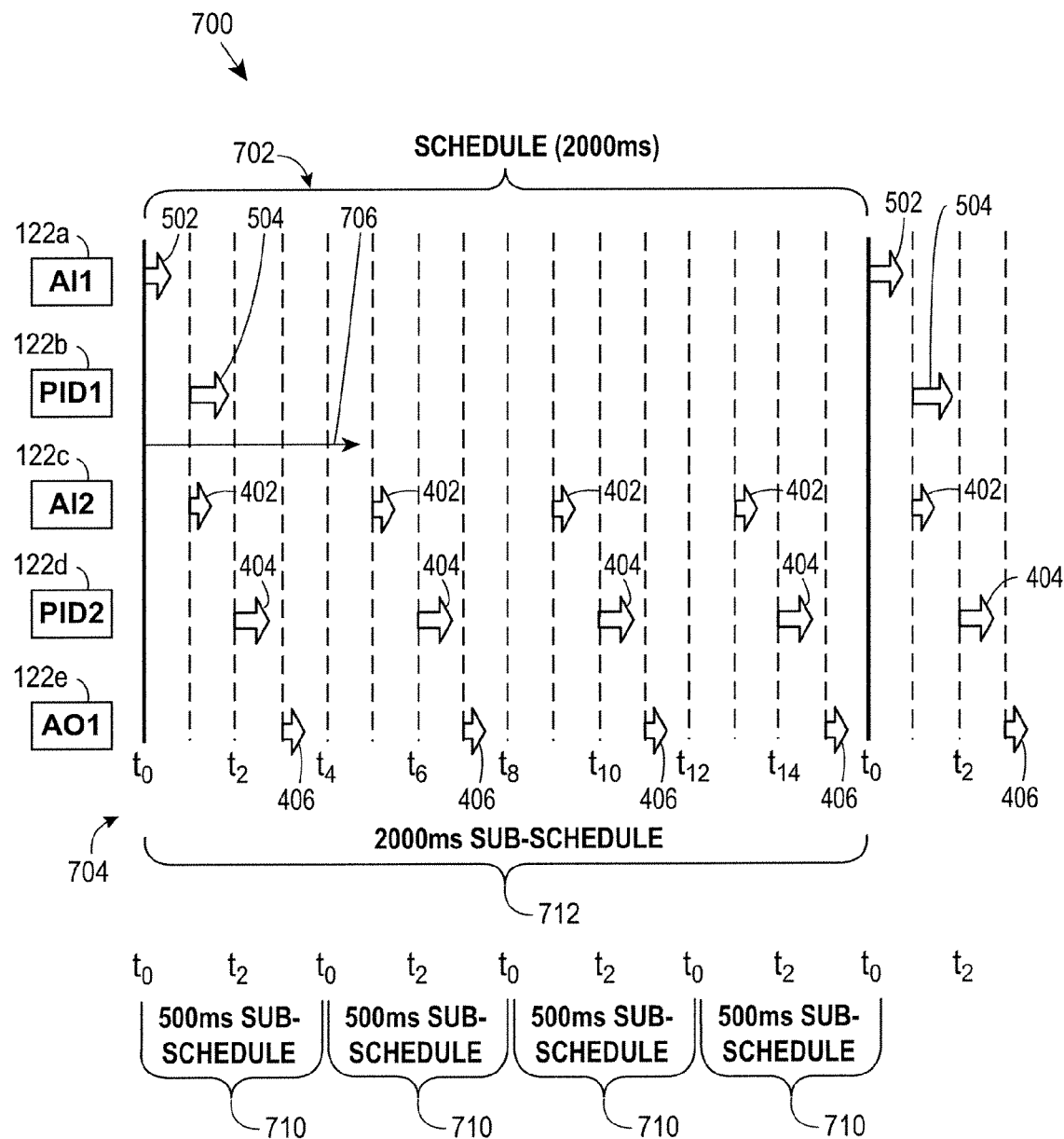
FIG. 19 is an example execution sequence diagram implemented in accordance with the example methods and apparatus described herein to enable function blocks to be executed with their block scan rates and respective loop execution periods.

Unlike known methods used to generate the example execution sequence 600 to execute multiple loops on a single segment by making the loop execution periods of all loops the same, the example methods and apparatus described herein enable scheduling multiple loops having different loop execution periods on the same segment. Turning to FIG. 19, an example execution sequence diagram 700 implemented in accordance with the example methods and apparatus described herein allows the loops 232 and 234 of FIGS. 14-16 to be executed in accordance with their respective loop execution periods. In this manner, function blocks having faster block scan rates can be executed at a faster rate than function blocks on the same segment having slower block scan rates.

To enable executing the loops 232 and 234 at their respective rates on the digital data bus 114, the example methods and apparatus described herein generate a schedule 702 (i.e., a function block execution schedule) represented in FIG. 19 as a plurality of the function block executions 402, 404, 406, 502, and 504 of the function blocks 122a-e. In the illustrated example, the schedule 700 has a schedule start time 704 beginning at time $t_0$. Each of the function block executions 402, 404, 406, 502, and 504 starts at a respective start time offset (e.g., an offset) relative to the schedule start time 704. An example start time offset 706 is depicted in FIG. 19 to show when one of the function block executions 402 of the AI2 function block 122c starts relative to the schedule start time 704.

The schedule 700 is determined based on block scan rates of the function blocks 122a-e and a module execution period ($T_{ME}$) of the module 120. The module execution period ($T_{ME}$) is equal to the inverse value of the slowest, or least frequent, block scan rate associated with a function block (e.g., one of the function blocks 122a-e) in the module 120. For example, the module scan period ($T_{ME}$) of the module 120 is 2000 ms because the AI1 function block 122a and the PID1 function block 122b have block scan rates of $$\frac{1 \text{ scan}}{2000 \text{ ms}},$$

which are slower than the $$\frac{1 \text{ scan}}{500 \text{ ms}}$$

block scan rates of the function blocks 122c-e in the module 120.

The example methods and apparatus described herein are configured to generate one or more start time offsets for each function block (e.g., each of the function blocks 122a-e). The number of start time offsets for a function block is determined based on a block raw execution period ($T_{BRE}$) of that function block and the slowest block raw execution period ($T_{SBE}$) associated with the field device configured to execute that function block. A block raw execution period ($T_{BRE}$) defines the length of time between executions of a function block regardless of schedule (e.g., the schedule 702 of FIG. 19) and can be determined according to equation 1 below.

$$T_{BRE} = T_{ME} \times F_{BSR} \qquad \text{Equation 1}$$

As shown in equation 1 above, the block raw execution period ($T_{BRE}$) for a particular function block is determined by multiplying the module execution period ($T_{ME}$) of the module containing the function block by a block scan rate factor ($F_{BSR}$) of the function block. The block scan rate factor ($F_{BSR}$) is equal to the quantity of module execution periods ($T_{ME}$) between the start times of two consecutive executions of a function block and may be determined using equation 2 below.

$$F_{BSR} = \frac{T_{ME}}{BSR} \qquad \text{Equation 2}$$

Referring to equation 2 above and FIG. 19, if the module execution period ($T_{ME}$) of the module 120 (FIG. 13) is 2000 ms and the function block 122a is configured to be executed every 2000 ms (BSR=2000 ms), the block scan rate factor ($F_{BSR}$) of the AI1 function block 122a is equal to one because one module execution period ($T_{ME}$) elapses between the starts of two consecutive executions of the AI1 function block 122a. In FIG. 19, the AI2 function block 122c is shown as executing every 500 ms (BSR=500 ms). Therefore, the block scan rate factor ($F_{BSR}$) of the AI2 function block 122c is equal to one-fourth (0.25) because only one-fourth of the module execution period ($T_{ME}$) elapses between the starts of two consecutive executions of the AI2 function block 122c.

Referring again to equation 1 above, if the module execution period ($T_{ME}$) of the module 120 is 2000 ms and the block scan rate factor ($F_{BSR}$) of the AI1 function block 122a is equal to one, the block raw execution period ($T_{BRE}$) of the AI1 function block 122a is equal to 2000 ms indicating that the AI1 function block 122a executes every 2000 ms. However, the block raw execution period ($T_{BRE}$) of the AI2 function block 122c is equal to 500 ms because the block scan rate factor ($F_{BSR}$) of the AI2 function block 122c is one-fourth (e.g., 500 ms ($T_{BRE}$)=2000 ms ($T_{ME}$)×¼($F_{BSR}$)).

Figure 20:
FIG. 20 is an example rounding table that may be used to round up block raw execution periods of function blocks.

After the block raw execution period ($T_{BRE}$) is determined based on equation 1 above, the block raw execution period ($T_{BRE}$) is rounded up based on rounding table 800 of FIG. 20. The block raw execution period ($T_{BRE}$) is rounded up to ensure that function block executions (e.g., the function block executions 402, 404, 406, 502, and 504 of FIG. 19) do not skew in time after several repetitions of the schedule 702 (FIG. 19) and to determine the quantity of start time offsets ($Q_S$) required for each function block based on rounded block raw execution period ($RT_{BRE}$) boundaries. As shown in the rounding table 800, if the block raw execution period ($T_{BRE}$) of a function block is between 0 and 500 ms, the block raw execution period ($T_{BRE}$) is rounded up to the rounded block raw execution period ($RT_{BRE}$). Similarly, if the block raw execution period ($T_{BRE}$) of a function block is between 500 and 1000 ms or between 10φms and 200 ms or greater than 2000 ms, the block raw execution period ($T_{BRE}$) is rounded up to a rounded block raw execution period ($RT_{BRE}$) value of 1000 ms, 2000 ms, or 4000 ms, respectively.

Returning to FIG. 19, the schedule 702 is implemented using sub-schedules 710 and 712. In the illustrated example, the sub-schedule 710 has a 500 ms period and is associated with a loop execution of the loop 232 of FIGS. 14 and 16. The sub-schedule 712 has a 200 ms period and is associated with a loop execution of the loop 234 of FIGS. 14 and 17. During generation of the schedule 702, the sub-schedule 710 is generated first and then it is replicated three times as shown in FIG. 19 to fill in the 2000 ms schedule 702. After generating the sub-schedule 710, the next shortest-period sub-schedule (e.g., the sub-schedule 712) is generated. After generating the sub-schedules 710 and 712, the sub-schedules 710 and 712 are merged to generate the schedule 702.

As shown in FIG. 19, during the sub-schedule 710, each of the executions 402, 404, and 406 occurs once. Therefore, each of the function blocks 122c-e requires only one start time offset for the sub-schedule 710. Also, during the sub-schedule 712, each of the function blocks 122a-b is executed only once. Therefore, each of the function blocks 122a-b requires only one start time offset for the sub-schedule 712.

The quantity of start time offsets ($Q_S$) (e.g., the start time offset 706) for a sub-schedule (e.g., the sub-schedule 710 or the sub-schedule 712) required by a function block (e.g., one of the function blocks 122a-e of FIGS. 13 and 14) is determined based on the rounded block raw execution period ($RT_{BRE}$) of the function block and the slowest rounded block raw execution period ($RT_{SRE}$) associated with the field device (e.g., one of the field devices 112a-c of FIG. 13) that executes the function block. The quantity of start time offsets ($Q_S$) for a function block can be determined using equation 3 below.

$$Q_S = \frac{RT_{SRE}}{RT_{BRE}} \quad \text{Equation 3}$$

As shown in equation 3 above, the quantity of start time offsets ($Q_S$) for a function block is determined by dividing the slowest rounded block raw execution period ($RT_{SRE}$) associated with the field device that executes the function block by the rounded block raw execution period ($RT_{BRE}$) of the function block.

Using equation 3 to determine the quantity of start time offsets ($Q_S$) for the PID2 function block 122d involves first determining the slowest rounded block raw execution period ($RT_{SRE}$) associated with the field device 112c, which executes the PID2 function block 122d. In the illustrated example, the PID2 and AO1 function blocks 122d-e are the only function blocks executed by the field device 112c. Therefore, the slowest rounded block raw execution period ($RT_{SRE}$) associated with the field device 112c is equal to the rounded block raw execution period ($RT_{BRE}$) of one of the function blocks 122d-e having the slower rounded block raw execution period ($RT_{BRE}$). Because the rounded block raw execution periods ($RT_{BRE}$) of the function blocks 122d-e are both equal to 500 ms, the slowest rounded block raw execution period ($RT_{SRE}$) is set equal to 500 ms.

After determining the slowest rounded block raw execution period ($RT_{SRE}$) associated with the field device 112c, equation 3 can be used to determine the quantity of start time offsets ($Q_S$) required for the PID2 function block 122d by dividing 500 ms (the slowest rounded block raw execution period ($RT_{SRE}$) associated with the field device 112c) by 500 ms (the rounded block raw execution period ($RT_{BRE}$) of the PID2 function block 122d). The division operation indicates that the quantity of start time offsets ($Q_S$) required by the PID2 function block 122d to execute in the sub-schedule 710 is one.

Figure 21:
FIG. 21 is an example quantity of start time offset table 900 that shows the quantity of start time offsets required by function blocks of FIGS. 13 and 14 for execution during respective sub-schedules.

An example quantity of start time offset table 900 of FIG. 21 shows the quantity of start time offsets ($Q_S$) required by the function blocks 122a-b for execution during the sub-schedule 712 of FIG. 19 and the quantity of start time offsets ($Q_S$) required by the function blocks 122c-e for execution during the sub-schedule 710 of FIG. 19. The quantity of start time offset table 900 also shows the block scan rate factor ($F_{BSR}$), the block raw execution periods ($T_{BRE}$) and the rounded block raw execution periods ($RT_{BRE}$).

Figures 22, 23:
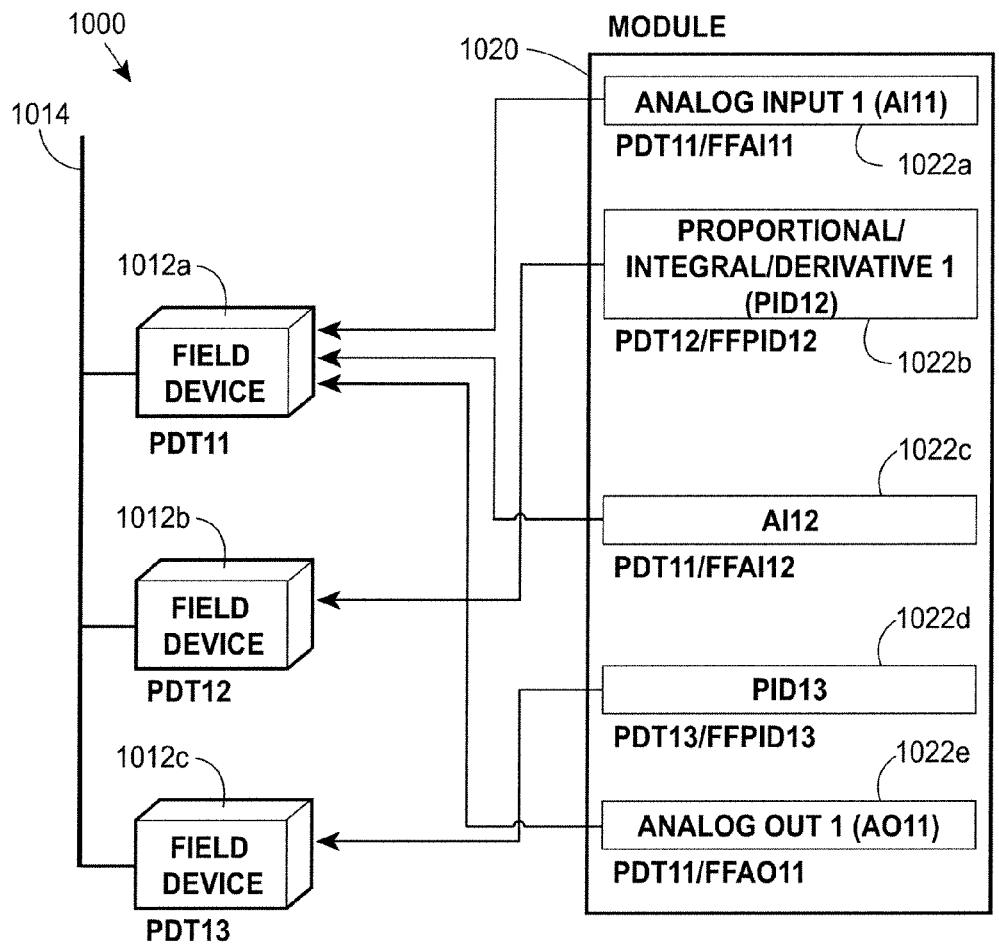
FIG. 22 depicts another example function block configuration in which a plurality of field devices are communicatively coupled to a communication bus of a process control system and configured to execute respective function blocks.
FIG. 23 depicts another example quantity of start time offset table showing the quantity of start times required for each function block of the example function block configuration of FIG. 22.

FIG. 22 depicts another example function block configuration 1000 in which a plurality of field devices 1012a-c are communicatively coupled to a digital data bus 1014 to implement a process control system based on function blocks 1022a-e of a module 1020. Unlike the function blocks 122a-e of FIGS. 13 and 14 that require only one start time offset as shown in the quantity of start time offset table 900 of FIG. 21, some of the function blocks 1022a-e shown in FIG. 22 require a plurality of start time offsets as described below. The plurality of field devices 1012a-c are similar or identical to the field devices 112a-c of FIG. 13 and the digital data bus 1014 is similar or identical to the digital data bus 114 of FIG. 13. As shown in FIG. 22, the field device 1012a executes functions defined by an AI1 function block 1022a, an AI12 function block 1022c, and an AO11 function block 122e, the field device 1012b executes a function defined by a PID12 function block 1022b, and a field device 1012c executes a function defined by a PID13 function block 1022d.

The AI11 function block 1022a is similar or identical to the AI1 function block 122a of FIGS. 13 and 14, the PID12 function block 1022b is similar or identical to the PID1 function block 122b of FIGS. 13 and 14, the AI12 function block 1022c is similar or identical to the AI2 function block 122c of FIGS. 13 and 14, the PID13 function block 1022d is similar or identical to the PID2 function block 122d of FIGS. 13 and 14, and the AO11 function block 1022e is similar or identical to the AO1 function block 122e of FIGS. 13 and 14. For example, the block scan rates of the AI11 function block 1022a and the PID12 function block 1022b are equal to 200 ms. Also, the block scan rates for the function blocks 1022c-e are equal to 500 ms. Although not shown, the connections between the function blocks 1022a-e are identical to the connections between the function blocks 122a-e shown in FIG. 14.

Another example quantity of start time offset table 1100 of FIG. 23 shows the quantity of start time offsets ($Q_S$) for each of the function blocks 1022a-e (FIG. 22) as determined based on their respective block scan rate factors ($F_{BSR}$), block raw execution periods ($T_{BRE}$), and rounded block raw execution periods ($RT_{BRE}$). The block raw execution period ($T_{BRE}$) for each of the function blocks 1022a-e is determined based on equation 1 above which, in turn, is based on the block scan rate factors ($F_{BSR}$) and the module execution period ($T_{ME}$) of the module 1020. Each of the block raw execution periods ($T_{BRE}$) is then rounded to determined the rounded block raw execution period ($RT_{BRE}$) for each of the function blocks 1022a-e.

The quantity of start time offsets ($Q_S$) for each of the function blocks 1022a-e is then determined based on equation 3 above. As shown in FIG. 23, reference numeral 1102 indicates the quantity of start time offsets ($Q_S$) equal to four for the AI12 function block 1022c (PDT11/FFAI12). To determine the quantity of start time offsets ($Q_S$) for the AI12 function block 1022c, the slowest rounded block raw execution period ($RT_{SRE}$) associated with the field device 1012a is first determined. In the illustrated example of FIG. 22, the field device 1012a is configured to execute the AI11 function block 1022a, the AI12 function block 1022c, and the AO11 function block 1022e. Therefore, the slowest rounded block raw execution period ($RT_{SRE}$) is the slowest of the rounded block raw execution period ($RT_{BRE}$) of the AI11 function block 1022a, the rounded block raw execution period ($RT_{BRE}$) of the AI12 function block 1022c, and the rounded block raw execution period ($RT_{BRE}$) of the AO11 function block 1022e. As shown in FIG. 23, the rounded block raw execution period ($RT_{BRE}$) of the AI11 function block 1022a (PDT11/FFAI11) is 2000 ms, the rounded block raw execution period ($RT_{BRE}$) of the AI12 function block 1022c (PDT11/FFAI12) is 500 ms, and the rounded block raw execution period ($RT_{BRE}$) of the AO11 function block 1022c (PDT11/FFAO11) is 500 ms. Accordingly, the slowest rounded block raw execution period ($RT_{SRE}$) associated with the field device 1012a is 2000 ms. In accordance with equation 3 above, to determine the quantity of start time offsets ($Q_S$) required by the AI12 function block 1022c, 2000 ms (the rounded block raw execution period ($RT_{BRE}$) of the AI12 function block 1022c) is divided by 500 ms (the slowest rounded block raw execution period ($RT_{SRE}$) associated with the field device 1012a) to calculate a value of four as indicated by reference number 1102.

The table 1100 also shows that the quantity of start time offsets ($Q_S$) required by the AI11 function block 1022a (PDT11/FFAI11) is equal to one as indicated by reference number 1104. In the illustrated example, the AI11 function block 1022a has one start time offset and the AI12 function block 1022c has four start time offsets because the rounded block raw execution period ($RT_{BRE}$) of the AI11 function block 1022a (2000 ms) is equal to the slowest rounded block raw execution period ($RT_{SRE}$) associated with the field device 1012a (2000 ms) while the rounded block raw execution period ($RT_{BRE}$) of the AI12 function block 1022c (500 ms) is four times smaller than the slowest rounded block raw execution period ($RT_{SRE}$) associated with the field device 1012a (2000 ms). Thus, the field device 1012b needs to execute the AI12 function block 1022c four times for each execution of the AI11 function block 1022a.

Figure 24:
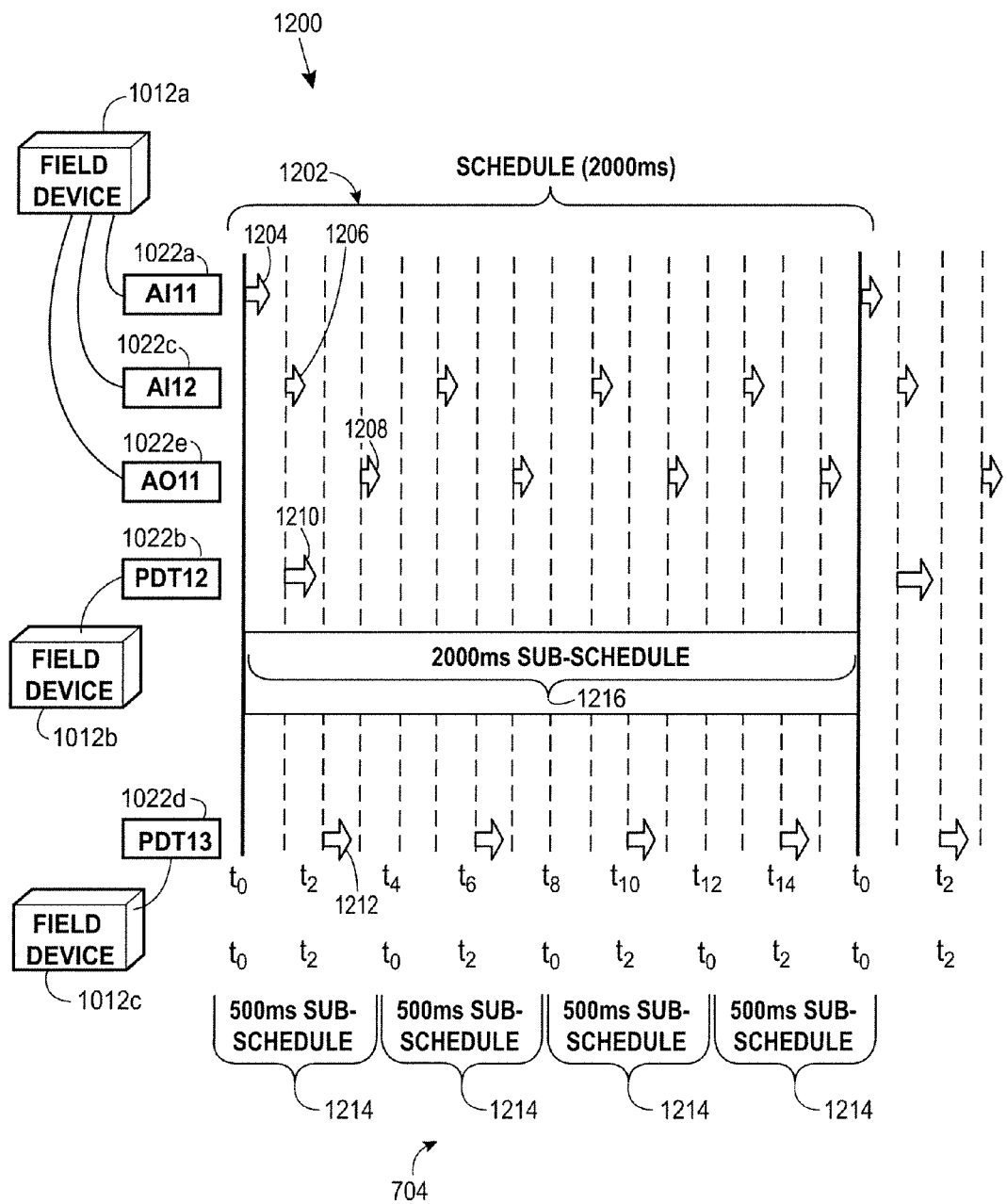
FIG. 24 is another example execution sequence diagram showing a schedule associated with the function blocks of FIG. 22 that is generated using the example methods and apparatus described herein.

FIG. 24 is another example execution sequence diagram 1200 showing a schedule 1202 (i.e., a function block execution schedule) and executions 1204, 1206, 1208, 1210, and 1212 of the respective function blocks 1022a-e (FIG. 22). The schedule 1202 is generated using a 500 ms sub-schedule 1214 associated with the PID2 function block 1022d and a 200 ms sub-schedule 1216 associated with the function blocks 1022a-c and 1022e. As shown, the 500 ms sub-schedule 1214 is repeated four times during the schedule 1202 and the 200 ms sub-schedule 1216 occurs one time during the schedule 1202.

In accordance with the table 1100 of FIG. 23, within the 200 ms sub-schedule 1216, the AI11 function block 1022a has one start time offset (start time offset $t_0$), the AI12 function block 1022c has four start time offsets (start time offsets $t_1$, $t_5$, $t_9$, and $t_{11}$), the AO11 function block 1022e has four start time offsets (start time offsets $t_3$, $t_7$, $t_{11}$, and $t_{15}$), and the PID12 function block 1022b has one start time offset (start time offset $t_1$). Also in accordance with the table 1100 of FIG. 23, within the 500 ms sub-schedule 1214, the PID13 function block 1022d has one start time offset (start time offset $t_2$).

The start time offsets of a function block can be determined in accordance with equation 4 below.

$$t_S = N_{Seq} \times T_{BRE} + t_{DA} \qquad \text{Equation 4}$$

As shown above in equation 4, a start time offset ($t_S$) for a function block is determined by multiplying a sequence number ($N_{Seq}$) of a current start time offset to be calculated by the block raw execution period ($T_{BRE}$) for the function block and adding the resulting product to a data available time ($t_{DA}$) of the function block. The sequence number ($N_{seq}$) refers to a particular execution instance of a function block during a sub-schedule (e.g., one of the sub-schedules 710 or 712 of FIG. 19). For example, in FIG. 24, the AI12 function module 1022c has four execution instances (i.e., a quantity of start time offsets ($Q_S$) equal to four and sequence numbers ($N_{seq}$) zero through three) during the 200 ms sub-schedule 1216. The data available time ($t_{DA}$) of the function block refers to the time during a block raw execution period ($T_{BRE}$) of a function block when data required to execute the function block is made available by another function block. For example, the data available time ($t_{DA}$) of a first function block is determined based on when data from a second function block is available to a field device (e.g., when the data is published on the digital data bus 1014) that executes the first function block. If the first function block does not require data from the second function block or any other function block for a field device to execute the first function block, then the data available time ($t_{DA}$) of the first function block is set to zero. As a further example, if the block raw execution period ($T_{BRE}$) of a function block is 500 ms and data is made available to it by another function block at 125 ms relative to the start of the 500 ms block raw execution period ($T_{BRE}$), the data available time ($t_{DA}$) of the function block is 125 ms.

Referring to equation 4 and the AI12 function block 1022c executions 1206, the offset start times ($t_S$) $t_1$, $t_5$, $t_9$, and $t_{11}$ can be determined as follows. If the block raw execution period ($T_{BRE}$) of the AI12 function block 1022c is 500 ms the quantity of start time offsets ($Q_S$) is four (i.e., sequence numbers ($N_{seq}$) zero through three) during the 2000 ms sub-schedule 1216 as shown in FIG. 24 because the sub-schedule execution period of the 200 ms sub-schedule 1216 divided by the 500 ms block raw execution period ($T_{BRE}$) of the AI12 function block 1022c is equal to four. Also, the data available time ($t_{DA}$) of the AI12 function block 1022c is 125 ms. Therefore, using equation 4 above, the start time offset ($t_S$) $t_1$ corresponding to the first sequence number ($N_{SEQ}$) is equal to 125 ms, the start time offset ($t_S$) $t_5$ corresponding to the second sequence number ($N_{SEQ}$) is equal to 625 ms, the start time offset ($t_S$) $t_9$ corresponding to the third sequence number ($N_{SEQ}$) is equal to 1125 ms, and the start time offset ($t_S$) $t_{11}$ corresponding the first sequence number ($N_{SEQ}$) is equal to 1625 ms.

Figure 25:
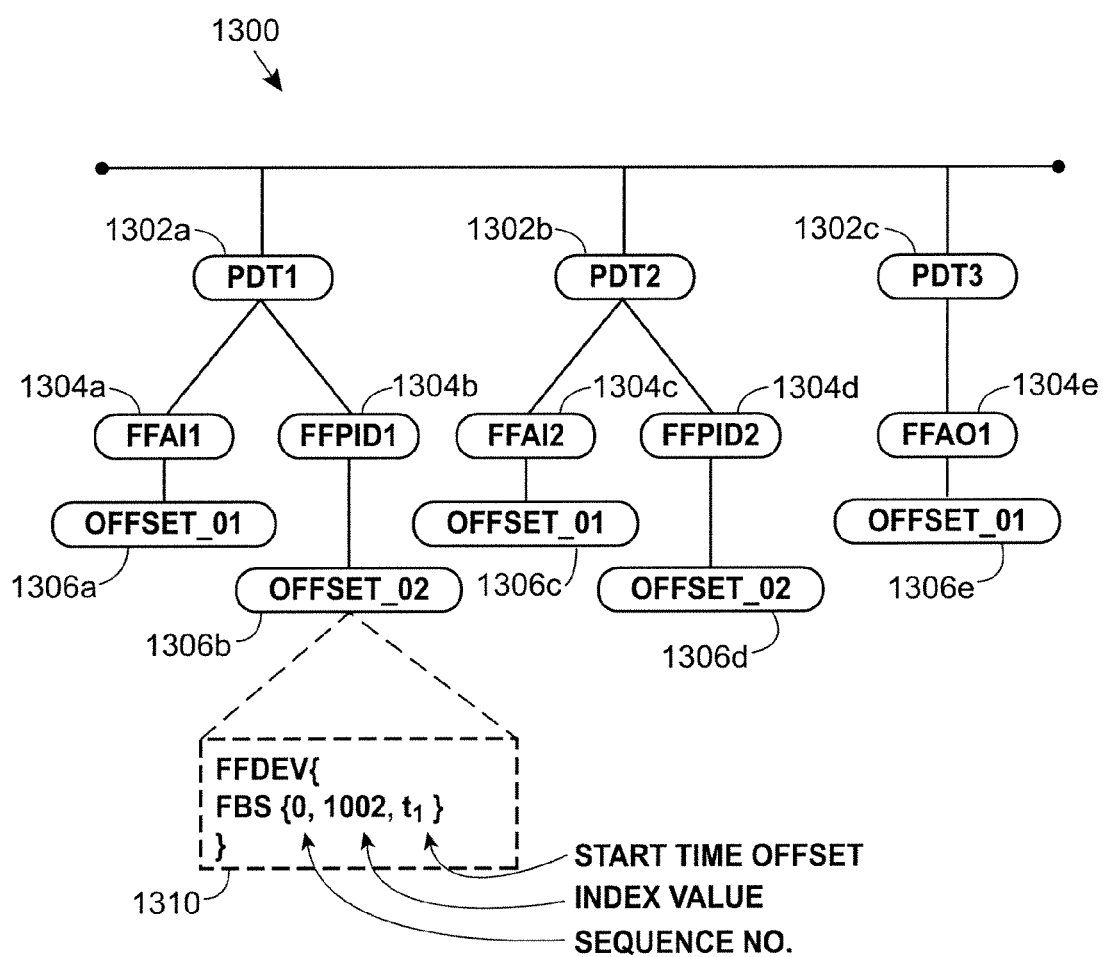
FIG. 25 is an example object-oriented software execution environment showing the relationships between objects representative of the field devices of FIG. 13, the function blocks of FIG. 13, and start time offsets corresponding to the function blocks.

FIG. 25 is an example object-oriented software execution environment 1300 showing the relationships between objects representative of the field devices 112a-c of FIG. 13, the function blocks 122a-e of FIG. 13, and start time offsets corresponding to the function blocks 122a-e. A PDT1 device object 1302a corresponding to the field device 112a of FIG. 13 is bound to an FFAI1 function object 1304a and an FFPID1 function object 1304b. The FFAI1 function object 1304a corresponds to the AI1 function block 122a of FIG. 13 and the FFPID1 function object 1304b corresponds to the PID1 function block 122b of FIG. 13. A PDT2 device object 1302b corresponding to the field device 112b of FIG. 13 is bound to an FFAI2 function block 1304c corresponding to the AI2 function block 122b (FIG. 13) and an FFPID2 function object 1304d corresponding to the PID2 function block 122c (FIG. 13). A PDT3 device object 1302c corresponding to the field device 112c of FIG. 13 is bound to an FFAO1 function block 1304e corresponding to the AO1 function block 122e (FIG. 13).

In accordance with the quantity of start time offsets table 900 of FIG. 21, each of the function objects 1304a-e has a respective one of a plurality of start time offsets 1306a-e shown in FIG. 25. Each of the start time offsets can be stored in a memory (e.g., a memory of the workstation 102 of FIG. 13) using a data structure. In the illustrated example of FIG. 25, an example start time offset data structure 1310 corresponding to the start time offset 1306 stores the start time offset 1306 in the format FBS{sequence number, index value, start time offset}. In the example, sequence number refers to a particular execution instance of a function block during a sub-schedule (e.g., one of the sub-schedules 710 or 712 of FIG. 19), the index value can be used to associate the start time offset with a respective function block, and start time offset refers to the start time offsets (e.g., the start time offset 1306b) of a respective function block.

Figure 26:
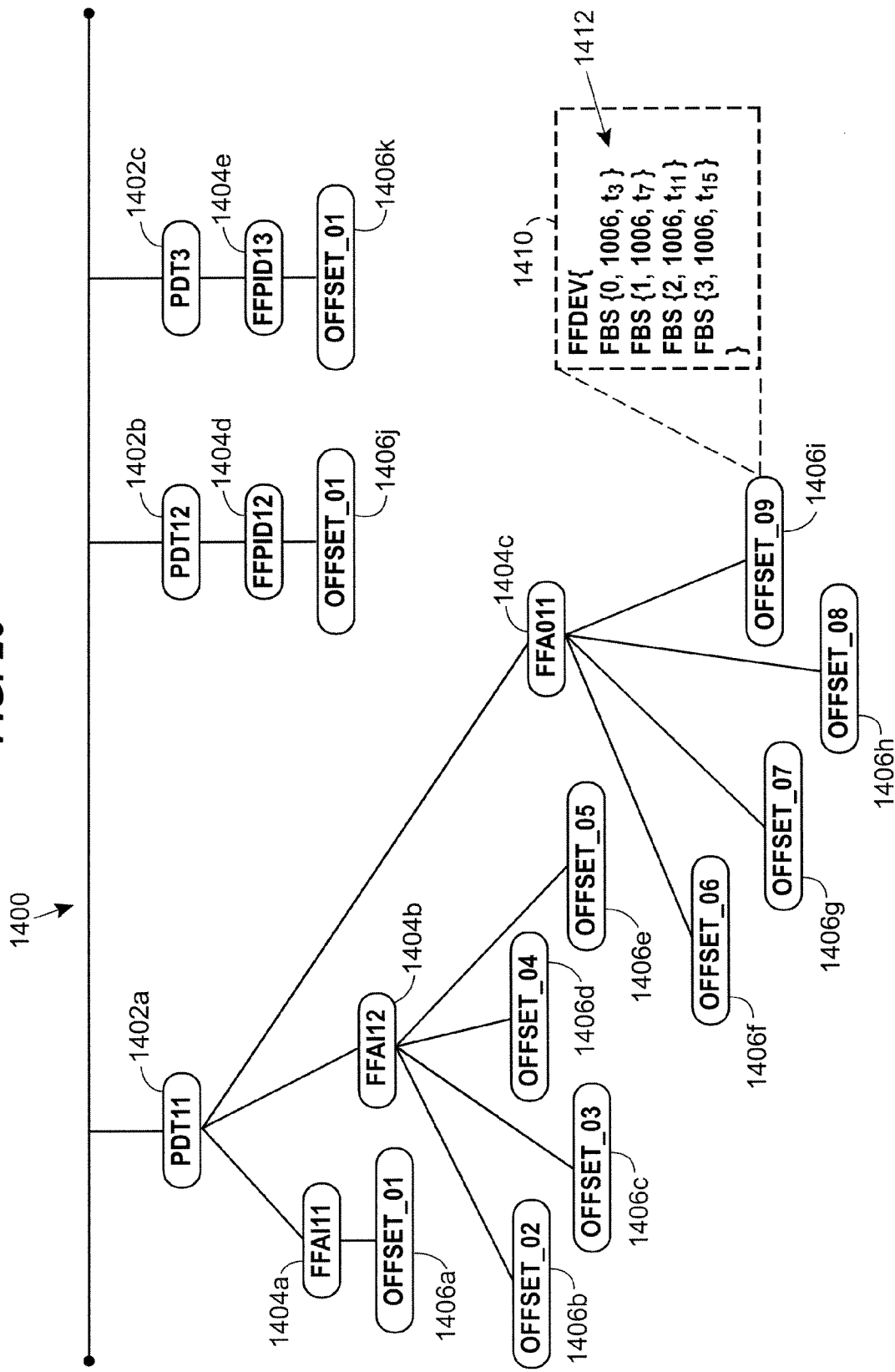
FIG. 26 is another example object-oriented software execution environment showing the relationships between objects representative of the field devices of FIG. 22, the function blocks of FIG. 22, and start time offsets corresponding to the function blocks.

FIG. 26 is another example object-oriented software execution environment 1400 showing the relationships between objects representative of the field devices 1012a-c of FIG. 22, the function blocks 1022a-e of FIG. 22, and start time offsets corresponding to the function blocks 1022a-e. A PDT11 device object 1402a corresponding to the field device 1012a of FIG. 22 is bound to an FFAI11 function block 1404a corresponding to the AI11 function block 1022a (FIG. 22), an FFAI12 function object 1404b corresponding to the AI2 function block 1022c (FIG. 13), and an FFAO11 function object 1404c corresponding to the AO11 function block 1022e of FIG. 22. A PDT12 device object 1402b corresponding to the field device 1012b of FIG. 22 is bound to an FFPID12 function block 1404c corresponding to the PID12 function block 1022b (FIG. 13). A PDT13 device object 1402c corresponding to the field device 1012c of FIG. 22 is bound to an FFPID13 function block 1404d corresponding to the PID13 function block 1022d (FIG. 13).

In accordance with the quantity of start time offsets table 1100 of FIG. 23, each of the function objects 1404a-e has one or more respective ones of a plurality of start time offsets 1406a-k shown in FIG. 26. An example start time offset data structure 1410 corresponding to the FFAO11 function object 1404c stores a start list 1412 having the start time offsets 1406f-i. Referring to the offset data structure 1410 and the example execution sequence diagram 1200 of FIG. 24, the start time offset 1406f is associated with a sequence number one and a start time offset of $t_3$, the start time offset 1406g is associated with a sequence number two and a start time offset of $t_7$, the start time offset 1406h is associated with a sequence number three and a start time offset of $t_{11}$, and the start time offset 1406i is associated with a sequence number four and a start time offset of $t_{15}$.

Figure 27:
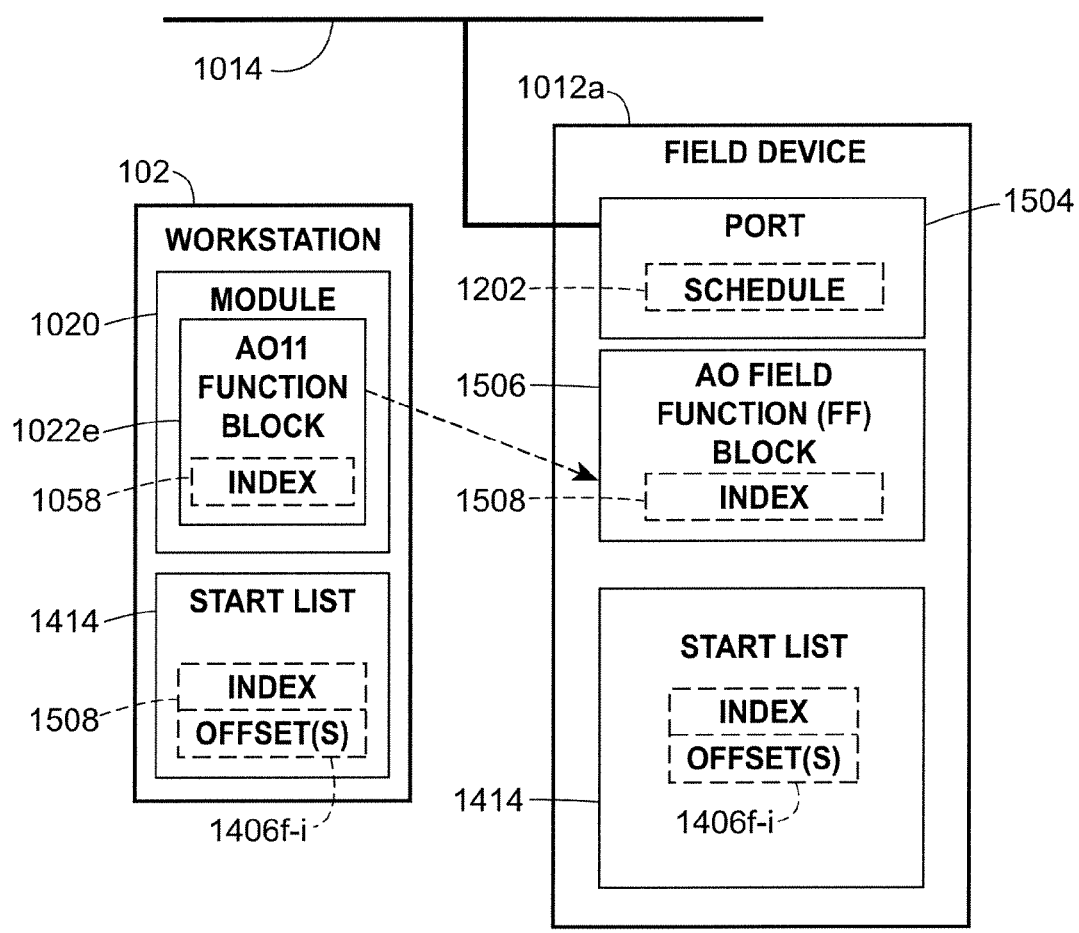
FIG. 27 illustrates an example manner in which a start list of FIG. 26 associated with a function block of FIG. 22 is copied from a workstation to a corresponding field device of FIG. 22.
Figure 28:
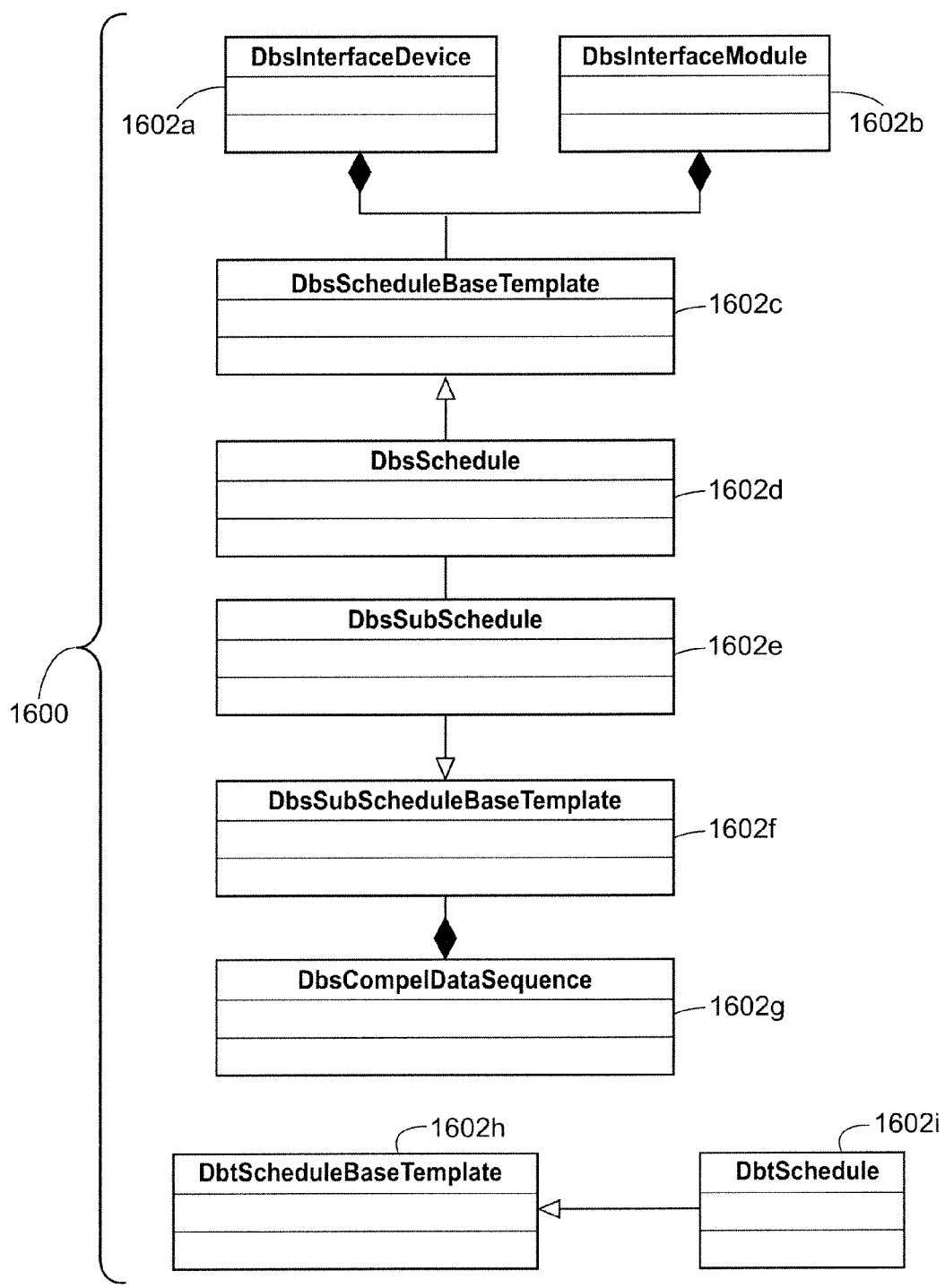
FIG. 28 depicts an example object-oriented programming environment having a plurality of classes configured to generate the schedules of FIGS. 19 and 24 using the example methods and apparatus described herein.

FIG. 27 illustrates an example manner in which the start list 1412 (FIG. 26) associated with the AO11 function block 1022e (FIG. 22) is copied from the workstation 102 (FIG. 13) to the field device 1012a (FIG. 22). The workstation 102 downloads to the field devices 1012a-c start lists (e.g., the start list 1412) having start time offsets (e.g., the start time offsets 1406f-i) to enable the field devices 1012a-c to execute their respective functions corresponding to the function blocks 1022a-e (FIG. 22) at scheduled times during the schedule 1202 of FIG. 24. As shown in FIG. 27, the workstation 102 stores the module 1020 of FIG. 22, which includes the AO11 function block 1022e. Although not shown, the workstation 102 also stores the other function blocks 1022a-d FIG. 22. In the illustrated example, the workstation 102 stores the start list 1412 having the start time offsets 1406f-i of FIG. 20. Although not shown, the workstation 102 also stores the start lists corresponding to the function blocks 1022a-d.

Also shown in FIG. 27 is the field device 1012a of FIG. 22 having a port 1504 configured to communicatively couple the field device 1012a to the digital data bus 1014. The port 1504 is provided with the schedule 1202 (FIG. 24) associated with the digital data bus 1014. In particular, the schedule 1202 indicates to the port 1504 the duration of the schedule (e.g., 200 ms) and the times at which all other field devices (e.g., the field devices 1012a-c) communicatively coupled to the digital data bus 1014 are configured to execute their respective functions (e.g., functions corresponding to the function blocks 1022a-d of FIG. 22).

In the illustrated example, the field device 1012a stores an AO function corresponding to the AO11 function block 1022e and designated as an AO field function (FF) block 1506. Of course, the field device 1012a can store more functions including, for example, an AI field function block corresponding to the AI11 function block 1022a shown in FIG. 22. The AO11 function block 1022e, the AO field function block 1506, and the start list 1414 store an index value 1508 that associates (e.g., keys) the AO11 function block 1022e and the AO field function block 1506 to the start time offsets 1406f-i in the start list 1414. After a schedule generation process in the workstation 102 or the controller 106 of FIG. 13 determines the start time offsets 1406f-i and stores the start time offsets 1406f-i in the start list 1414, the workstation 102 or the controller 106 communicates the start list 1414 having the start time offsets 1406f-i to the field device 1012a via the digital data bus 1014. As shown in FIG. 27, the field device 1012a then stores the start list 1414. The field device 1012a then uses the start time offsets 1406f-i to determine when to execute the AO field function block 1506 at the appropriate times in accordance with the schedule 1202. Although not shown, the field device 1012a also stores the start lists corresponding to the AI11 and AI12 function blocks 1022a and 1022c (FIG. 22).

Figure 29:
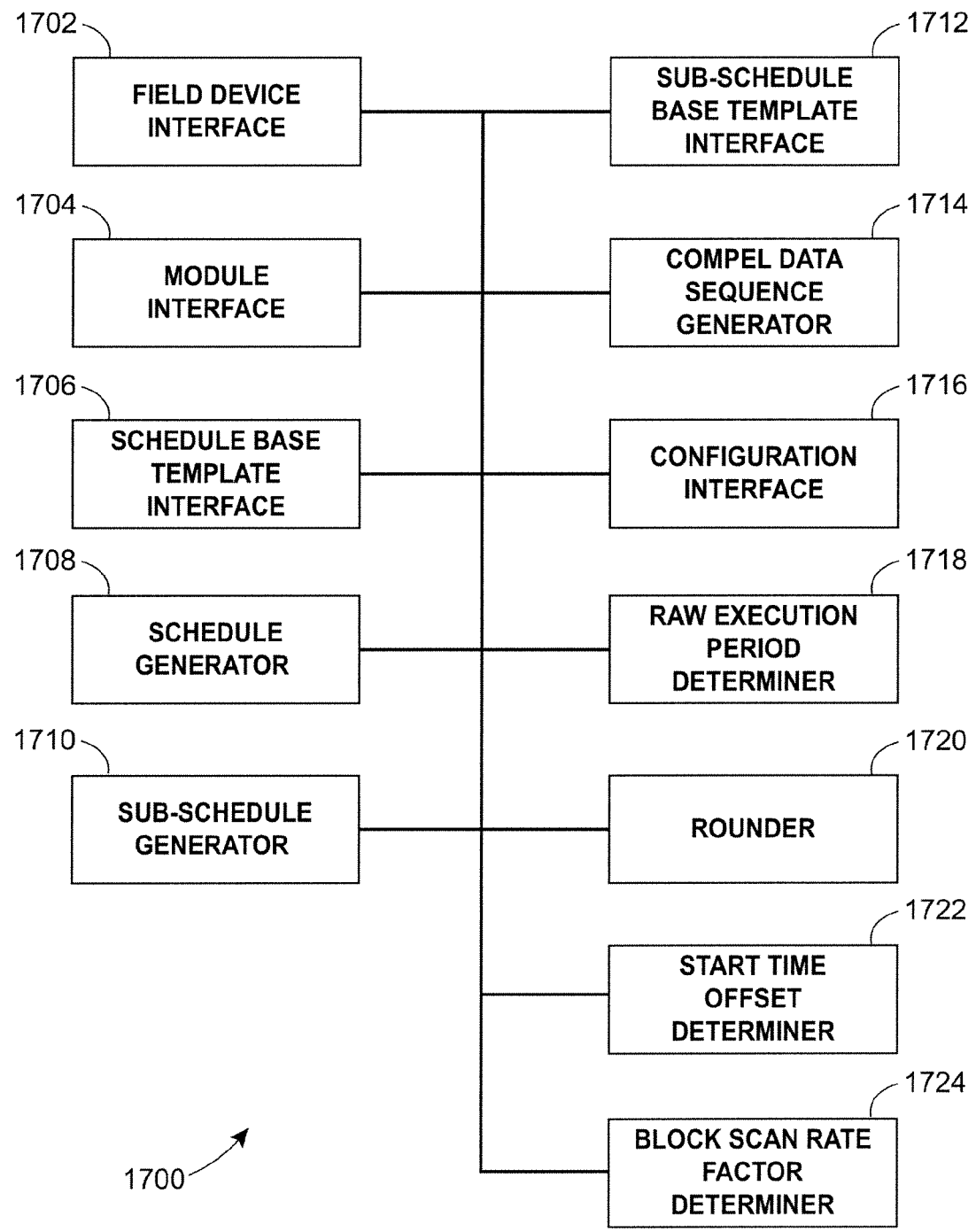
FIG. 29 is a detailed block diagram of an example apparatus that may be used to generate schedules in accordance with the example methods described herein.

FIG. 29 depicts an example object-oriented programming environment 1600 having a plurality of classes 1602a-i configured to generate schedules (e.g., the schedules 702 and 1202 of FIGS. 19 and 24) using the example methods and apparatus described herein. A DbsInterfaceDevice class 1602a is provided to exchange information with field devices (e.g., the field devices 112a-c of FIG. 13 or the field devices 1012a-c of FIG. 22) or field device objects (e.g., the field device objects 1302a-c of FIG. 25 or the field device objects 1402a-c of FIG. 26). For example, the DbsInterfaceDevice class 1602a may be provided with a plurality of functions or methods configured to communicate with field devices or field device objects. An example function of the DbsInterfaceDevice class 1602a retrieves block scan rates or block raw execution periods ($T_{BRE}$) associated with each of the field devices 112a-c or 1012a-c.

A DbsInterfaceModule class b is provided to exchange information with a module or module object (e.g., the module 120 of FIG. 13 or the module 1020 of FIG. 22) containing one or more field devices (e.g., the field devices 112a-c of FIG. 13 or the field devices 1012a-c of FIG. 22) for which to generate a schedule (e.g., the schedule 702 of FIG. 19 or the schedule 1202 of FIG. 24). An example function or method of the DbsInterfaceModule class 1602b may be configured to retrieve the execution order of function blocks (e.g., the function blocks 122a-e of FIGS. 13 and 14) from a module (e.g., the module 120 of FIG. 13) defined by interconnections of function blocks specified using a GUI control system design interface (e.g., the interconnections of the function blocks 122a-e shown in FIG. 14).

A DbsScheduleBaseTemplate class 1602c is provided to retrieve and/or generate base templates of schedules (e.g., a base template to generate the schedule 702 of FIG. 19 or a base template to generate the schedule 1202 of FIG. 24). The base templates of schedules provide the basic, or fundamental, framework required to generate schedules. For example, a base template of a schedule may include rules associated with scheduling function blocks and/or the base template may specify default parameters (e.g., schedule period, executions per schedule period, etc.). In some example implementations, a base template for a schedule may be retrieved from, for example, a schedule base template database (not shown) in the workstation 102.

A DbsSchedule class 1602d is provided to generate schedules (e.g., the schedule 702 of FIG. 19, the schedule 1202 of FIG. 24, or any other schedule) as described herein. A DbsSubSchedule class 1602e is provided to generate sub-schedules (e.g., the sub-schedules 710 and 712 of FIG. 19, the sub-schedules 1214 and 1216 of FIG. 24, or any other sub-schedules) as described herein. A DbsSubScheduleBaseTemplate class 1602f is provided to retrieve and/or generate base templates of sub-schedules (e.g., base templates to generate the sub-schedules 710 and 712 of FIG. 19 or base templates to generate the sub-schedules 1214 and 1216 of FIG. 24). The base templates of sub-schedules provide the basic, or fundamental, framework required to generate sub-schedules. In some example implementations, the base template for a sub-schedule may be retrieved from, for example, a sub-schedule base template database (not shown) in the workstation 102.

A DbsCompelDataSequence class 1602g may be provided to configure compel data sequences associated with schedules. A compel data sequence specifies when a field device (e.g., one of the field devices 112a-c of FIG. 13 or one of the field devices 1012a-c of FIG. 22) is to communicate or publish its data (e.g., measurement information, status information, etc.) to other field devices. In the illustrated example, the DbsCompelDataSequence class 1602g ensures that compel data commands are issued by a controller (e.g., the controller 106) to field devices following their execution of function blocks indicated in schedules (e.g., the schedules 710 and 1202 of FIGS. 19 and 24).

A DbtScheduleBaseTemplate class 1602h and a DbtSchedule class 1602i provide temporary workspace in which to generate a schedule (e.g., one of the schedules 702 or 1202 or any other schedule) during a generate schedule process and prior to publishing the schedule to field devices.

FIG. 29 is a detailed block diagram of an example apparatus 1700 that may be used to generate schedules in accordance with the example methods described herein. The example apparatus 1700 may be implemented using the workstation 102 (FIG. 13), the controller 106 (FIG. 13), or any desired combination of hardware, firmware, and/or software. For example, one or more integrated circuits, discrete semiconductor components, or passive electronic components may be used. Additionally or alternatively, some or all of the blocks of the example apparatus 1700, or parts thereof, may be implemented using instructions, code, and/or other software and/or firmware, etc. stored on a machine accessible medium that, when executed by, for example, a processor system (e.g., the example processor system 2310 of FIG. 35), perform the operations represented in the flowcharts of FIGS. 30-33. In a software example implementation, the blocks of the example apparatus described below may be used to implement the object-oriented programming classes 1602a-g described above in connection with FIG. 28.

The example apparatus 1700 is provided with a field device interface 1702 configured to exchange information with field devices (e.g., the field devices 112a-c of FIG. 13 or the field devices 1012a-c of FIG. 22). For example, the field device interface 1702 may retrieve block scan rates or block raw execution periods ($T_{BRE}$) associated with each of the field devices 112a-c or 1012a-c.

The example apparatus 1700 is further provided with a module interface 1704 configured to exchange information with a module containing one or more field devices (e.g., the field devices 112a-c of FIG. 13 or the field devices 1012a-c of FIG. 22) for which to generate a schedule (e.g., the schedule 702 of FIG. 19 or the schedule 1202 of FIG. 24). For example, the module interface 1704 may be configured to retrieve the execution order of function blocks (e.g., the function blocks 122a-e of FIGS. 13 and 14) from a module (e.g., the module 120 of FIG. 13) defined by interconnections of function blocks specified using a GUI control system design interface (e.g., the interconnections of the function blocks 122a-e shown in FIG. 14).

The example apparatus 1700 is further provided with a schedule base template interface 1706 configured to retrieve and/or generate base templates of schedules (e.g., a base template to generate the schedule 702 of FIG. 19 or a base template to generate the schedule 1202 of FIG. 24). In an example implementation, the schedule base template interface 1706 retrieves base templates of schedules from a schedule base template database in the workstation 102 based on, for example, the quantity of and type of function blocks (e.g., the function blocks 122a-e of FIGS. 13 and 1022a-e of FIG. 22) in a module (e.g., the module 120 of FIG. 13 or the module 1020 of FIG. 22).

The example apparatus 1700 is also provided with a schedule generator 1708 configured to generate schedules (e.g., the schedule 702 of FIG. 19, the schedule 1202 of FIG. 24, or any other schedule) as described herein. Additionally, the example apparatus 1700 is provided with a sub-schedule generator 1710 configured to generate sub-schedules (e.g., the sub-schedules 710 and 712 of FIG. 19, the sub-schedules 1214 and 1216 of FIG. 24, or any other sub-schedules) as described herein. To generate or retrieve base templates of sub-schedules, the example apparatus 1700 is provided with a sub-schedule base template interface 1712.

The example apparatus 1700 is further provided with a compel data sequence generator 1714 configured to generate compel data sequences associated with schedules. For example, when the schedule generator 1708 is finished generating a schedule (e.g., one of the schedules 702 (FIG. 19) or 1202 (FIG. 24)), the compel data sequence generator 1714 can generate a compel data sequence for the schedule to ensure that a controller (e.g., the controller 106 of FIG. 13) issues compel data commands to field devices following their executions of function blocks indicated in the schedule. In this manner data (e.g., measurement information, status information, calculation results, etc.) generated by field devices is communicated or published to other field devices requiring the data to perform other operations.

The example apparatus 1700 is additionally provided with a configuration interface 1716 that is configured to receive information, commands, etc. from a GUI design software application (e.g., the GUI design software application used to interconnect the function blocks 122a-e as shown in FIG. 14) used to design process control routings by adding, removing, and interconnecting function blocks (e.g., the function blocks 122a-e of FIGS. 13 and 14 and the function blocks 1022a-e of FIG. 24). For example, if a user changes an interconnection between two function blocks, the GUI design software application sends the configuration interface 1716 a notification of the change and information describing the change (e.g., output of function block A connected to input of function block B). In addition, the configuration interface 1716 is configured to access data structures or databases in the workstation 102 or in any other processor system coupled to the LAN 108 of FIG. 13 to retrieve process control system configuration information (e.g., digital data bus binding rules, limits of digital data bus, etc.).

The example apparatus 1700 is further provided with a raw execution period determiner 1718 to determine block raw execution periods ($T_{BRE}$) in accordance with equation 1 above. The example apparatus 1700 is also provided with a rounder 1720 to round block raw execution periods ($T_{BRE}$) in accordance with the rounding values shown in rounding table 800 of FIG. 20. In addition, the example apparatus 1700 is provided with a start time offset determiner 1722 configured to generate quantity of start time offsets ($Q_S$) and start time offset values ($t_S$) for function blocks. For example, the start time offset determiner 1721 can be configured to perform the calculations described above in connection with equations 3 and 4. Also, the example apparatus 1700 is provided with a block scan rate factor determiner 1724 to determine the block scan rate factors ($F_{BSR}$) of function blocks (e.g., the function blocks 122a-e of FIGS. 13 and 14 and the function blocks 1022a-e of FIG. 22). For example, the block scan rate factor determiner 1724 can determine a block scan rate factor ($F_{BSR}$) based on equation 2 above. To compare values, the example apparatus 1700 is provided with a comparator 1726. For example the comparator 1726 may be used to determine the slowest block raw execution period ($T_{SBE}$) associated with a field device by comparing the block raw execution periods ($T_{BRE}$) of the function blocks assigned to that device and determining which is the slowest.

FIGS. 30-33 are flowcharts of example methods that may be used to implement the example apparatus 1700 of FIG. 29. In some example implementations, the example methods of FIGS. 30-33 may be implemented using machine readable instructions comprising a program for execution by a processor (e.g., the processor 2312 shown in the example processor system 2310 of FIG. 35). The program may be embodied in software stored on a tangible medium such as a CD-ROM, a floppy disk, a hard drive, a digital versatile disk (DVD), or a memory associated with the processor 2312 and/or embodied in firmware and/or dedicated hardware in a well-known manner. Further, although the example program is described with reference to the flowcharts illustrated in FIGS. 30-33, persons of ordinary skill in the art will readily appreciate that many other methods of implementing the example apparatus 1700 of FIG. 29 may alternatively be used. For example, the order of execution of the blocks may be changed, and/or some of the blocks described may be changed, eliminated, or combined.

For purposes of discussion, the flow diagrams of FIGS. 30-33 are described below in connection with the schedule 1202 of FIG. 24. However, the example methods described in connection with the flow diagrams of FIGS. 30-33 may be used to generate any other schedule including, for example, the schedule 702 of FIG. 19.

Figure 30:
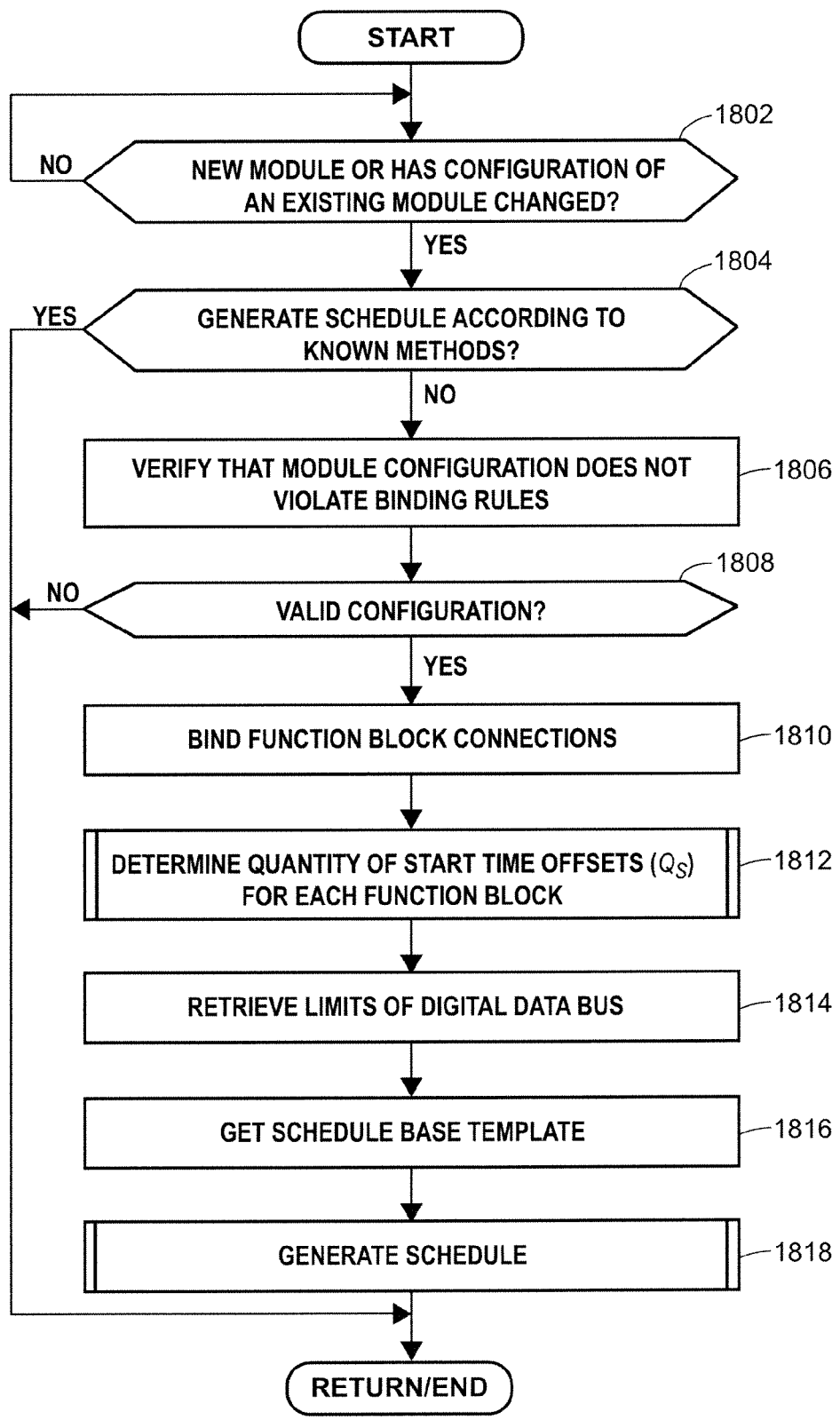
FIG. 30 is a flow diagram of an example method that may be used to implement the example apparatus of FIG. 29 to generate schedules as described herein.

Turning to FIG. 30, in an example method for generating schedules (e.g., the schedules 702 and 1202 of FIGS. 19 and 24 or any other schedule to schedule executions of function blocks within a process control system), the configuration interface 1716 determines if a new module (e.g., the module 1020 of FIG. 22) has been created or a configuration of an existing module has been changed (block 1802). If the configuration interface 1716 determines that a new module has not been added and that an existing module has not been changed, control remains at block 1802 until the configuration interface 1716 determines that a new module has been added or that an existing module has been changed.

If the configuration interface 1716 determines that a new module has been added or that the configuration of an existing module has been changed (block 1802), the configuration interface 1716 determines whether to generate a schedule according to known methods (block 1804). For example, the configuration interface 1716 may retrieve a schedule type descriptor from a data structure stored in the workstation 102 (FIG. 13). An example schedule generated in accordance with known methods is described above in connection with FIG. 18. If the configuration interface 1716 determines that known methods are to be used to generate a schedule, then the example method of FIG. 30 ends.

If the configuration interface 1716 determines that known methods are not to be used to generate a schedule, the configuration interface 1716 verifies that the module configuration does not violate any binding rules (block 1806). The binding rules indicate whether a particular module configuration is valid. For example, if one of the function blocks 1022a-e in the module 1020 of FIG. 22 is not assigned to one of the field device 1012a-c or any other field device, or if one of the function blocks 1022a-e is not properly connected, then the module 1020 is not valid for schedule generation. In the illustrated example, the configuration interface 1716 receives verification from a verification function in a process control system design software application that checks the module configuration against binding rules. If the configuration interface 1716 determines that the module configuration is not valid (block 1808), the example method of FIG. 30 ends.

If the configuration interface 1716 determines that the module configuration is valid (block 1808), the function block connections between the function blocks 1022a-e of FIG. 22 are bound to the digital data bus 1014 (FIG. 22) and to one another (block 1810). For example, the function block connections can be bound as described above in connection with FIG. 15. The example apparatus 1700 then determines the quantity of start time offsets ($Q_S$) for each of the function blocks 1022a-e (FIG. 22) (block 1812). The operation of block 1812 may be implemented using the example method described below in connection with FIG. 31.

After the example apparatus 1700 determines the quantity of start time offsets ($Q_S$), the configuration interface 1716 retrieves the limits of the digital data bus 1014 (block 1814). For example, the configuration interface 1716 can retrieve a time value defining the longest possible schedule that can run on the digital data bus 1014. The configuration interface 1716 can retrieve the limits from, for example, a digital data bus properties database in the workstation 102 or the controller 106. The schedule base template interface 1706 (FIG. 29) then retrieves a schedule base template (block 1816) from, for example, a schedule template database in the workstation 102. The example apparatus 1700 then generates the schedule 1202 (FIG. 24) (block 1818) as described in detail below in connection with the example method of FIG. 32. After the example apparatus 1700 generates the schedule 1202, control returns to a calling function or process and the example method of FIG. 30 is ended.

Figure 31:
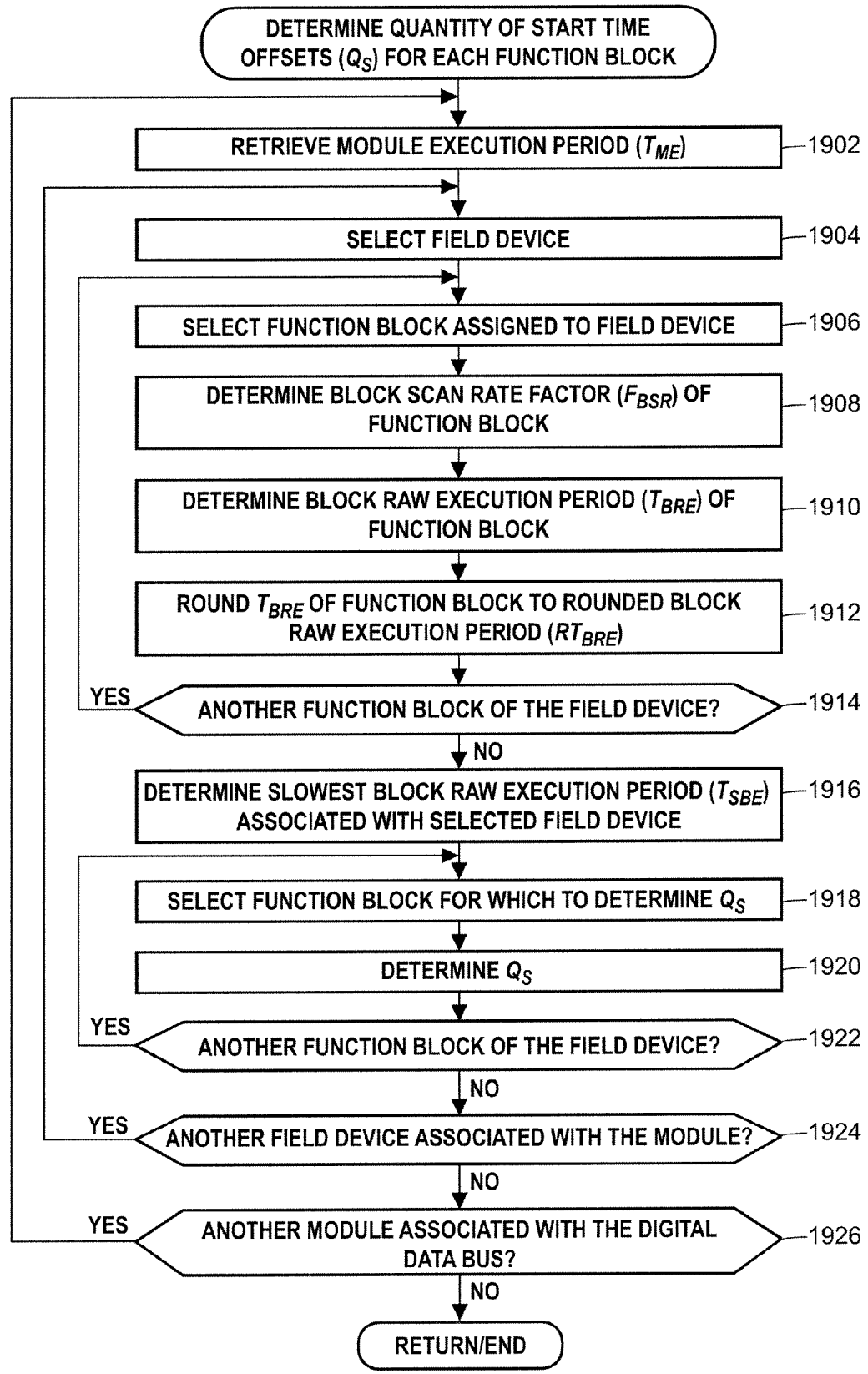
FIG. 31 is a flow diagram of an example method that may be implemented in connection with the example method of FIG. 30 to determine the quantity of start time offsets required by function blocks.

Turning to FIG. 31, the illustrated flow diagram depicts an example method that may be used to implement block 1812 of FIG. 30 to determine the quantity of start time offsets ($Q_S$) for each of the function blocks 1022a-e (FIG. 22). Initially, the module interface 1704 retrieves the module execution period ($T_{ME}$) of the module 1020 of FIG. 22 (block 1902). The module interface 1704 then selects a field device (block 1904) (e.g., one of the field devices 1022a-e) associated with the module 1020. For example, the module interface 1704 can determine which field devices (e.g., the field devices 1012a-c) the function blocks 1022a-e are assigned to and select one of those field devices by for example selecting a field device object (e.g., one of the field device objects 1402a-c of FIG. 26). For purposes of discussion, at block 1904, the module interface 1704 selects the field device 1012a of FIG. 22. In an object-oriented programming environment, the module interface 1704 selects the field device 1012a by selecting the field device object 1402a of FIG. 26.

The module interface 1704 then selects a function block (e.g., one of the function blocks 1022a, 1022c, or 1022e) assigned to the selected field device 1012a (block 1906). For purposes of discussion, the module interface 1704 selects the AI12 function block 1022c of FIG. 22 at block 1906. In an object-oriented programming environment, the module interface 1704 selects the AI12 function block 1022c by selecting the FFAI12 function block object 1404b of FIG. 26. The block scan rate factor determiner 1724 (FIG. 29) then determines the block scan rate factor ($F_{BSR}$) of the selected AI12 function block 1022c (block 1908). For example, the block scan rate factor determiner 1724 can obtain the module execution period ($T_{ME}$) of the module 1020 and the block scan rate factor (BSR) of the AI12 function block 1022c from the module interface 1704 and determine the block scan rate factor ($F_{BSR}$) of the AI12 function block 1022c using equation 2 above.

The raw execution period determiner 1718 (FIG. 29) then determines the block raw execution period ($T_{BRE}$) of the AI12 function block 1022c (block 1910). For example, the raw execution period determiner 1718 can use equation 1 above to determine the block raw execution period ($T_{BRE}$) of the AI12 function block 1022c based on the module execution period ($T_{ME}$) of the module 1020 and the block scan rate factor (BSR) of the AI12 function block 1022c. The rounder 1720 (FIG. 29) then rounds the block raw execution period ($T_{BRE}$) of the AI12 function block 1022c to a rounded block raw execution period ($RT_{BRE}$) (block 1912) based on the rounding table 800 of FIG. 20.

The module interface 1704 then determines whether the module 1020 contains another function block assigned to the selected field device 1012a (block 1914). If the module interface 1704 determines that the module 1020 contains another function block assigned to the selected field device 1012a (block 1914), then control is returned to block 1906 and the module interface 1704 selects the next function block (e.g., one of the function blocks 1022a and 1022e) assigned to the field device 1012a. Otherwise, if the module interface 1704 determines that the module 1020 does not contain another function block assigned to the selected field device 1012a (e.g., the rounded block raw execution periods ($RT_{BRE}$) have been determined for all of the function blocks 1022a, 1022c, and 1022e within the module 1020 assigned to the field device 1012a), the comparator 1726 then determines the slowest block raw execution period ($T_{SBE}$) associated with the selected field device (block 1916). For example, the comparator 1726 can compare the rounded block raw execution periods ($RT_{BRE}$) determined above in connection with blocks 1906, 1908, 1910, and 1912 of the function blocks 1022a, 1022c, and 1022e assigned to the field device 1012a. The comparator 1726 can then set the slowest block raw execution period ($T_{SBE}$) equal to the slowest one of the rounded block raw execution periods ($RT_{BRE}$) based on the comparison.

The module interface 1704 then selects a function block for which to determine a quantity of start time offsets ($Q_S$) (block 1918). For example, the module interface 1704 selects one of the function blocks 1022a, 1022c, and 1022e contained within the module 1020 and assigned to the selected field device 1012a. For purposes of discussion, the module 1020 selects the AI12 function block 1022c at block 1918. The start time offset determiner 1722 (FIG. 29) then determines the quantity of start time offsets ($Q_S$) for the AI12 function block 1022c (block 1920). For example, the start time offset determiner 1722 can use equation 3 above to determine the quantity of start time offsets ($Q_S$) based on the rounded block raw execution periods ($RT_{BRE}$) of the AI12 function block 1022c and the slowest block raw execution period ($T_{SBE}$) determined at block 1916.

The module interface 1704 then determines whether the module 1020 contains another function block assigned to the selected field device 1012a (block 1922). If the module interface 1704 determines that the module 1020 contains another function block assigned to the selected field device 1012a (block 1922), then control is returned to block 1918 and the module interface 1704 selects the next function block (e.g., one of the function blocks 1022a and 1022e) assigned to the field device 1012a. Otherwise, if the module interface 1704 determines that the module 1020 does not contain another function block assigned to the selected field device 1012a (e.g., the quantity of start time offsets ($Q_S$) have been determined for all of the function blocks 1022a, 1022c, and 1022e within the module 1020 assigned to the field device 1012a), the module interface 1704 determines if another field device (e.g., one of the field devices 1012b and 1012c of FIG. 22) is associated with the module 1020 (block 1924). For example, the module interface 1704 can determine that another field device is associated with the module 1020 if the module 1020 contains any function blocks (e.g., the function blocks 1022b and 1022d) that are assigned to other field devices (e.g., the field devices 1012b and 1012c) and for which quantity of start time offsets ($Q_S$) have not yet been determined.

If the module interface 1704 determines that another field device (e.g., one of the field devices 1012b and 1012c of FIG. 22) is associated with the module 1020 (block 1924), control is passed back to block 1904 at which point the module interface 1704 selects the next field device (e.g., one of the field devices 1012b and 1012c of FIG. 22). Otherwise, if the module interface 1704 determines that another field device is not associated with the module 1020 (block 1924), the module interface 1704 determines if another module (e.g., a module other than the module 1020) is associated with the digital data bus 1014 (block 1926). For example, another module associated with the digital data bus 1014 may contain function blocks assigned to ones of the field devices 1012a-c and the example apparatus 1700 then determines the quantity of start time offsets ($Q_S$) for those function blocks. If the module interface 1704 determines that another module is associated with the digital data bus 1014, control is returned to block 1902 at which point the module interface 1704 retrieves the module execution period ($T_{ME}$) of the next module. Otherwise, if the module interface 1704 determines that another module is not associated with the digital data bus 1014, control is returned to a calling function or process (e.g., the example method of FIG. 30) and the example method of FIG. 31 is ended.

Figure 32A:
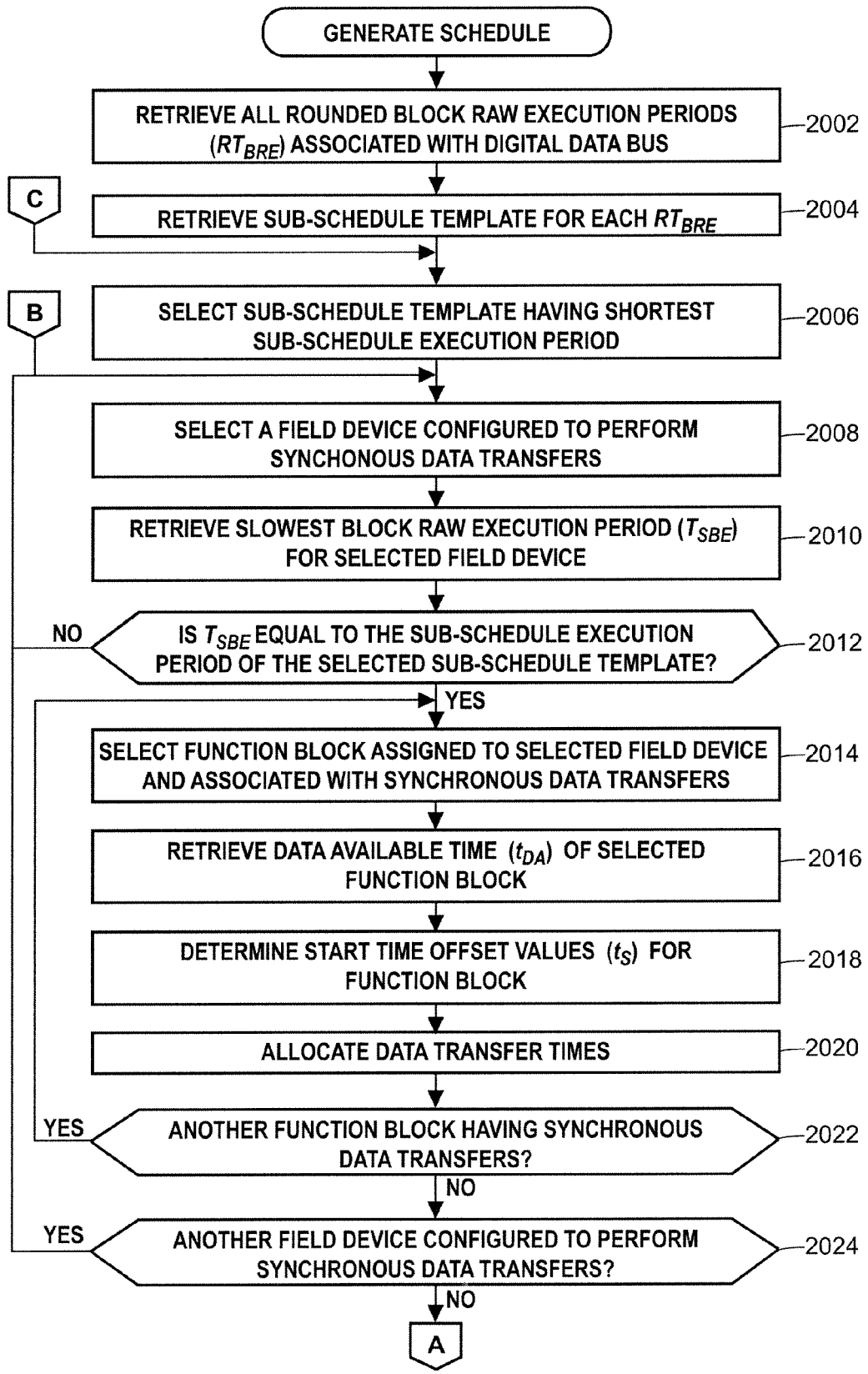
FIGS. 32A and 32B illustrate a flow diagram of an example method that may be implemented in connection with the example method of FIG. 30 to generate sub-schedules and a schedule based on the generated sub-schedules.
Figure 32B:
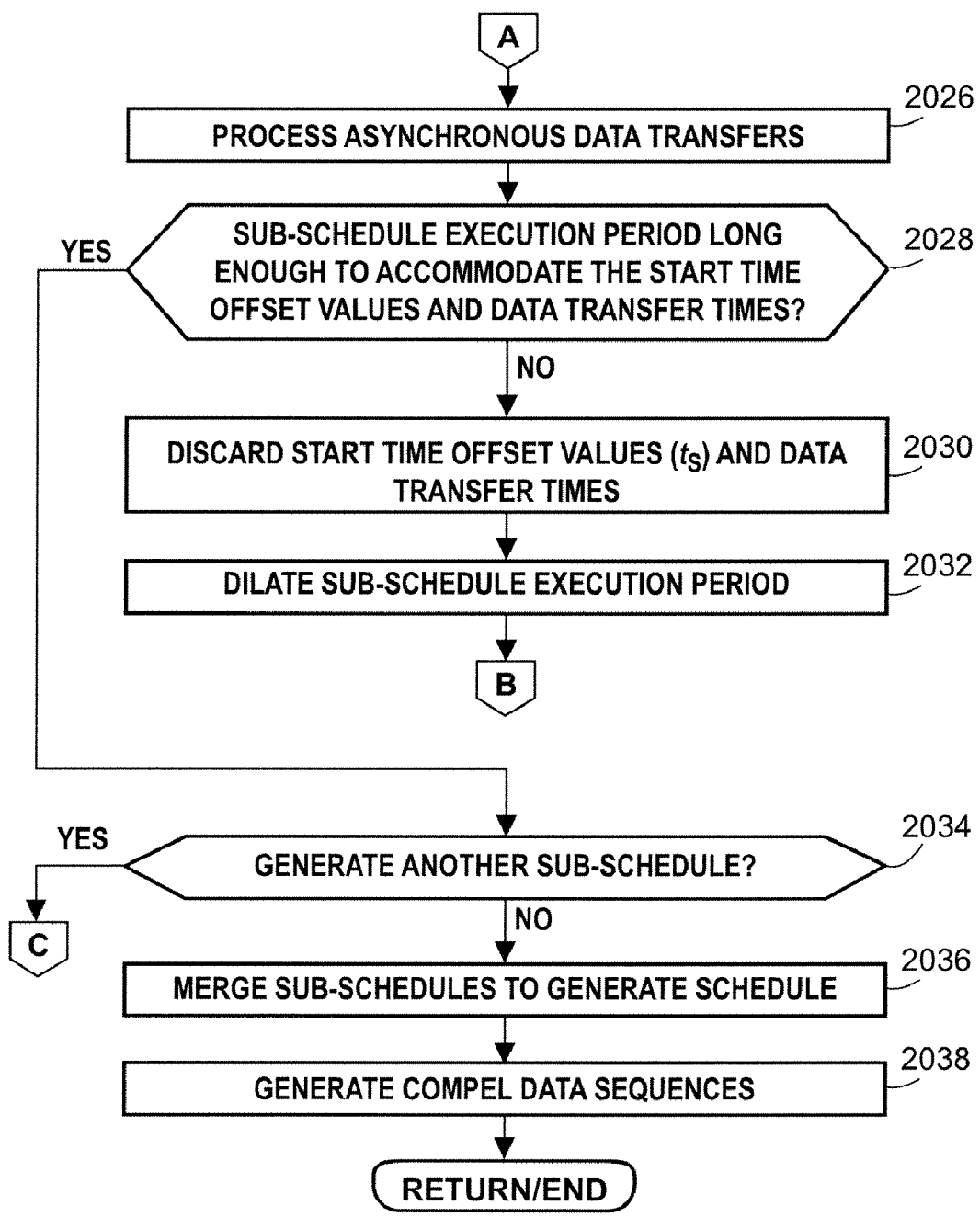

Turning to FIGS. 32A and 32B, the illustrated flow diagram depicts an example method that may be used to implement block 1818 of FIG. 30 to generate sub-schedules (e.g., the sub-schedules 1214 and 1216 of FIG. 24) and a schedule (e.g., the schedule 1202 of FIG. 24) based on the sub-schedules. Initially, the sub-schedule generator 1710 retrieves all of the rounded block raw execution periods ($RT_{BRE}$) associated with the digital data bus 1014 (block 2002). For example, sub-schedule generator 1710 retrieves all of the rounded block raw execution periods ($RT_{BRE}$) determined at block 1912 for all of the function blocks (e.g., the function blocks 1022a-e of FIG. 22) associated with the digital data bus 1014. The sub-schedule base template interface 1712 (FIG. 29) then retrieves sub-schedule base templates for each of the rounded block raw execution periods ($RT_{BRE}$) (block 2004). For example, the sub-schedule base template interface 1712 may retrieve the sub-schedule base templates from a sub-schedule base template database or data structure in the workstation 102 (FIG. 13). In the illustrated example, each of the sub-schedule base templates is configured to have a sub-schedule execution period equal to a respective one of the rounded block raw execution periods ($RT_{BRE}$) retrieved at block 2002. For example, as shown in FIG. 24, the sub-schedule execution period of the sub-schedule 1214 is equal to 500 ms and the sub-schedule execution period of the sub-schedule 1216 is equal to 2000 ms.

The sub-schedule generator 1710 selects the sub-schedule template having the shortest sub-schedule execution period (block 2006). For example, the sub-schedule generator 1710 may compare all of the sub-schedule execution periods to one another using the comparator 1726 (FIG. 29) to determine which one of the sub-schedule periods is the shortest. The sub-schedule generator 1710 then selects a field device configured to perform synchronous data transfers (block 2008). A field device (e.g., one of the field devices 1012a-c of FIG. 22) is configured to perform synchronous data transfers if it is assigned to execute a function block (e.g., one of the function blocks 1022a-e of FIG. 22) that transfers data in a synchronous manner. A function block transfers data in a synchronous manner if the data produced by that function block is required by another function block at a particular time. For example, if the PID13 function block 1022d (FIGS. 22 and 24) requires data from the AI12 function block 1022c (FIGS. 22 and 24) by time $t_2$ shown in FIG. 24, then the field device 1012a must perform a synchronous data transfer associated with the AI12 function block 1022c to ensure that the PID13 function block 1022d obtains the data by the time $t_2$. For purposes of discussion, the sub-schedule generator 1710 selects the field device 1012a (FIGS. 22 and 24).

The sub-schedule generator 1710 then retrieves the slowest block raw execution period ($T_{SBE}$) associated with the selected field device 1012a (block 2010). For example, the sub-schedule generator 1710 may retrieve the slowest block raw execution period ($T_{SBE}$) determined at block 1916 of FIG. 31 for the field device 1012a. The sub-schedule generator 110 then determines if the slowest block raw execution period ($T_{SBE}$) is equal to the sub-schedule execution period of the selected sub-schedule template (block 2012) using, for example, the comparator 1726 (FIG. 29). The sub-schedule to be generated using the sub-schedule template selected at block 2006 may include start time offsets ($t_S$) only for function blocks assigned to be executed by field devices associated with a slowest block raw execution period ($T_{SBE}$) equal to the sub-schedule execution period of the selected sub-schedule template. Therefore, if the sub-schedule generator 1710 determines that the slowest block raw execution period ($T_{SBE}$) of the field device 1012a selected at block 2008 is not equal to the sub-schedule execution period of the selected sub-schedule template (block 2012), the field device is skipped and control is returned to block 2008 at which point the sub-schedule generator 1710 selects another field device configured to perform synchronous data transfers.

Otherwise, if the sub-schedule generator 1710 determines that the slowest block raw execution period ($T_{SBE}$) of the field device 1012a selected at block 2008 is equal to the sub-schedule execution period of the selected sub-schedule template (block 2012), the sub-schedule generator 1710 selects a function block (e.g., one of the function blocks 1022a, 1022c, or 1022e) assigned to the selected field device 1012a and associated with synchronous data transfers (block 2014). For purposes of discussion, the sub-schedule generator 1710 selects the AI12 function block 1022c (FIGS. 22 and 24).

The sub-schedule generator 1710 then retrieves the data available time ($t_{DA}$) of the selected AI12 function block 1022c (block 2016). In the illustrated example, all data available times ($t_{DA}$) are predetermined by a synchronous data available time generator (not shown) and stored in a data structure in association with the input ports of the function block. For example, the synchronous data available time generator may scan all function blocks (e.g., the function blocks 1022a-e) prior to or during the schedule generation process of FIG. 30 to determine which function blocks require data transferred to them in a synchronous manner. The synchronous data available time generator can then pre-determine data available times ($t_{DA}$) to ensure that function blocks having to transfer data in a synchronous manner to other function blocks have sufficient time to execute and to transfer their data over the digital data bus 1014 so that function blocks requiring the data at a particular time can receive the data by that time. For a function block (e.g., the AI11 function block 1022a) that can be executed without requiring data from another function block, the data available time ($t_{DA}$) is set to zero because the function block can be executed as soon as a sub-schedule period begins.

The start time offset determiner 1722 (FIG. 29) determines the start time offset values ($t_S$) for the selected AI12 function block 1022c (block 2018) as described below in connection with FIG. 33. The sub-schedule generator 1710 then allocates data transfer times (block 2020) for the start time offset values ($t_S$) determined at block 2018. A data transfer time is the amount of time required to communicate data from one function block to another via the digital data bus 1014. A function block that transfers data to another function block within the same device does not have a data transfer time. However, a function block that transfers data to another function block within the same device does not have a data transfer time. Data transfer times occupy time on the digital data bus 1014 and are, thus, required to generate the sub-schedule to ensure the sub-schedule is sufficiently long enough to ensure that all function block executions and data transfers can occur on the digital data bus 1014.

The sub-schedule generator 1710 then determines if another function block assigned to the field device 1012a is associated with synchronous data transfers (block 2022). If the sub-schedule generator 1710 determines that another function block assigned to the field device 1012a is associated with synchronous data transfers (block 2022), then control returns to block 2014 at which point the sub-schedule generator 1710 selects the next function block associated with synchronous data transfers. Otherwise, the sub-schedule generator 1710 determines whether another field device communicatively coupled to the digital data bus 1014 is configured to perform synchronous data transfers (block 2024). If the sub-schedule generator 1710 determines that another field device communicatively coupled to the digital data bus 1014 is configured to perform synchronous data transfers (block 2024), control is returned to block 2008 at which point the sub-schedule generator 1710 selects another field device (e.g., one of the field devices 1012b and 1012c of FIGS. 22 and 24) configured to perform synchronous data transfers.

Otherwise, if the sub-schedule generator 1710 determines that another field device communicatively coupled to the digital data bus 1014 is not configured to perform synchronous data transfers (block 2024), the sub-schedule generator 1710 processes asynchronous data transfers (block 2026). For example, the sub-schedule generator 1710 can identify ones of the function blocks 1022a-e (FIGS. 22 and 24) that are associated with asynchronous data transfers, retrieve data available times ($t_{DA}$) for those function blocks in a manner similar to that described above in connection with block 2016, determine start time offset values ($t_S$) in a manner similar to that described below in connection with FIG. 33, and allocate data transfer times for those function blocks in a manner similar to that described above in connection with block 2020.

The sub-schedule generator 1710 then determines whether the sub-schedule execution period of the sub-schedule template selected at block 2006 is long enough to accommodate the start time offset values ($t_S$) and the data transfer times (block 2028) determined as described above. If the sub-schedule generator 1710 determines that the sub-schedule execution period of the sub-schedule template selected at block 2006 is not long enough to accommodate the start time offset values ($t_S$) and the data transfer times (block 2028), the sub-schedule generator 1710 discards the start time offset values ($t_S$) and the data transfer times (block 2030) to re-generate the sub-schedule. To provide the sub-schedule template selected at block 2006 with a long enough sub-schedule execution period to accommodate start time offset values ($t_S$) and the data transfer times of the function blocks to be generated for the sub-schedule template, the sub-schedule generator 1710 dilates the sub-schedule period of the sub-schedule template (block 2032). That is, the sub-schedule generator 1710 adds time to the sub-schedule execution period of the sub-schedule template to lengthen the sub-schedule execution period. For example, if the sub-schedule template used to generate the 200 ms sub-schedule 1216 of FIG. 24 does not have a sub-schedule execution period long enough to accommodate the start time offsets ($t_S$) and the data transfer times associated with the function blocks 1022a-c and 1022e, the sub-schedule generator 1710 can add 500 ms to the sub-schedule template (or any other amount of time).

After the sub-schedule generator 1710 dilates the sub-schedule execution period of the selected sub-schedule template (block 2032), control returns to block 2008 at which point the operations of blocks 2008, 2010, 2012, 2014, 2016, 2018, 2020, 2022, 2024, 2026, and 2028 are repeated based on the dilated sub-schedule execution period. If the sub-schedule generator 1710 determines that the sub-schedule execution period of the sub-schedule template selected at block 2006 is long enough to accommodate the start time offset values ($t_S$) and the data transfer times (block 2028), the sub-schedule generator 1710 determines whether to generate another sub-schedule (block 2034). For example, if the example method of FIG. 30 is used to generate the schedule 1202 of FIG. 24 and sub-schedule generator 1710 has generated the sub-schedule 1214 but not the sub-schedule 1216, the sub-schedule generator 1710 determines that another sub-schedule (e.g., the sub-schedule 1216) should be generated. If the sub-schedule generator 1710 determines that another sub-schedule (e.g., the sub-schedule 1216) should be generated (block 2034), control is passed back to block 2006 (FIG. 32A) at which point the sub-schedule base template interface 1712 selects the next shortest sub-schedule execution period (e.g., the 2000 ms sub-schedule execution period corresponding to the 2000 ms sub-schedule 1216 of FIG. 24) (block 2006).

Otherwise, the schedule generator 1708 merges the sub-schedules (block 2036) (e.g., the sub-schedules 1214 and 1216 of FIG. 24) generated by the sub-schedule generator 1710 to generate a schedule (e.g., the schedule 1202 of FIG. 24). The compel data sequence generator 1714 then generates a compel data sequence for the schedule (block 2038). The compel data sequence ensures that the controller 106 communicates compel data commands to the field devices 1012a-c to cause the field devices 1012a-c to publish data on the digital data bus 1014 corresponding to their respective ones of the function blocks 1022a-e in accordance with the generated schedule. Control is then returned to a calling function or process (e.g., the example method of FIG. 30) and the example method of FIGS. 32A and 32B is ended.

Figure 33:
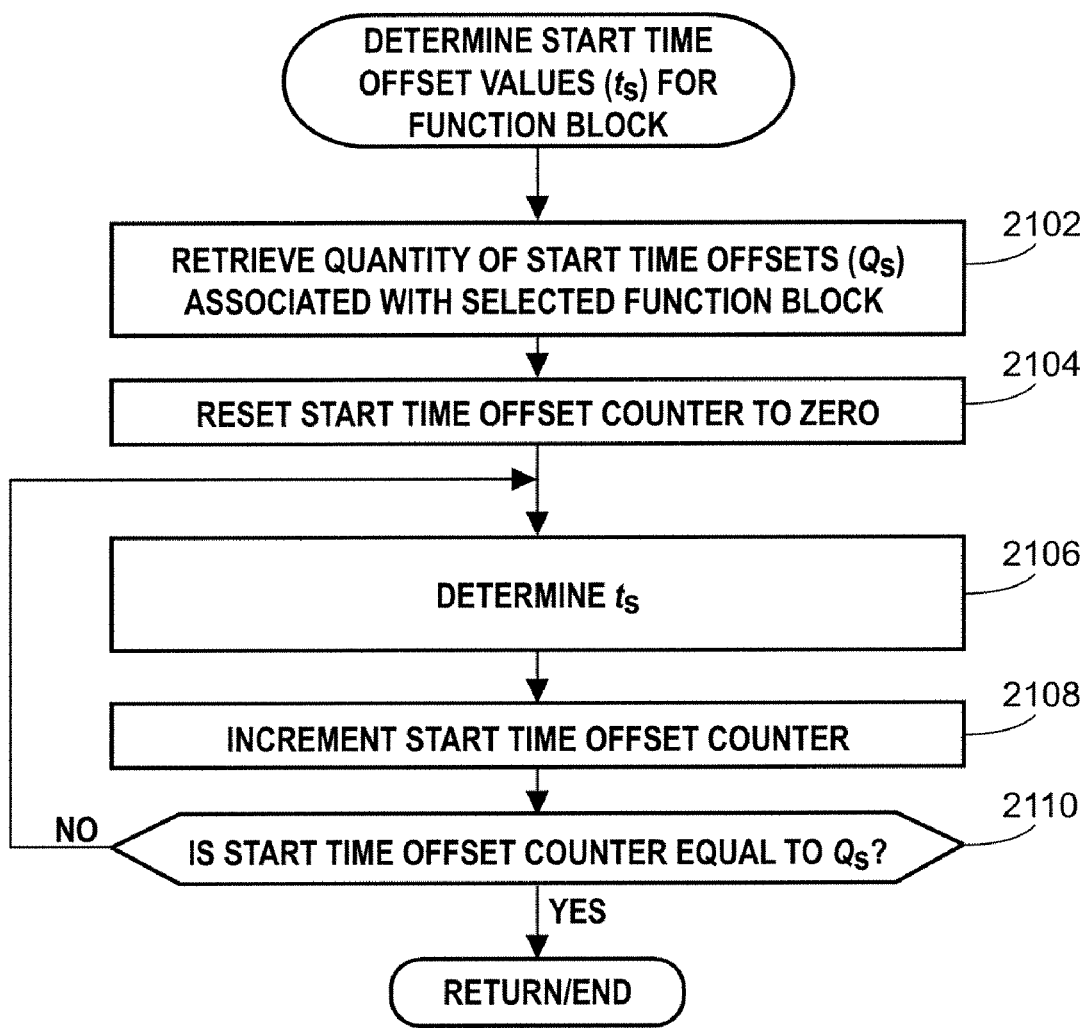
FIG. 33 is a flow diagram of an example method that may be implemented in connection with the example method of FIG. 32 to determine start time offset values for function block.

Turning to FIG. 33, the illustrated flow diagram depicts an example method that may be used to implement block 2018 of FIG. 32A to determine start time offset values ($t_S$) for a function block. In the illustrated example, the example method of FIG. 33 uses equation 4 above to determine the start time offset values ($t_S$). Initially, the start time offset determiner 1722 (FIG. 29) retrieves the quantity of start time offsets ($Q_S$) associated with a selected function block (block 2102) (e.g., a function block selected at block 2014 of FIG. 32A). For purposes of discussion, the AI12 function block 1022c (FIGS. 22 and 24) is the selected function block. Accordingly, the quantity of start time offsets ($Q_S$) retrieved at block 2102 is four. In the illustrated example, the quantity of start time offsets ($Q_S$) (e.g., four) is determined at block 1812 of FIG. 30 for the selected AI12 function block 1022c. The start time offset determiner 1722 then resets a start time offset counter to zero (block 2104). The value of the start time offset counter is used to provide the sequence number ($N_{Seq}$) of equation 4 above. In addition, the value of the start time offset counter is used to determine when all of the start time offset values ($t_S$) for the selected function block have been determined.

The start time offset determiner 1722 determines a first start time offset value ($t_S$) (block 2106). For example, the start time offset determiner 1722 uses equation 4 above to determine the start time offset value ($t_S$) of the AI12 function block 1022c indicated in FIG. 24 as $t_1$ based on the value of the start time offset counter (e.g., the sequence number ($N_{Seq}$) of the current start time offset (sequence zero, sequence one, sequence two, etc.)), the slowest block raw execution period ($T_{SBE}$) associated with the field device (e.g., the field device 1012a) assigned to execute the AI12 function block 1022c, and the data available time ($t_{DA}$) obtained at block 2016 for the AI12 function block 1022c.

The start time offset determiner 1722 then increments the value of the start time offset counter (block 2108) and determines whether the start time offset counter is equal to the quantity of start time offsets ($Q_S$) (block 2110) retrieved at block 2102. If the start time offset determiner 1722 determines that the start time offset counter is not equal to the quantity of start time offsets ($Q_S$), control returns to block 2106 at which point the start time offset determiner 1722 determines a next start time offset value ($t_S$) (e.g., the start time offset value ($t_S$) of the AI12 function block 1022c indicated in FIG. 24 as $t_5$. Otherwise, control is returned to a calling function or process (e.g., the example method of FIGS. 32A and 32B) and the example method of FIG. 33 is ended.

Figure 34:
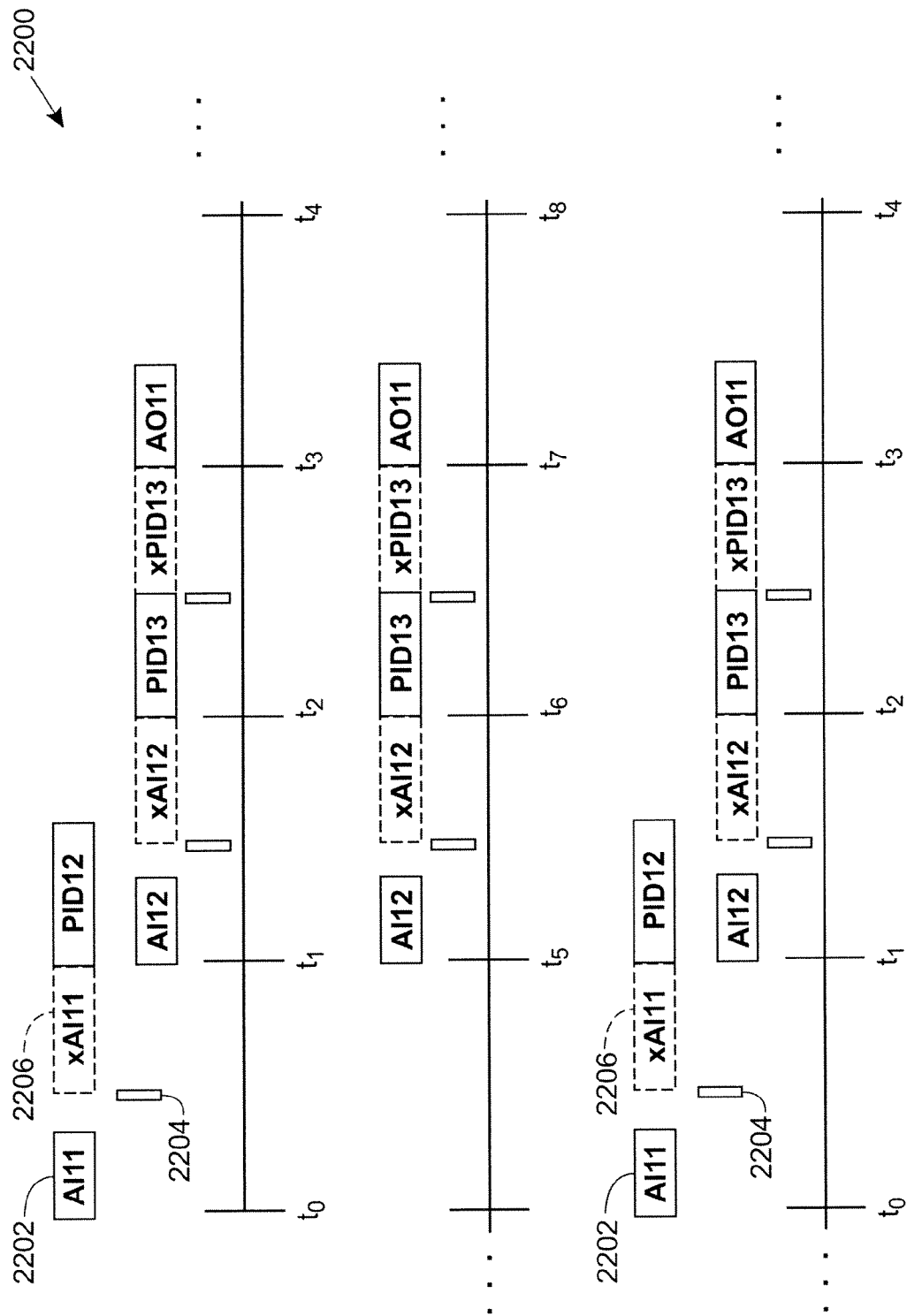
FIG. 34 is an example function execution and data transfer sequence diagram of the schedule of FIG. 24.

FIG. 34 is an example function execution and data transfer sequence diagram 2200 of the schedule 1202 of FIG. 24. The example function execution and data transfer sequence diagram 2200 shows the relationship between executions of the function blocks 1022a-e and data transfer time required to transfer data from one function block to another via the digital data bus 1014. The example function execution and data transfer sequence diagram also shows when compel data commands are issued by the controller 106 to cause the field devices 1012a-c of FIG. 24 to publish data on the digital data bus 1014. For example, as shown in FIG. 34, after an AI11 function block execution 2202 a compel data command 2204 causes the field device 1012a to perform an AI11 data transfer 2206 to enable a PID12 execution 2208. Other function block executions, compel data commands, and corresponding data transfers are also shown. Although not shown, if two function blocks are executed by the same field device, no data transfer times (e.g., the AI11 data transfer 2206) associated with the digital data bus 1014 are necessary to exchange data between the function blocks because the data transfers occur within the same field device.

Figure 35:
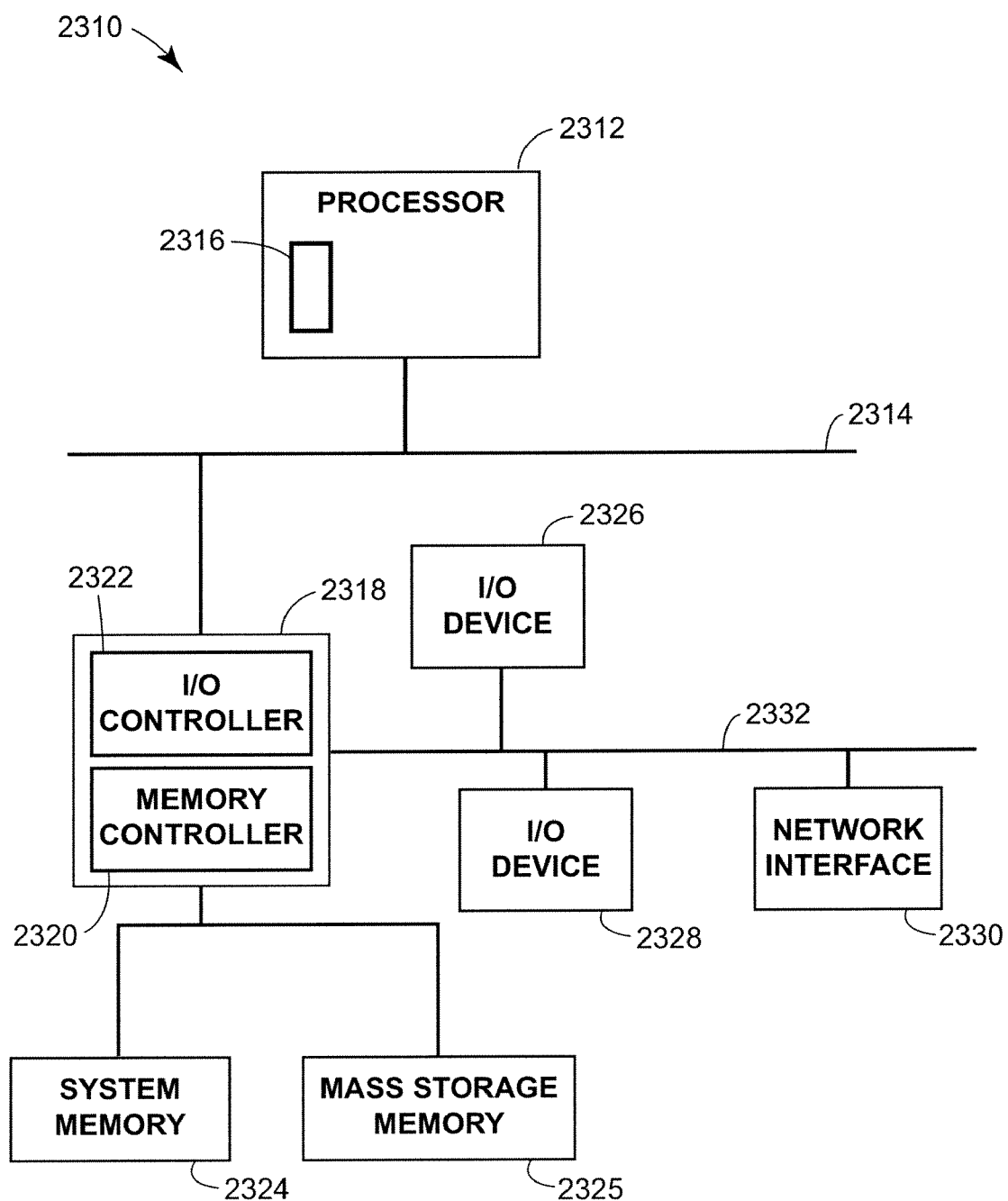
FIG. 35 is a block diagram of an example processor system that may be used to implement the example systems and methods described herein.

FIG. 35 is a block diagram of an example processor system 2310 that may be used to implement the apparatus and methods described herein. As shown in FIG. 35, the processor system 2310 includes a processor 2312 that is coupled to an interconnection bus 2314. The processor 2312 includes a register set or register space 2316, which is depicted in FIG. 35 as being entirely on-chip, but which could alternatively be located entirely or partially off-chip and directly coupled to the processor 2312 via dedicated electrical connections and/or via the interconnection bus 2314. The processor 2312 may be any suitable processor, processing unit or microprocessor. Although not shown in FIG. 35, the system 2310 may be a multi-processor system and, thus, may include one or more additional processors that are identical or similar to the processor 2312 and that are communicatively coupled to the interconnection bus 2314.

The processor 2312 of FIG. 35 is coupled to a chipset 2318, which includes a memory controller 2320 and a peripheral input/output (I/O) controller 2322. As is well known, a chipset typically provides I/O and memory management functions as well as a plurality of general purpose and/or special purpose registers, timers, etc. that are accessible or used by one or more processors coupled to the chipset 2318. The memory controller 2320 performs functions that enable the processor 2312 (or processors if there are multiple processors) to access a system memory 2324 and a mass storage memory 2325.

The system memory 2324 may include any desired type of volatile and/or non-volatile memory such as, for example, static random access memory (SRAM), dynamic random access memory (DRAM), flash memory, read-only memory (ROM), etc. The mass storage memory 2325 may include any desired type of mass storage device including hard disk drives, optical drives, tape storage devices, etc.

The peripheral I/O controller 2322 performs functions that enable the processor 2312 to communicate with peripheral input/output (I/O) devices 2326 and 2328 and a network interface 2330 via a peripheral I/O bus 2332. The I/O devices 2326 and 2328 may be any desired type of I/O device such as, for example, a keyboard, a video display or monitor, a mouse, etc. The network interface 2330 may be, for example, an Ethernet device, an asynchronous transfer mode (ATM) device, an 802.11 device, a DSL modem, a cable modem, a cellular modem, etc. that enables the processor system 2310 to communicate with another processor system.

While the memory controller 2320 and the I/O controller 2322 are depicted in FIG. 35 as separate functional blocks within the chipset 2318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents. Still further, while the automatic block assignment and scheduling routines have been described herein as being applicable to FOUNDATION® Fieldbus networks, these techniques are not limited to FOUNDATION® Fieldbus networks and can, instead, be used in any other applicable bus-based communication network.

What is claimed is:

1. A system operable on a processor for automatically assigning function blocks of a control module to be executed in devices within a process control network, the process control network having a process controller communicatively coupled to an input/output device which is connected to one or more field devices via a data bus, the system comprising:
   a computer-readable memory;
   a routine stored on the computer-readable memory for execution on the processor, wherein the routine, when executed on the processor;
   determines a set of function blocks disposed on a forward flow path of the control module, the set of function blocks including an input function block, an output function block and one or more intermediate function blocks;
   determines if each of the input function block and the output function block on the forward flow path of the control module is assigned to execute in the one or more field devices on the data bus; and
   assigns the one or more intermediate function blocks on the forward flow path of the control module to execute in the input/output device if both the input function block and the output function block on the forward flow path of the control module are assigned to execute in the one or more field devices on the data bus.

2. The system of claim 1, wherein the routine, when executed on the processor, assigns each of the one or more intermediate function blocks on the forward flow path of the control module to execute in the process controller if one or more of the input function block and the output function block on the forward flow path of the control module is not assigned to execute in any of the one or more field devices on the data bus.

3. The system of claim 1, wherein communications occur over the data bus according to a pre-established communication schedule, and wherein the routine, when executed on the processor, further schedules each of the input function block, the output function block and the one or more intermediate function blocks to operate synchronously within the pre-established communication schedule.

4. The system of claim 3, wherein the pre-established communication schedule includes a repeating macrocycle, and wherein the routine, when executed on the processor, schedules each of the input function block, the output function block and the one or more intermediate function blocks within the pre-established communication schedule by creating a macrocycle for the data bus in which each of the input function block, the output function block and the one or more intermediate function blocks is scheduled to communicate over the data bus at least once during each macrocycle.

5. The system of claim 3, wherein the routine, when executed on the processor, schedules one of the input function block, the output function block and the one or more intermediate function blocks to execute at a faster rate than another one of the input function block, the output function block and the one or more intermediate function blocks.

6. The system of claim 5, wherein the routine, when executed on the processor, further creates a macrocycle for the pre-established communication schedule in which the one of the input function block, the output function block and the one or more intermediate function blocks is scheduled to operate more times during the macrocycle than the another one of the input function block, the output function block and the one or more intermediate function blocks.

7. The system of claim 5, further include an indicator for at least one of the function blocks of the control module that specifies a multiplier, the multiplier indicating a relative rate of execution for the at least one of the function blocks of the control module, and wherein the routine, when executed on the processor, uses the indictor to schedule the one of the input function block, the output function block and the one or more intermediate function blocks to execute at a faster rate than the another one of the input function block, the output function block and the one or more intermediate function blocks.

8. The system of claim 1, further including a user-settable property associated with the control module indicating whether the function blocks of the control module can be assigned to the input/output device, and wherein the routine, when executed on the processor, assigns the one or more intermediate function blocks on the forward flow path of the control module to execute in the process controller if the user-settable property of the control module indicates that function blocks of the control module should not be assigned to the input/output device, even if both the input function block and the output function block on the forward flow path of the control module are assigned to execute in the one or more field devices on the data bus.

9. The system of claim 1, further including a user-settable property associated with the input/output device indicating whether function blocks of any control module can be assigned to the input/output device, and wherein the routine, when executed on the processor, assigns the one or more intermediate function blocks on the forward flow path of the control module to execute in the process controller if the user-settable property of the input/output device indicates that function blocks should not be assigned to the input/output device, even if both the input function block and the output function block on the forward flow path of the control module are assigned to execute in the one or more field devices on the data bus.

10. The system of claim 1, wherein the routine, when executed on the processor, checks to determine whether the input/output device supports each of the one or more intermediate function blocks on the forward flow path of the control module, and assigns each of the one or more intermediate function blocks on the forward flow path of the control module to execute in the process controller if the input/output device does not support any one of the one or more intermediate function blocks, even if both the input function block and the output function block on the forward flow path of the control module are assigned to execute in the one or more field devices on the data bus.

11. The system of claim 1, wherein the routine, when executed on the processor, checks to determine whether the input/output device has sufficient capacity to execute every one of the one or more intermediate function blocks on the forward flow path of the control module, and assigns the one or more intermediate function blocks on the forward flow path of the control module to execute in the process controller if the input/output device does not have sufficient capacity to execute every one of the one or more intermediate function blocks, even if both the input function block and the output function block on the forward flow path of the control module are assigned to execute in the one or more field devices on the data bus.

12. The system of claim 1, wherein the routine, when executed on the processor, notifies a user if the routine does not assign the one or more intermediate function blocks on the forward flow path of the control module to execute in the input/output device.

13. A method of assigning function blocks of a control module to devices for execution within a process control network, the process control network having a process controller communicatively coupled to an input/output device which is connected to one or more field devices via a data bus, the method comprising:
  determining a set of function blocks disposed on a forward flow path of the control module, the not of function blocks including an input function block, an output function block and one or more intermediate function blocks;
  determining if each of the input function block and the output function block on the forward flow path of the control module is assigned to execute in the one or more field devices on the data bus; and
  using a processor for assigning at least one of the one or more intermediate function blocks on the forward flow path of the control module to execute in the input/output device if both the input function block and the output function block on the forward flow path of the control module are assigned to execute in the one or more field devices on the data bus.

14. The method of assigning function blocks of a control module of claim 13, further including assigning each of the one or more intermediate function block on the forward flow path of the control module to execute in the process controller if one or more of the input function block and the output function block on the forward flow path of the control module is not assigned to execute in the one or more field devices on the data bus.

15. The method of assigning function blocks of a control module of claim 13, wherein assigning at least one of the one or more intermediate function blocks on the forward flow path of the control module to execute in the input/output device includes assigning each of the one or more intermediate function blocks on the forward flow path of the control module to execute in the input/output device.

16. The method of assigning function blocks of a control module of claim 13, wherein communications occur over the data bus according to a pre-established communication schedule, and further including scheduling each of the input function block, the output function block and the at least one of the one or more intermediate function blocks to operate synchronously within the pre-established communication schedule.

17. The method of assigning function blocks of a control module of claim 16, wherein the pre-established communication schedule includes a repeating macrocycle, and wherein scheduling each of the input function block, the output function block and the at least one of the one or more intermediate function blocks includes creating a macrocycle in which each of the input function block, the output function block and the at least one of the one or more intermediate function blocks is scheduled to communicate over the data bus at least once during the macrocycle.

18. The method of assigning function blocks of a control module of claim 16, wherein scheduling each of the input function block, the output function block and the at least one of the one or more intermediate function blocks includes scheduling one of the input function block, the output function block and the one or more intermediate function blocks to execute at a faster rate than another one of the input function block, the output function block and the one or more intermediate function blocks.

19. The method of assigning function blocks of a control module of claim 18, further including creating a macrocycle for the pre-established communication schedule in which the one of the input function block, the output function block and the one or more intermediate function blocks is scheduled to operate more times during the macrocycle than the another one of the input function block, the output function block and the one or more intermediate function blocks.

20. The method of assigning function blocks of a control module of claim 18, further including allowing a user to specify a multiplier for one or more of the input function block, the output function block and the one or more intermediate function blocks, the multiplier indicating a relative rate of execution for an associated function block.

21. The method of assigning function blocks of a control module of claim 13, further including checking a user-settable property of the control module indicating whether the function blocks of the control module can be assigned to the input/output device and assigning the at least one of the one or more intermediate function blocks on the forward flow path of the control module to execute in the process controller if the user-settable property of the control module indicates that function blocks of the control module should not be assigned to the input/output device, even if both the input function block and the output function block on the forward flow path of the control module are assigned to execute in the one or more field devices on the data bus.

22. The method of assigning function blocks of a control module of claim 13, further including checking a user-settable property of the input/output device indicating whether function blocks of any control module can be assigned to the input/output device, and assigning the at least one of the one or more intermediate function blocks on the forward flow path of the control module to execute in the process controller if the user-settable property of the input/output device indicates that function blocks should not be assigned to the input/output device, even if both the input function block and the output function block on the forward flow path of the control module are assigned to execute in the one or more field devices on the data bus.

23. The method of assigning function blocks of a control module of claim 13, further including checking to determine whether the input/output device supports the at least one of the one or more intermediate function blocks on the forward flow path of the control module, and assigning the at least one of the one or more intermediate function blocks on the forward flow path of the control module to execute in the process controller if the input/output device does not support the at least one of the one or more intermediate function blocks, even if both the input function block and the output function block on the forward flow path of the control module are assigned to execute in the one or more field devices on the data bus.

24. The method of assigning function blocks of a control module of claim 13, further including checking to determine whether the input/output device has sufficient capacity to execute the at least one of the one or more intermediate function blocks on the forward flow path of the control module, and assigning the at least one of the one or more intermediate function blocks on the forward flow path of the control module to execute in the process controller if the input/output device does not have sufficient capacity to execute the at least one of the one or more intermediate function blocks, even if both the input function block and the output function block on the forward flow path of the control module are assigned to execute in the one or more field devices on the data bus.

25. A process control network, comprising:
a user interface device;
a process controller communicatively coupled to the user interface device via a first communication network;
a Fieldbus segment including a data bus and one or more Fieldbus field devices communicatively connected to the data bus, wherein the one or more Fieldbus field devices communicate over the data bus using a pre-established communication schedule;
an input/output device directly connected to the data bus and communicatively connected between the process controller and the data bus; and
a control module having plurality of communicatively linked function blocks which operate together to perform a process control loop, wherein the plurality of communicatively linked function blocks includes an input function block, an output function block and at least one intermediate function block, wherein the input function block and the output function block are located in the one or more Fieldbus field devices and the at least one intermediate function block is located in the input/output device and wherein each of the input function block, the output function block and the at least one intermediate function block communicates over the data bus using the pre-established communication schedule;
further including a processor, a computer-readable memory and a routine stored in the compute readable memory, wherein the routine executes on the processor to automatically assign the function blocks of the control module for execution in specific devices within the process control network; wherein the routine;
determines a set of function blocks disposed on a forward flow path of the control module, the set of function blocks including the input function block, the output function block and the at least one intermediate function block;
determines if each of the input function block and the output function block on the forward flow path of the control module is assigned to execute in the one or more Fieldbus field devices on the data bus; and
assigns the at least one intermediate function block on the forward flow path of the control module to execute in the input/output device if both the input function block and the output function block no the forward flow path of the control module are assigned to execute in the one or more Fieldbus field devices on the data bus.

26. The process control network of claim 25, wherein the routine, when executed on the processor, assigns at least one intermediate function block on a forward flow path of a second control module to execute in the process controller if one or more of an input function block and an output function block on the forward flow path of the second control module is not assigned to execute in the one or more Fieldbus field devices on the data bus.

27. The process control network of claim 25, further including a processor, a computer-readable memory and a routine stored in the computer readable memory, wherein the routine executes on the processor to automatically schedule each of the input function block, the output function block and the at least one intermediate function block to operate synchronously within the pre-established communication schedule on the data bus.

28. The process control network of claim 27, wherein the routine, when executed on the processor, schedules one of the input function block, the output function block and the at least one intermediate function block to execute at a faster rate on the data bus than another one of the input function block, the output function block and the at least one intermediate function block.

29. The process control network of claim 25, further including a user-settable property associated with the control module indicating whether the function blocks of the control module can be assigned to the input/output device.

30. The process control network of claim 25, further including a user-settable property associated with the input/output device indicating whether function blocks of any control module can be assigned to the input/output device.

* * * * *

UNITED STATES PATENT AND TRADEMARK OFFICE
CERTIFICATE OF CORRECTION

| | | |
|---|---|---|
| PATENT NO. | : 8,005,553 B2 | Page 1 of 1 |
| APPLICATION NO. | : 11/968087 | |
| DATED | : August 23, 2011 | |
| INVENTOR(S) | : Alper T. Enver et al. | |

It is certified that error appears in the above-identified patent and that said Letters Patent is hereby corrected as shown below:

In the Specification:

At Column 31, line 14, "determined" should be -- determine --.

In the Claims:

At Column 47, line 7, "cach" should be -- each --.

At Column 47, line 25, "include" should be -- including --.

At Column 48, line 33, "not" should be -- set --.

At Column 50, line 67, "no" should be -- on --.

Signed and Sealed this
Third Day of June, 2014

Michelle K. Lee
*Deputy Director of the United States Patent and Trademark Office*